US008847564B2

(12) United States Patent
Williams

(10) Patent No.: US 8,847,564 B2
(45) Date of Patent: Sep. 30, 2014

(54) DC/DC CONVERTER USING SYNCHRONOUS FREEWHEELING MOSFET

(71) Applicant: Advanced Analogic Technologies Incorporated, Santa Clara, CA (US)

(72) Inventor: Richard K. Williams, Cupertino, CA (US)

(73) Assignee: Advanced Analogic Technologies, Incorporated, Santa Clara, CA (US)

(*) Notice: Subject to any disclaimer, the term of this patent is extended or adjusted under 35 U.S.C. 154(b) by 0 days.

(21) Appl. No.: 13/632,622

(22) Filed: Oct. 1, 2012

(65) Prior Publication Data

US 2013/0027980 A1 Jan. 31, 2013

Related U.S. Application Data

(60) Continuation of application No. 13/166,546, filed on Jun. 22, 2011, now Pat. No. 8,278,887, which is a division of application No. 12/148,576, filed on Apr. 21, 2008, now Pat. No. 7,977,926.

(60) Provisional application No. 60/958,630, filed on Jul. 6, 2007.

(51) Int. Cl.
H02M 3/156 (2006.01)
H02M 3/158 (2006.01)

(52) U.S. Cl.
CPC ............ *H02M 3/1582* (2013.01); *H02M 3/158* (2013.01)
USPC .......................................... 323/223; 363/127

(58) Field of Classification Search
CPC .................................. H02M 1/36; H02M 3/156
USPC ................... 323/222, 223, 901, 908; 363/127
See application file for complete search history.

(56) References Cited

U.S. PATENT DOCUMENTS

| 3,641,422 | A | 2/1972 | Farnsworth et al. ............. 307/38 |
| 5,262,930 | A | 11/1993 | Hua et al. ................... 363/21.03 |
| 5,689,209 | A | 11/1997 | Williams et al. .............. 327/425 |
| 5,929,615 | A | 7/1999 | D'Angelo et al. ............ 323/224 |
| 6,051,963 | A | 4/2000 | Eagar ............................. 323/282 |
| 6,271,651 | B1 | 8/2001 | Stratakos et al. ............. 323/282 |
| 6,349,044 | B1 | 2/2002 | Canales-Abarca et al. ...... 363/17 |
| 6,590,440 | B1 | 7/2003 | Williams et al. .............. 327/396 |
| 6,806,694 | B2 | 10/2004 | Rupp et al. .................... 323/282 |
| 7,253,592 | B2 | 8/2007 | Leyk et al. .................... 323/222 |
| 2001/0011885 | A1 | 8/2001 | Nakagawa .................... 323/224 |
| 2003/0043597 | A1 | 3/2003 | Betts-LaCroix ................ 363/16 |
| 2004/0201281 | A1 | 10/2004 | Ma et al. ........................ 307/38 |
| 2005/0194945 | A1* | 9/2005 | So ................................. 323/222 |
| 2006/0007618 | A1 | 1/2006 | Leyk et al. ...................... 361/90 |
| 2006/0132112 | A1* | 6/2006 | Oswald et al. ................ 323/282 |
| 2008/0239774 | A1 | 10/2008 | Canfield et al. |

* cited by examiner

*Primary Examiner* — Harry Behm
*Assistant Examiner* — Matthew Grubb
(74) *Attorney, Agent, or Firm* — Lando & Anastasi, LLP

(57) ABSTRACT

A freewheeling MOSFET is connected in parallel with the inductor in a switched DC/DC converter. When the freewheeling MOSFET is turned on during the switching operation of the converter, while the low-side and energy transfer MOSFETs are turned off, the inductor current circulates or "freewheels" through the freewheeling MOSFET. The frequency of the converter is thereby made independent of the lengths of the magnetizing and energy transfer stages, allowing far greater flexibility in operating and converter and overcoming numerous problems associated with conventional DC/DC converters. In one embodiment the freewheeling MOSFET is an N-channel MOSFET with its body connected to circuit ground and not shorted to either its source or its drain.

21 Claims, 41 Drawing Sheets

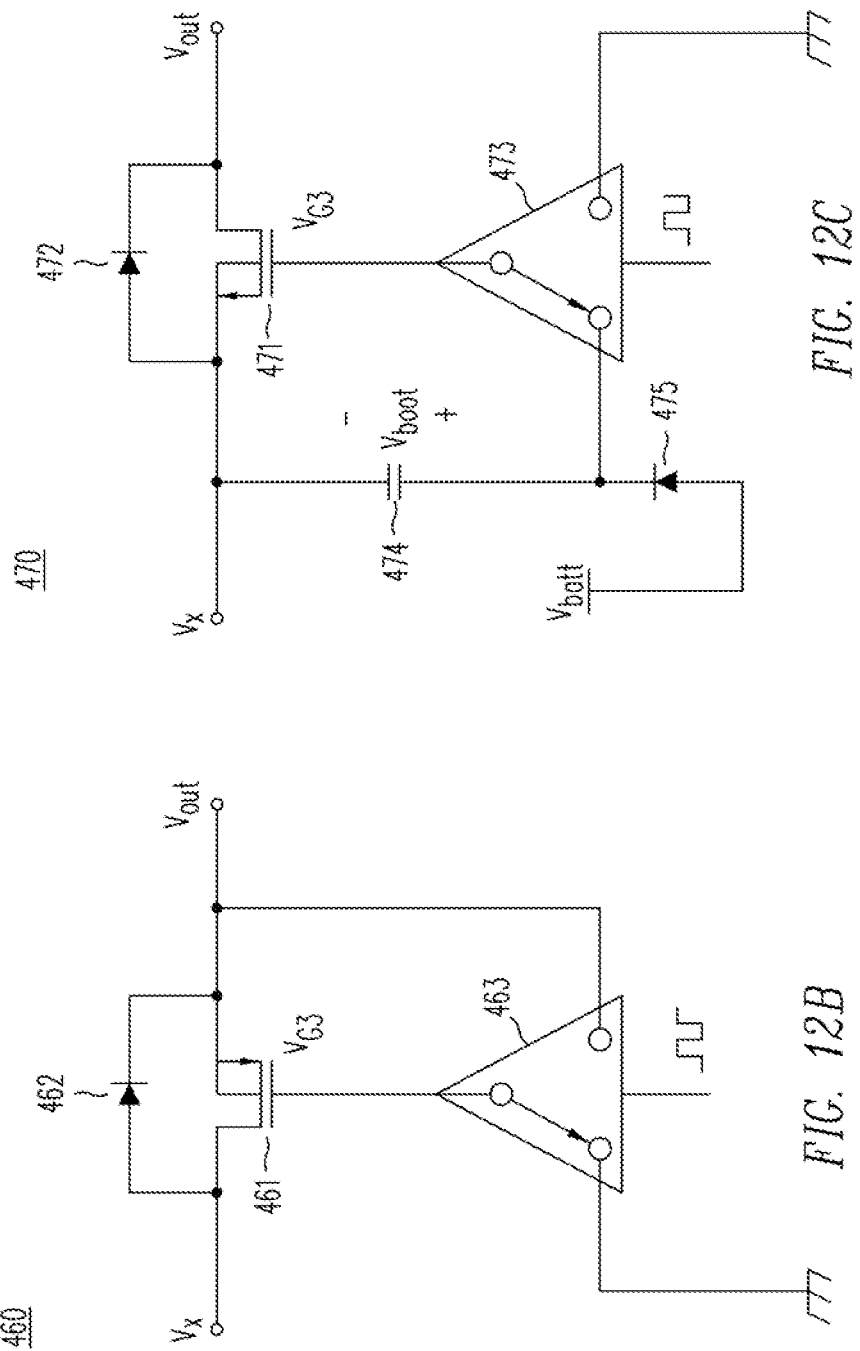

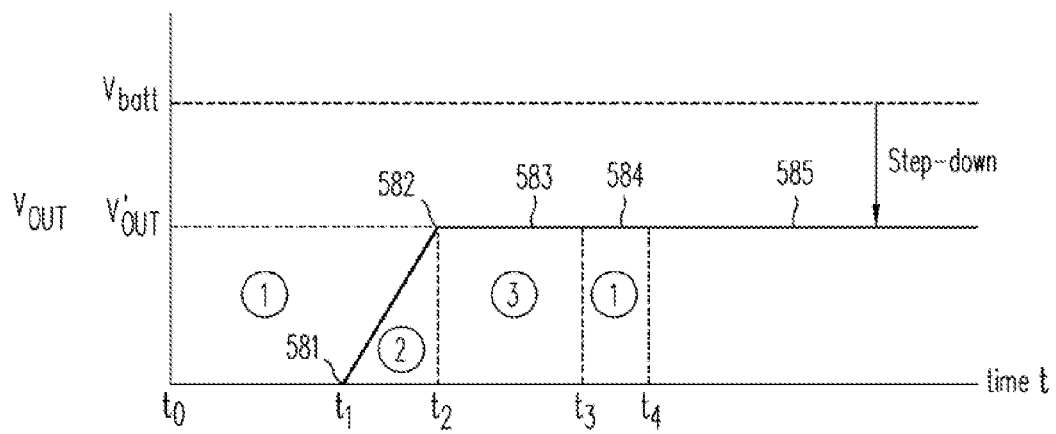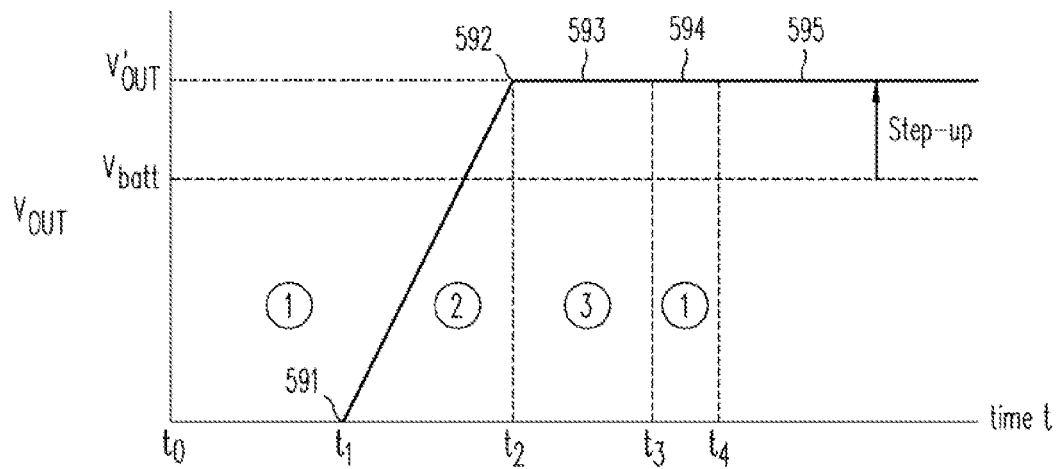
FIG. 15

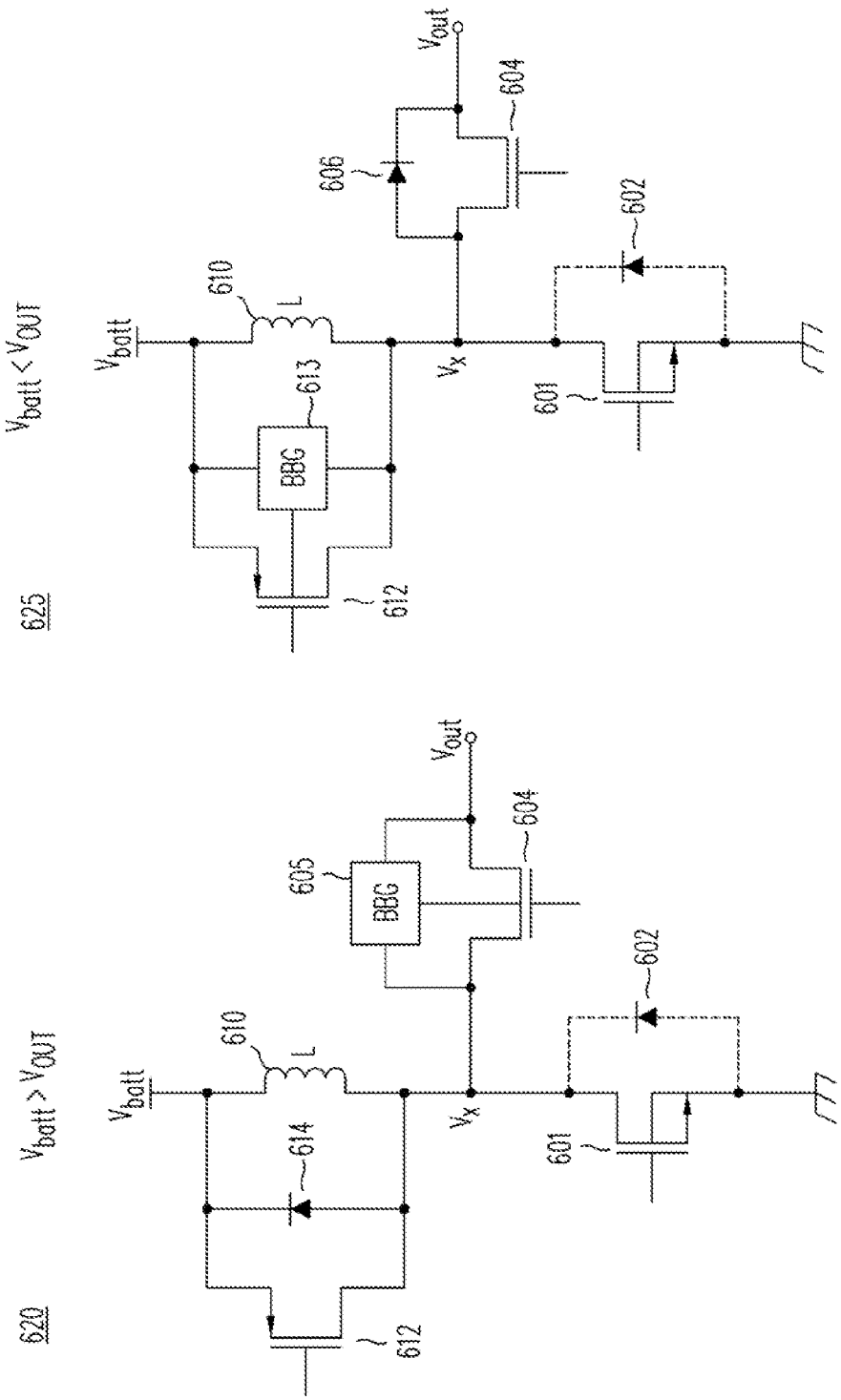

DC/DC CONVERTER USING SYNCHRONOUS FREEWHEELING MOSFET

CROSS-REFERENCE TO RELATED APPLICATIONS

This application is a continuation of application Ser. No. 13/166,546, now U.S. Pat. No. 8,278,887, which is a divisional of application Ser. No. 12/148,576, now U.S. Pat. No. 7,977,926, which claims the priority of Provisional Application No. 60/958,630. Each of the foregoing applications is incorporated herein by reference in its entirety.

This application is related to application Ser. No. 12/148,570, titled "Step-Down Switching Regulator With Freewheeling Diode," which is incorporated herein by reference in its entirety.

BACKGROUND OF THE INVENTION

Voltage regulation is commonly required to prevent variation in the supply voltage powering various microelectronic components such as digital ICs, semiconductor memories, display modules, hard disk drives, RF circuitry, microprocessors, digital signal processors and analog ICs, especially in battery powered applications like cell phones, notebook computers and consumer products.

Since the battery or DC input voltage of a product often must be stepped-up to a higher DC voltage, or stepped-down to a lower DC voltage, such regulators are referred to as DC-to-DC converters. Step-down converters are used whenever a battery's voltage is greater than the desired load voltage. Step-down converters may comprise inductive switching regulators, capacitive charge pumps, and linear regulators. Conversely, step-up converters, commonly referred to boost converters, are needed whenever a battery's voltage is lower than the voltage needed to power the load. Step-up converters may comprise inductive switching regulators or capacitive charge pumps.

Of the aforementioned voltage regulators, the inductive switching converter can achieve superior performance over the widest range of currents, input voltages and output voltages. The operation of a DC/DC inductive switching converter is based on the principle that the current in an inductor (coil or transformer) cannot be changed instantly and that an inductor will produce an opposing voltage to resist any change in its current.

The basic principle of an inductor-based DC/DC switching converter is to switch or "chop" a DC supply voltage into pulses or bursts, and to filter those bursts using a low-pass filter comprising and inductor and capacitor to produce a well behaved time-varying voltage, i.e. to change a DC voltage into an AC voltage. By using one or more transistors switching at a high frequency to repeatedly magnetize and demagnetize an inductor, the inductor can be used to step-up or step-down the converter's input voltage, producing an output voltage different from its input voltage. After changing the AC voltage up or down using magnetics, the output is then rectified back into a DC voltage and filtered to remove any ripple.

The transistors are typically implemented using MOSFETs with a low on-state resistance, commonly referred to as "power MOSFETs". Using feedback from the converter's output voltage to control the switching conditions, a constant, well-regulated output voltage can be maintained despite rapid changes in the converter's input voltage or output current.

To remove any AC noise or ripple generated by switching action of the transistors, an output capacitor is placed across the output terminal of the switching regulator. Together, the inductor and the output capacitor form a "low-pass" filter able to remove most of the transistors' switching noise before it reaches the load. The switching frequency, typically 1 MHz or more, must be "high" relative to the resonant frequency of the filter's "LC" tank. Averaged across multiple switching cycles, the switched inductor behaves like a programmable current source with a slow-changing average current.

Since the average inductor current is controlled by transistors that are either biased as "on" or "off" switches, power dissipation in the transistors is theoretically small and high converter efficiencies, in the 80% to 90% range, can be realized. Specifically, when a power MOSFET is biased as an on-state switch using a "high" gate bias, it exhibits a linear I-V drain characteristic with a low $R_{DS(on)}$ resistance, typically 200 milliohms or less. At 0.5 A for example, such a device will exhibit a maximum voltage drop $I_D \cdot R_{DS(on)}$ of only 100 mV despite its high drain current. Its power dissipation during its on-state conduction time is $I_D^2 \cdot R_{DS(on)}$. In the example given, the power dissipated while the transistor is conducting is $(0.5 \text{ A})^2 \cdot (0.2\Omega) = 50$ mW.

In its off state, a power MOSFET has its gate biased to its source, i.e. so that $V_{GS}=0$. Even with an applied drain voltage $V_{DS}$ equal to a counverter's battery input voltage $V_{batt}$, a power MOSFET's drain current $I_{DSS}$ is very small, generally well below one microampere and typically in the range of nanoamperes. The current $I_{DSS}$ primarily comprises junction leakage.

Thus a power MOSFET used as a switch in a DC/DC converter is efficient, since in its off condition it exhibits low currents at high voltages, and in its on state it exhibits high currents at a low voltage drop. Excepting switching transients, the $I_D \cdot V_{DS}$ product in the power MOSFET remains small, and power dissipation in the switch remains low.

A critical component in switching regulation is the rectifier function needed to convert, or "rectify", the synthesized AC output of the chopper back into DC. To ensure that the load never sees a reversal of polarity in voltage, a rectifier diode is placed in the series path of the switched inductor and the load, thereby blocking large AC signals from the load. The rectifier may be located topologically either in the high-side path somewhere between the positive terminal of the power or battery input and the positive terminal of the output, or on the low-side, i.e., in the "ground" return path. Another function of the rectifier is to control the direction of energy flow so that current only flows from the converter to the load and doesn't reverse direction.

In one class of switching regulators, the rectifier function employs a P-N junction diode or a Schottky diode. The Schottky diode is preferred over the P-N junction because it exhibits a lower forward voltage drop than P-N junctions, typically 400 mV instead of 700 mV, and therefore dissipates less power. During forward conduction, a P-N diode stores charge in the form of minority carriers. These minority carriers must be removed, i.e. extracted, or recombine naturally before the diode is able to block current in its reverse-biased polarity.

Because a Schottky diode uses a metal-semiconductor interface rather than a P-N junction, ideally it does not utilize minority carriers to conduct and therefore stores less charge than a P-N junction diode. With less stored charge, a Schottky diode is able to respond more quickly to changes in the polarity of the voltage across its terminals and to operate at higher frequencies. Unfortunately, Schottky diodes have several major disadvantages, one of which is that they exhibit a significant and unwanted off-state leakage current, especially at high temperatures. Unfortunately, there is a fundamental tradeoff between a Schottky diode's off-state leakage and its forward-biased voltage drop.

The lower its voltage drop during conduction, the leakier it becomes in its off state. Moreover, this leakage exhibits a positive voltage coefficient of current, so that as leakage increases, power dissipation also increases causing the Schottky diode to leak more and dissipate more power causing even more heating. With such positive feedback, localized heating can cause a hot spot to get hotter and "hog" more of the leakage till the spot reaches such a high current density that the device fails, a process known as thermal runaway.

Another disadvantage of Schottky diodes is the difficulty of integrating them into an IC using conventional wafer fabrication processes and manufacturing. Metals with the best properties for forming Schottky diodes are not commonly available in IC processes. Commonly available metals exhibit an excessively high voltage barrier, i.e. they produce a voltage drop that is too high. Conversely, other commonly available metals exhibit a barrier potential that is too low, i.e. they produce too much leakage when used in a Schottky diode.

Despite these limitations, many switching regulators today rely on P-N diodes or Schottky diodes for rectification. As a two-terminal device, a rectifier doesn't require a gate signal to tell it when to conduct or not. Aside from the transient charge storage issue, the rectifier naturally prevents reverse current, so energy cannot flow from the output capacitor and electrical load back into the converter and its inductor.

To reduce voltage drops and improve conduction losses, power MOSFETs are sometimes used to replace the Schottky rectifier diodes in switching regulators. Operation of a MOSFET as a rectifier is often accomplished by placing the MOSFET in parallel with a Schottky diode and turning on the MOSFET whenever the diode conducts, i.e. synchronous to the diode's conduction. In such an application, the MOSFET is therefore referred to as a synchronous rectifier.

Since a synchronous rectifier MOSFET can be sized to have a low on-resistance and a lower voltage drop than a Schottky diode, current is diverted from the diode to the MOSFET channel, and the overall power dissipation in the "rectifier" is reduced. Most power MOSFETs include a parasitic source-to-drain diode. In a switching regulator, the orientation of this intrinsic P-N diode must have the same polarity as the Schottky diode, i.e. cathode to cathode, anode to anode. Since the parallel combination of this silicon P-N diode and the Schottky diode only carry current for brief intervals, known as "break-before-make" intervals, before the synchronous rectifier MOSFET turns on, the average power dissipation in the diodes is low and the Schottky diode is often eliminated altogether.

Assuming that transistor switching events are relatively fast compared to the oscillating period of the regulator, the power loss during switching can in circuit analysis be considered negligible or alternatively treated as a fixed power loss. Overall, then, the power lost in a low-voltage switching regulator can be estimated by considering the conduction and gate drive losses. At multi-megahertz switching frequencies, however, the switching waveform analysis becomes more significant and must be considered by analyzing a device's drain voltage, drain current, and gate bias voltage drive versus time.

The synchronous rectifier MOSFET, unlike a Schottky or junction diode, allows current to flow bi-directionally and the timing of its gate signal must be precise to prevent reverse current flow, an unwanted type of conduction that lowers efficiency, increase power dissipation and heating, and may damage the device. By slowing down switching rates and increasing turn-on delays, efficiency can oftentimes be traded for improved robustness in DC/DC switching regulators.

Based on the above principles, present day inductor-based DC/DC switching regulators are implemented using a wide range of circuits, inductors, and converter topologies. Broadly they are divided into two major types of topologies, non-isolated and isolated converters.

The most common isolated converters include the flyback and the forward converter, and require a transformer or coupled inductor. At higher power, full bridge converters are also used. Isolated converters are able to step up or step down their input voltages, depending on the primary-to-secondary winding ratio of the transformer. Transformers with multiple windings can produce multiple outputs simultaneously, including voltages that are both higher and lower than the input. The disadvantage of transformers is they are large compared to single-winding inductors and suffer from unwanted stray inductances.

Non-isolated power supplies include the step-down Buck converter, the step-up boost converter, and the Buck-boost converter. Buck and boost converters are especially efficient and compact in size, particularly when operating in the megahertz frequency range where inductors of 2.2 µH or less may be used. Such topologies produce a single regulated output voltage per coil, and require a dedicated control loop and separate PWM controller for each output to constantly adjust switch on-times to regulate voltage.

In portable and battery-powered applications, synchronous rectification is commonly employed to improve efficiency. A step-up boost converter employing synchronous rectification is known as a synchronous boost converter. A step-down Buck converter employing synchronous rectification is known as a synchronous Buck regulator.

Non-Synchronous Versus Synchronous Boost Converter Operation

As illustrated in FIG. 1A, prior art boost converter 1 includes an N-channel power MOSFET 7, an inductor 4, a capacitor 3, a Schottky rectifier 2, and a pulse-width modulation (PWM) controller 6. Inductor 4, MOSFET 7 and rectifier 2 share a common node referred to here as the "$V_x$" node, sometimes referred as the $L_x$ node. Diode 5 is parasitic to MOSFET 7 and remains reverse-biased and off throughout regular operation of boost converter 1. Converter 1 is powered by an input voltage $V_{batt}$.

Through the switching action of power MOSFET 7, the voltage $V_x$ at the $V_x$ node switches over a range larger than the supply rail, exhibiting potentials alternating between approximately ground when MOSFET 7 is on and conducting current $I_{L(on)}$ and to slightly above $V_{OUT}$ when MOSFET 7 is off and a current $I_{L(off)}$ flows through rectifier 2. The waveform of $V_x$ for a conventional boost converter is illustrated by curve segments 31, 32, 38, 34, 35, 36 and 37 in graph 30 of FIG. 1D where $V_x$ while MOSFET 7 is conducting (segment 31) is given by the expression $I \cdot R_{DS(on)}$ and $V_x$ while MOSFET 7 is off (segment 38) is given by $(V_{OUT}+V_f)$. The output voltage $V_{OUT}$ is greater the input voltage $V_{batt}$. Without feedback and closed-loop control, converter 1 would drive $V_{OUT}$ to an increasingly higher level until diode 5 goes into avalanche breakdown, an unwanted and potentially damaging condition.

At time $t_1$, after duration $t_{on}$, inductor 4 drives the voltage $V_x$ positive, and depending on the design and layout of converter 1, some voltage overshoot and unwanted oscillations or ringing may result (segment 32). After an interval $t_{off}$ at time $t_2$, MOSFET 7 turns on, and after any stored charge is removed from diode 2, $V_x$ exhibits a negative transition and ringing (segment 35). The entire cycle repeats with a cycle time $T=(t_{on}+t_{off})$, which remains constant in fixed-frequency PWM converters and may vary in variable-frequency converters.

In a synchronous boost converter, the rectifier diode is replaced by a second power MOSFET. Synchronous boost converter 10, shown in FIG. 1B, includes a floating synchronous rectifier MOSFET 13 with an intrinsic parallel diode 15, an inductor 12, an output capacitor 14, and a low-side power MOSFET 11 with an intrinsic parallel diode 16. The gates of MOSFETs 11 and 13 are driven by break-before-make (BBM) circuitry 17 and controlled by a PWM controller 18 in response to a feedback voltage $V_{FB}$ from the output terminal of converter 10, present across filter capacitor 24. BBM operation is needed to prevent shorting out output capacitor 14.

The switching waveform at the $V_x$ node of synchronous converter 10, illustrated in graph 30 of FIG. 1D, is similar to that of non-synchronous boost converter 1 except for portion 33, where the voltage decreases during the time the synchronous rectifier MOSFET 13 is conducting. The waveform of graph 30 illustrates that the voltage while MOSFET 11 is conducting (portion 31) is given by the expression $(I \cdot R_{DS1(on)})$.

At time $t_1$, after duration $t_{on}$, inductor 12 drives the voltage $V_x$ positive, and depending on the design and layout of converter 10, the waveform may include some voltage overshoot and unwanted oscillations or ringing (portion 32), then settle to a voltage $(V_{OUT}+V_f)$, where $V_f$ equals the forward voltage drop across diode 15. After a break-before-make time interval $t_{BBM}$ as determined by BBM circuit 17, $V_x$ is reduced by conducting synchronous rectifier MOSFET 13 to a magnitude $(V_{OUT}+I \cdot R_{DS2(on)})$ (portion 33), reducing the power loss compared to dissipation in P-N diode 15.

Just before low-side MOSFET 11 is turned on at time $t_2$, synchronous rectifier MOSFET 13 is shut off, as shown by line segment 34, and $V_x$ returns to $(V_{OUT}+V_f)$. After an interval $t_{off}$, MOSFET 11 turns on, and after diode 15 recovers from any stored charge, $V_x$ exhibits a negative transition and depending on diode-recovery of P-N junction in diode 15, may exhibit an over-voltage spike 35. After that spike and subsequent ringing (portion 36), $V_x$ stabilizes at $(I \cdot R_{DS1(on)})$ (portion 37). The entire cycle repeats with a cycle time $T=(t_{on}+t_{off})$, which remains constant in fixed frequency PWM converters and may vary in variable frequency converters.

Floating synchronous rectifier MOSFET 13 may be N-channel or P-channel, while grounded low-side power MOSFET 11 is more conveniently implemented using an N-channel device. Diode 16 which remains off and reverse-biased during normal operation of converter 10, is a P-N diode intrinsic to low-side MOSFET 11. Since diode 16 does not conduct under normal boost operation, it is shown in dotted lines. Diode 15, intrinsic to synchronous rectifier MOSFET 13, becomes forward-biased whenever low-side MOSFET 11 is off, but carries substantial current only when synchronous rectifier MOSFET 13 is also off. A Schottky diode may be included in parallel with MOSFET 13 but with series inductance may not operate fast enough to divert current from the forward-biased intrinsic diode 15.

Defining the duty factor D of DC/DC converter 10 as the time that energy flows from the battery or power source into converter 10, i.e. the time when low-side MOSFET switch 11 is on and inductor 12 is being magnetized, then the output-to-input voltage ratio of a boost converter 10 is inversely proportionate to one minus the duty factor, i.e.

$$\frac{V_{out}}{V_{in}} = \frac{1}{1-D} \equiv \frac{1}{1-\frac{t_{on}}{T}} = \frac{T}{T-t_{on}}$$

This output-to-input voltage transfer characteristic as a function of the duty factor D is illustrated graphically in FIG. 1C by curve 23. While this equation describes a wide range of conversion ratios, a boost converter cannot smoothly approach a unity transfer characteristic without requiring extremely fast devices and circuit response times. Considering finite break-before-make intervals and non-zero MOSFET rise and fall times, the discontinuity 22 to a unity transfer 21 occurs because there is inadequate time at very low duty factors to react. Instead the converter jumps from some minimum duty factor to 0% and loses its ability to regulate.

Moreover, at high duty factors and high load currents, the time available for inductor 12 to deliver its energy to capacitor 14 and the load is limited and MOSFET 13 must carry high-currents for short durations. These high current spikes degrade performance and lower converter efficiency. Considering these factors, the duty factor of a boost converter is in practice limited to the range of 5% to 75%.

Current Dependence of Synchronous Boost Converters:

To better understand the limitations imposed by current and by duty factor on the conversion ratio and efficiency of a boost converter, the energy flow from input to output must be considered in detail. As shown in FIG. 2A, an inductor 52 is magnetized with a current $I_L$ while low-side MOSFET 51 is on, and the node $V_x$ is biased near ground at a voltage 71 as illustrated in graph 70 shown in FIG. 2C.

Also as shown in graph 75 of FIG. 2C, during the time $t_{on}$ the inductor current $I_L$ ramps from point 76 to 77 linearly as inductor 52 stores energy in a magnetic field of magnitude $$E_L = \tfrac{1}{2} \cdot L \cdot I_L^2$$

During this interval, synchronous rectifier MOSFET 53 is off and diode 54 is reverse-biased, so no energy flows from the battery or the inductor to load 56 or capacitor 55. Instead, capacitor 55 must supply load 56 with the necessary current as its voltage drops from 79 to 80, as shown in graph 78. During the same interval $t_{on}$, capacitor 55 loses energy and charge of magnitude $$\Delta Q = C \cdot \Delta V = \int_0^{t_{on}} I_{OUT} \cdot dt$$

To maintain steady state operation, this charge must be replenished in the charge transfer cycle when MOSFET 51 is off. As shown in FIG. 2, during the time $t_{off}$, the voltage $V_x$ flies up, forward-biasing diode 54 and transferring charge and energy to capacitor 55 and load 56. This condition is illustrated in graph 70 between times $t_1$ and T, where $V_x$ is equal to $(V_{OUT}+V_f)$, i.e. voltage 73, when synchronous rectifier MOSFET 53 is not conducting. When synchronous rectifier MOSFET 53 is conducting, $V_x$ shown by line 72 is equal to $(V_{OUT}+I \cdot R_{DS(HS)})$, reducing the power losses in diode 54 and reducing the amount of energy removed from inductor 52. The energy transferred to capacitor 55, however, remains the same.

During this $t_{off}$ interval from $t_1$ to T, the inductor current decays from its peak 77 towards a minimum value 76, while the output voltage $V_{OUT}$ grows from its minimum value 80 toward its peak voltage 79 as illustrated in graphs 75 and 78, respectively.

Using the principle of charge conservation $$\Delta Q = C \cdot \Delta V = \int_{t_1}^{T} I_L \cdot dt = \frac{I_{Lave} \cdot t_{off}}{2}$$

So if in the ripple $\Delta V$ is kept small and the output well regulated, the shorter the time $t_{off}$, the higher $I_{Lace}$ must be. In other words, with increasingly high duty factors, MOSFET 54 must carry increasing higher currents.

Current Dependence of Synchronous Boost Converter Frequency

In the event that the load current decreases, the pulse width during $t_{on}$ when MOSFET 51 is on decreases and at some specific current it reaches a minimum pulse width. For any current decline beyond this minimum pulse width, to maintain regulation the off-time of MOSFET 51 must increase either by decreasing the oscillator frequency or by skipping pulses, i.e. by not turning on synchronous rectifier MOSFET 51.

In the event that the rime $t_{off}$ increases, then for fixed on-time operation the converter's frequency drops. As shown by graph 88 in FIG. 2D, the inductor current ranges from a minimum value of zero at points 89 and 91 to a peak value at point 90. Specifically, whenever the synchronous rectifier MOSFET 51 is on, the inductor current equals the load current. Unavoidably, as shown in graph 88 the average value of $I_L$ drops to a much lower value than in normal operation shown in previously in graph 75.

Except for the break-before-make interval when both low-side and synchronous rectifier MOSFETs 51 and 53 are briefly off, a synchronous boost converter operating within the range of currents shown by FIGS. 2C and 213 has only two modes of operation—magnetizing the inductor or transferring energy to its output. These modes are illustrated in Table 1 when this oscillating frequency corresponds to a frequency approaching 20 kHz or below.

Under such conditions, the converter begins to oscillate within the audio frequency range and can be heard audibly through any sound amplification circuitry and even by listening to the printed-circuit board itself. Unfortunately, without being able to vary the lowest frequency, the output capacitor will over charge and its voltage will exceed the specified tolerance range for the output voltage.

Current Reversal in Synchronous Boost Converters

Aside from audio susceptibility and audible noise, other problems occur at very low current load conditions. Specifically, at lower currents than those depicted in FIG. 2D, a new and problematic condition occurs, as shown in FIG. 2E. Assuming $t_{on}$ is already at its minimum duration, the inductor current ramps (line 117) to its peak value at point 118, then if the current ramps down (line 119) to point 120 it actually reaches zero. Leaving the synchronous rectifier MOSFET 53 on beyond this point actually allows the inductor current to reverse direction, flowing from output capacitor 55 back into inductor 52. The current is negative in this condition as shown by line segment 121 and may reach a peak reverse value 122 before changing direction again. Current flowing the wrong direction in inductor 52 wastes energy and lowers overall efficiency. Corresponding to this current reversal, the voltage $V_X = (V_{OUT} + I \cdot R_{DS})$ drops below $V_{OUT}$ at point 107 or anytime $I_L$ is negative, as shown by dashed line segment 108 in graph 100.

In order to prevent reverse current in the synchronous rectifier, the only option in the prior art synchronous boost converter is to turn it off. This action involves detecting the onset of current reversal and shutting off synchronous rectifier MOSFET 53 at time $t_2$. Because P-N diode 54 cannot normally conduct in the reverse direction, the inductor current at point 120 reaches zero and stays at zero shown by line

TABLE 1

| Boost Converter Energy Flow (Normal) | Low-Side MOSFET | High-Side MOSFET | Conduction Mode | Inductor Current | Output Voltage |
| --- | --- | --- | --- | --- | --- |
| Magnetizing Inductor | On | Off | Continuous | $I_{Lmax} > I_{Lmin}$ | Declining |
| Transferring to Output | Off | On | Continuous | $I_{Lmin} \geq 0$ | Increasing |

As described, in a conventional synchronous boost converter energy is either flowing into the inductor from the battery input or from the inductor to the load. Below some threshold of current corresponding to the onset of light load operation, the boost converter's operating frequency necessarily varies with load current. One major problem arises 122 for the remaining duration of polarity reversal, i.e. until time T. This type of converter operation is known as discontinuous conduction, identical to the operation of a non-synchronous boost converter operating under light load conditions. Table 1 above is then modified to reflect that the converter operates in three states, as shown in Table 2.

TABLE 2

| Converter Energy Flow (Light Load) | Low-Side MOSFET | HighSide MOSFET | ConductionMode | Inductor Current | Output Voltage |
| --- | --- | --- | --- | --- | --- |
| Magnetizing Inductor | On | Off | Continuous | $I_{Lmax} > I_{Lmin}$ | Declining |
| Transferring to Output | Off | On | Continuous | $I_{Lmin} \geq 0$ | Increasing |
| Current Reversal | Off | Off | Discontinuous | 0 | Declining |

By shutting off the synchronous rectifier MOSFET and entering discontinuous conduction, the converter efficiency in light load operation is improved. The onset of discontinuous conduction is not without problems. Referring again to graph 100 in FIG. 2E, shutting off the synchronous rectifier MOSFET 53 at time $t_2$ results in an unwanted oscillation in $V_x$ (curve 109) before $V_x$ finally settles down to the voltage ($V_{OUT}+V_f$), as shown by line 110.

The cause for this instability is residual energy stored in inductor 52 and in the diffusion and junction capacitance of forward-biased P-N diode 54 at the time synchronous rectifier MOSFET 52 is shut off. At that moment $I_L$, while close to zero, may be slightly positive or negative because synchronous rectifier MOSFET 53 cannot be shut off perfectly at its zero-current crossing. The energy stored in these passive elements forms a tuned circuit or RLC tank circuit with output capacitor 55 and load 56. The oscillation frequency of this tuned circuit and its damping is therefore load dependent. Moreover, the converter's overall loop stability also changes when it enters discontinuous conduction. Unwanted instability and poor dynamic response can result, depending on the selection of the converter's passive elements.

Another major problem with operating the inductor under starved current conditions is its inability to react to rapid load transients. Since the inductor current is so low, reacting to a sudden change in load current requires finite time to reestablish current in the inductor. This time could exceed several switching cycles, during which capacitor 55 must satisfy the current demands of load 56. Unless capacitor 55 is intentionally oversized for step response conditions, a conventional boost converter operating in light load near or in discontinuous conduction will exhibit extremely poor regulation during a step load transient.

Unfortunately no means exist in a boost or synchronous boost converter to maintain a higher inductor current and limit the converter's operating frequency range during light load conditions.

P-N Rectifier Imposed Limitations in Prior-Art Synchronous Boost Converters

Another set of limitations in the operation of prior-art synchronous boost converters derive from the presence of the P-N rectifier diode in parallel with the synchronous rectifier MOSFET. While it may at first glance appear this diode is an unavoidable consequence of the design and fabrication of the power MOSFET structure used as the synchronous rectifier, it is in fact an unavoidable and necessary element for synchronous boost converter operation.

Referring again to the conventional synchronous boost converter 10 shown in FIG. 1B, P-N diode 15 is electrically in parallel to synchronous rectifier MOSFET 13, regardless of whether MOSFET 13 is a P-channel or an N-channel device. The polarity of diode 15 in a positive output boost converter is extremely important, having its cathode connected to the output and its anode connected to the $V_x$ node, so that it remains off and reverse-biased whenever low-side MOSFET 11 is on, $V_x$ is near ground and inductor 12 is magnetizing, a condition with an equivalent electrical circuit shown in circuit 50 of FIG. 2A. If its polarity were reversed, turning on the low-side MOSFET would forward bias the diode and undesirably pull down the output voltage.

FIG. 2B illustrates that the P-N rectifier diode 54 is forward-biased whenever low-side MOSFET 51 is off and therefore $V_x > V_{OUT}$, regardless of whether synchronous rectifier MOSFET 53 is on or off, MOSFET 53 may shunt current around diode 54, but it is nonetheless forward-biased whenever low-side MOSFET 51 is off. At first inspection this feature appears fortuitous since it limits the maximum voltage of node $V_x$ to a magnitude of ($V_{OUT}+V_f$) during the break before make interval, when both MOSFETs 51 and 53 are off.

Unfortunately, the presence of rectifier diode 54 limits the output to a voltage greater than $V_{batt}$, making it difficult to regulate an output voltage near the input voltage whenever $V_{OUT} \approx V_{batt}$. This issue arises from the moment when power is first applied to the converter 50 and both MOSFETs 51 and 53 are momentarily off and non-conducting. Because initially $V_{batt}$ is near ground and capacitor 55 is discharged, the application of power $V_{batt}$ to the converter's input instantly forward biases diode 54 and charges $V_{OUT}$ up to a voltage approximately equal to $V_{batt}$.

Since $V_{OUT} \approx V_{batt}$ before MOSFETs 51 and 53 have even started switching, then further operation can only further increase the output voltage. There is no lossless means by which to charge capacitor 55 only to a voltage part-way up, i.e. to a voltage smaller than the input voltage $V_{batt}$. Accordingly, as shown in FIG. 1C, the minimum ($V_{OUT}/V_{IN}$) transfer ratio is unity, as illustrated by line 21. The discontinuous jump 22 represents the minimum duty factor to regulate the output voltage under closed loop conditions, above which converter 50 behaves predictably according to curve 23.

The height of discontinuity 22 can be interpreted as a quantum of energy or charge corresponding to the minimum possible pulse duration. If that minimum duration stores energy $E_L$ in the inductor 52 corresponding to a current $I_L$, then that same energy dumped into the output capacitor 55 cha capacitor 55 charges capacitor 55 with a finite number of coulombs $\Delta Q$ of charge, resulting in a finite increment or step in voltage $\Delta V = (\Delta Q/C)$ in one switching cycle. Since this voltage is added atop of the charge already present on capacitor 55 resulting from unavoidable pre-charging when power was first applied, then it follows that $V_{OUT} \geq (V_{IN}+\Delta V)$ and therefore $$\frac{V_{OUT}}{V_{IN}} = \frac{V_{IN} + \Delta V}{V_{IN}} = \left(1 + \frac{\Delta V}{V_{IN}}\right) > 1$$

In other words, with a conventional synchronous boost converter it is impossible to regulate $V_{OUT}$ within a quantum $\Delta V$ above $V_{IN}$, let alone produce an output voltage less than the input voltage.

Another major problem with the conventional boost or synchronous boost converter occurs at startup. Referring again to FIG. 2B, after the application of power pre-charges capacitor 55 to the input voltage, the very first switching cycle where $V_x$ exceeds $V_{batt}$, diode 54 becomes forward-biased and removes the little energy stored in inductor 52 to charge capacitor 55. If load 56 consumes all the charge on capacitor 55 before the boost circuit magnetizes inductor 52, then in the next cycle inductor 52 again charges a capacitor with no added charge above it pre-charge condition, i.e. the net $\Delta V=0$ after one cycle.

As a result of this circuit loading, $V_{OUT}$ remains at $V_{batt}$ and the boost circuit never starts up. The boost converter loaded by electrical load 56 is stuck in a permanent condition, unable to boost the output voltage to the desired higher voltage. This problem is especially severe when $V_{batt}$ is at its minimum condition when the resistance of MOSFET 51 is higher and unable to establish adequate current in inductor 52. For example in a one-cell NiMH or dry-cell battery, only 0.9V may be available to turn on the MOSFETs and achieve startup.

One possible remedy to the loaded startup problem may appear to be to leave MOSFET 51 on for a longer duration during startup, but then inductor 52 may conduct too much current, store too much energy, and cause $V_{OUT}$ to overshoot. Overshoot can cause instability, oscillations and possibly damage load 56.

In the event that too much energy is stored in inductor 52, no remedy exists in a conventional boost or synchronous converter to remove or siphon off the extra energy. If synchronous rectifier MOSFET 53 is turned on, the output voltage $V_{OUT}$ will continue to rise to an unwanted value as inductor 52 transfers its energy into capacitor 55. If MOSFET 51 is turned on, even more energy is stored in inductor 52, worsening the problem. Even if both MOSFETs 51 and 53 are left off, diode 54 is still forward-biased and inductor 52 will continue to overcharge capacitor 55. And since the load current of load 56 is not known and may vary, there is no way to insure reliable startup without the risk of an output voltage that is too high.

Since rectifier diode 54 is the cause of the problem, one choice may be to eliminate it, as shown in circuit 130 of FIG. 3A. In this circuit synchronous rectifier MOSFET 133 is off and no forward-biased rectifier is present across it. Instead two back to back diodes 136a and 136b are included to represent the lack of the rectifier in the circuit. After MOSFET 131 is turned on for some duration to magnetize inductor 132 and current 150 ramps, as shown in FIG. 3B, switching off MOSFET 131 causes a major problem.

At the time the current in inductor 132 is interrupted at point 151 and time $t_1$, the voltage $V_x$ jumps without limit. Without a forward-biased rectifier across MOSFET 133, $V_x$ is no longer limited to $(V_{OUT}+V_f)$ and $V_x$ continues to increase until diode 137 goes into avalanche breakdown, oscillating (curve 156) and settling to a voltage $BV_{DSS}$ (curve 157), while the current in inductor 132 ramps back down (curve 152). The energy is then removed from inductor 132 in a fast and very noisy manner known as unclamped inductive switching or UIS. After the energy is removed, at time $t_2$ the voltage returns to $V_{batt}$ (curve 158), the circuit's input condition. In addition to the fact that the energy was lost, dissipated as heat in diode 137, there is a good chance that MOSFET 131 may be damaged or destroyed from the high currents, voltages, and temperature present simultaneously during the UIS transient.

In other words, despite the limitations imposed by the rectifier diode in a synchronous boost converter, there is no simple way to remove it from prior art circuit topologies without causing UIS related problems and efficiency loss.

Summary of Problems in Conventional Boost Converters

Prior art boost and synchronous boost switching regulators both suffer from numerous limitations intrinsic to their circuit topology adversely affecting efficiency, noise, stability, transient capability and more. These problems include undesirable variable frequency operation, audio noise, the need for current reversal detection circuitry, unwanted oscillations when turning off the synchronous rectifier MOSFET to prevent current reversal, poor transient regulation in light load operation, and the inability to regulate at low-duty-factor and unity voltage conversion ratios.

Especially problematic is the fact that the inductor current, operating frequency, and converter stability are particularly sensitive to the load current and the complex equivalent impedance of the load being powered by the boost converter. Achieving reliable start-up into a full load current from a low input voltage greatly limits prior art step-up converters. Overmagnetizing the inductor creates a problem of overvoltage conditions on the output that may damage the converter's load. Eliminating the rectifier diode to achieve step-down operation or to improve startup by unloading the circuit creates additional and even greater problems due to unclamped inductive switching, noise, efficiency loss and potential device damage.

What is needed is an alternative step-up topology that ameliorates or eliminates these aforementioned problems without adding undue complexity, cost, or creating new problems achieving converter instability or reliable operation.

An even more ambitious goal of such an improved converter and regulator is not only to regulate at or above unity voltage conversion ratios, i.e. when $V_{OUT} \geq V_{batt}$, but to be able to step-down or step-up an input to regulate a desired output voltage from a changing input source without utilizing complex and inefficient Buck-boost converter circuitry and techniques and without the need to change operating modes whenever $V_{OUT} \approx V_{batt}$.

BRIEF SUMMARY OF THE INVENTION

In a DC/DC converter according to this invention an inductor and a low-side switch, preferably a MOSFET, are connected in a series path between a DC input voltage and circuit ground. A $V_x$ node is located in the series path between the inductor and the low-side switch. An energy transfer switch, preferably a MOSFET, is connected between the $V_x$ node and an output terminal of the DC/DC converter, and typically a capacitor is connected between the output terminal and circuit ground. In accordance with the invention, a freewheeling switch, preferably a MOSFET, is connected in parallel with the inductor.

The freewheeling switch is closed while the low-side and energy transfer switches are open, thereby providing a third stage in the operation of the converter, in addition to the conventional magnetizing and energy transfer stages. During the third stage, the inductor current circulates or "freewheels" through the freewheeling switch, and energy is not transferred into the inductor from the battery input or from the inductor to the output terminal. This provides far greater flexibility in operating the converter, since the converter does not need to be either receiving energy from its input terminal or transferring energy to its output terminal. The overall length of an operational cycle (i.e. the frequency of the converter) is therefore freed from dependency on the lengths of the magnetizing and energy transfer stages. Moreover, by appropriate adjustment of the relative durations of the magnetizing, energy transfer and freewheeling stages, a DC/DC converter of this invention can be operated to either step-up or step-down the input voltage or to transition from step-up to step-down operation, or vice versa. Further, the existence of a current path in parallel with the inductor, through the freewheeling switch, allows the output capacitor to be precharged, before the switching operation of the converter begins, thereby overcoming the problems of starting up a converter while the load is drawing current. The problems of undesirable variable frequency operation, audio noise, the need for current reversal detection circuitry, unwanted oscillations when turning off the synchronous rectifier MOSFET to prevent current reversal, poor transient regulation in light load operation, and the inability to regulate at low-duty-factor and unity voltage conversion ratios are eliminated or ameliorated in a DC/DC converter according to the invention.

Because the converter may be operated in either step-up or step-down mode, the normal source-body shorts in the freewheeling and energy transfer MOSFETs are preferably eliminated. This may be accomplished either by controlling the voltage on the body of each MOSFET to avoid any forward-biased P-N junction, or by providing a "body bias generator" to automatically short the body voltage to either the source or the drain, depending on the relationship between the source and drain voltages in each MOSFET. For example, in an N-channel MOSFET (having a P-type body), the body bias generator shorts the body to the source/drain terminal having the lower voltage, thereby ensuring that the P-N junction between the body the remaining source/drain terminal is reverse-biased.

If the converter is operated only in step-tip mode, i.e. as a freewheeling boost converter, the energy transfer switch may comprise a MOSFET with an intrinsic parallel diode, or may comprise a rectifier diode.

To ensure that the $V_x$ node is clamped during break-before-make intervals, switched diodes may be connected in parallel with the freewheeling and energy transfer switches with control circuitry to ensure that the diodes are connected as required to prevent unclamped inductive switching (UIS) and avalanching of the low-side MOSFET. In some embodiments, this function is performed by diodes that are already present in the body bias generators, and in other embodiments the clamping function for both the freewheeling and energy transfer MOSFETs is performed by a single switched diode connected to the $V_x$ node.

Another aspect of the invention is a method of converting a DC input voltage to a DC output voltage. The method comprises applying the DC input voltage to a first terminal of an inductor while coupling a second terminal of the inductor to a circuit ground so as to magnetize the inductor; disconnecting the second terminal of the inductor from the circuit ground; coupling the second terminal of the inductor to a capacitor and an output terminal so as to provide the DC output voltage at the output terminal; disconnecting the second terminal of the inductor from the capacitor and the output terminal; and connecting the first and second terminals of the inductor together while the second terminal of the inductor is disconnected from the capacitor and the output terminal.

Yet another aspect of the invention is a method of starting a DC/DC converter comprising connecting an input voltage to the inductor and shunting a current around the inductor so as to pre-charge the capacitor to a predetermined voltage.

In another embodiment the current in the inductor is ramped to a value greater than the average load current Once a desired inductor current is achieved, the low-side MOSFET is turned off and the freewheeling switch is closed, allowing the inductor current to freewheel. Freewheeling is interrupted to transfer charge to the output whenever the output voltage sags below a preset voltage, or to magnetize the inductor when the inductor current drops below the desired level. By maintaining an inductor current greater than the average load current, regulation during load transients is significantly improved.

BRIEF DESCRIPTION OF THE SEVERAL VIEWS OF THE DRAWING

FIG. 12B is a circuit diagram of a gate drive circuit for a P-channel synchronous rectifier MOSFET.

FIG. 12C is a circuit diagram of a gate drive circuit for an N-channel synchronous rectifier MOSFET.

FIG. 15 contains graphs showing the waveforms of an unclamped freewheeling up-down converter in step-up and step-down operation during start-up.

FIG. 17A is an equivalent circuit diagram of an adaptively clamped synchronous freewheeling up-down converter in step-down operation.

FIG. 17B is an equivalent circuit diagram of an adaptively clamped synchronous freewheeling up-down converter in step-up operation.

DETAILED DESCRIPTION OF THE INVENTION

Figure 4:
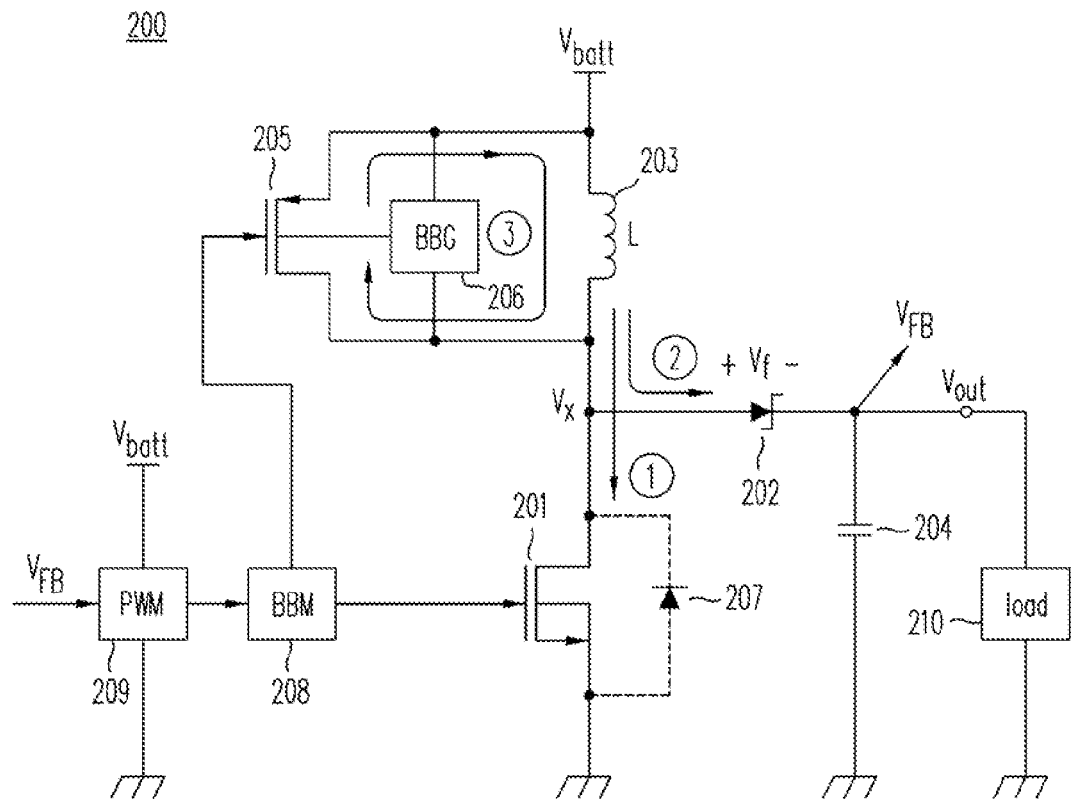
FIG. 4 is a circuit diagram of a non-synchronous freewheeling boost converter in accordance with the invention.

FIG. 4 illustrates an embodiment of a freewheeling boost converter and switching voltage regulator made in accordance with this invention. As shown, freewheeling boost converter 200 comprises a low-side power MOSFET 201, an inductor 203, a capacitor 204, a rectifier diode 202, a freewheeling power MOSFET 205 including a body-bias-generator 206, a break-before-make (BBM) gate buffer 208 and a pulse-width modulation (PWM) controller 209. Using feedback $V_{FB}$ from the output of converter 200, operation of PWM controller 209 controls the on-time of MOSFETs 201 and 205 to regulate a specified output voltage $V_{OUT}$. Inductor 203 is coupled to an input voltage, in this case a battery voltage $V_{batt}$, while low-side MOSFET 201 is coupled to ground. Ground is a circuit ground which could be actual ground or any other voltage; the potential difference between $V_{batt}$ and ground represents the input DC voltage. Converter 200 drives a load 210.

This output is regulated over a specified range of input voltages, load currents, and temperatures. In this regard, converter 200 is a switching voltage regulator. (All switching voltage regulators may also be considered voltage converters, although the converse is not necessarily true). No effort will be made to distinguish between a switching regulator and a switching converter.

In converter 200, low-side MOSFET 201 typically comprises an N-channel device with a source-body short and an integral diode 207 parallel to the source drain terminals of MOSFET 201. Because the source of MOSFET 201 is shorted to its body, the intrinsic P-N junction comprising the N+ drain and P-type body forms diode 207 in parallel to the transistor's drain terminals. Under normal operation, $V_x$ remains positive, and diode 207 remains reverse-biased and non-conducting. Since diode 207 does not conduct, it is illustrated as a dotted line.

Rectifier diode 202 has its anode hardwired to the $V_x$ node and its cathode connected to the output terminal. Rectifier diode 202 preferably comprises a Schottky diode and may comprise a discrete device fabricated separately from MOSFETs 201 and 205. Rectifier diode 202 becomes forward-biased only when both MOSFETs 201 and 205 are both off, otherwise it remains reverse-biased and non-conducting during other operating conditions of converter 200.

Freewheeling MOSFET 205 is connected in parallel to inductor 203 and is turned on to prevent the forward-biasing of diode 202 whenever low-side MOSFET 201 is off and capacitor 204 is charged to its target voltage. Freewheeling MOSFET 205 may be P-channel or N-channel device with appropriate changes in gate drive circuitry included within break-before-make circuit 208. In a preferred embodiment, freewheeling MOSFET 205 is a P-channel MOSFET driven by a CMOS gate buffer powered by $V_{batt}$.

Alternatively, freewheeling MOSFET 205 may comprise an N-channel device driven by a CMOS gate buffer powered by $V_{out}$. In another alternative embodiment, freewheeling MOSFET 205 may comprise an N-channel device powered by a bootstrap gate drive circuit. Using a bootstrap gate drive for freewheeling MOSFET 205 may impose certain limitations on the duration of its conduction, in particular the need to periodically refresh the bootstrap capacitor's charge. Detailed implementation of gate drive circuitry for MOSFET 205 is described below. An N-channel MOSFET is advantageous in higher current applications since, for the same die size and cost, N-channel MOSFETs have lower resistances than P-channel MOSFETs with comparable electrical specifications.

For proper operation of freewheeling boost converter 200, freewheeling MOSFET 205 preferably does not include a P-N diode in parallel to its source-drain terminals, regardless of whether the freewheeling MOSFET 205 is an N-channel or P-channel device. The presence of a parallel diode in any polarity may interfere with the operation of converter 200. For example, if a P-N diode is permanently present across freewheeling MOSFET 205, with its cathode connected to $V_{batt}$, the voltage at $V_x$ is clamped to a maximum positive value of $(V_{batt}+V_f)$ and this may prevent $V_{out}$ from exceeding $V_{batt}$, i.e. it may prevent step-up conversion. Conversely, if a P-N diode is permanently present across freewheeling MOSFET 205 with its anode connected to $V_{batt}$, the voltage at $V_x$ is clamped to a minimum voltage of $(V_{batt}-V_f)$. This may cause high energy dissipation whenever low-side MOSFET 201 is conducting and prevent inductor 203 from being magnetized, thereby preventing operation of converter 200.

To eliminate unwanted diode conduction, a body-bias-generator 206 guarantees that no forward-biased P-N diode is present in parallel to the source-drain terminals of freewheeling MOSFET 205. Alternatively, an N-channel. MOSFET with a grounded body terminal may be used to eliminate the need for body-bias-generator 206.

Operation of freewheeling boost converter 200 comprises an alternating sequence of (1) magnetizing the inductor 203, (2) transferring energy by charging the output capacitor 204, and (3) freewheeling. During freewheeling, energy is neither transferred from the battery to the inductor 203 nor transferred from the inductor 203 to the output capacitor 204. Instead, current is allowed to recirculate in the inductor 203 without interacting with the load 210 or the battery or other power source of converter 200. The term "freewheeling" is borrowed from mechanical devices that store energy in a spinning wheel and periodically transfer energy into and out of the spinning wheel.

During normal operation of converter 200, the drain-source bias across freewheeling MOSFET 205 alternates between two polarities, depending on the conduction condition of low-side MOSFET 201. When low-side MOSFET 201 is on and conducting, $V_x$ is biased near ground so that $V_{batt} > V_x$. When low-side MOSFET 201 is off and not conducting, $V_x$ flies up to a voltage equal to $(V_f + V_{OUT})$, $V_f$ being the forward voltage drop across diode 202, so that $V_x > V_{batt}$ and the source-drain polarity across MOSFET 205 is reversed. In either polarity, body-bias-generator 206 prevents any P-N junction in freewheeling MOSFET 205 from becoming forward-biased. Freewheeling MOSFET 205 is in one embodiment, of sufficiently low on-resistance in its "on" state that it carries the entire current flowing in inductor 203 with a sufficiently low voltage drop to avoid significant power loss. As a result, the current in inductor 203 can recirculate through MOSFET 205 for extended durations without losing significant energy.

As in a conventional boost converter, the output voltage $V_{OUT}$ is controlled by the on-time of low-side MOSFET 201 relative to the switching period, whereby converter 200 follows the same voltage conversion equation described previously for a boost converter, namely $$\frac{V_{out}}{V_{in}} = \frac{1}{1-D} \equiv \frac{1}{1-\frac{t_{on}}{T}}$$

where T is the period of the clock or ramp generator in PWM controller 209 and $V_{in}$ is the input labeled $V_{batt}$, which may be battery powered, or be powered by the output of any other power supply, DC/DC converter, AC/DC adapter, or power source within the specified operating voltage range of the components used to implement converter 200.

Since $t_{on} < T$ the output voltage of freewheeling boost converter 200 is necessarily higher than its input voltage and converter 200 is strictly a step-up converter with a positive output limited above $V_{batt}$. Speed limitations of MOSFET switching practically limit duty factors to the range of 5% to 95% for clock frequencies up to several megahertz in PWM controller 209. Above those frequencies, the duty factor range becomes narrowed because of propagation delays in the control loop. In practice, the magnitude of the current pulses conducted in rectifier diode 202 may become prohibitive for duty factors greater than 75%, i.e. for up conversion ratios exceeding 4× the input voltage.

PWM controller 209 is not restricted to fixed frequencies, but may also be operated with varying frequencies, e.g. with fixed on-time and variable off-time or alternating between PWM and variable frequency modes. It can also be operated in hysteretic mode, by charging the output capacitor 204 to some maximum voltage then letting it decay to some minimum value and repeating the cycle. Variable frequency or hysteretic operation, while consuming less current, typically exhibits increased output voltage ripple over fixed frequency operation. Variable frequency converters also have the disadvantage that the produce varying spectra of conducted and radiated electrical noise which may adversely impact the operation of communication and radio circuitry.

Non Synchronous Freewheeling Up-Converter Operation:

As described previously, using the feedback voltage $V_{FB}$ from the output terminal of converter 200, PWM controller 209 controls the on-time of MOSFET 201 and the duration when diode 202 conducts to regulate a specified output voltage $V_{OUT}$. Freewheeling conduction occurs when the inductor 203 has adequate current and capacitor 204 has adequate charge. The stages of operation of converter 200 are summarized in Table 3.

TABLE 3

| State/Phase | Condition | Energy | LS | Diode | FW |
|---|---|---|---|---|---|
| (1) Magnetizing | Low Inductor Current, $I_L < I'_L$ | to L | On | RB | Off |
| (2) Transfer | Low Output Voltage, $V_{OUT} < V'_{OUT}$ | to C | Off | FB | Off |
| (3) Freewheel | Neither | Neither | Off | RB | On |

The principle of operation of the freewheeling up converter is to control the current in inductor 203 with the on-time of low-side MOSFET 201, and to control the time when output capacitor is charged by controlling the time when both MOSFETs 201 and 205 are both off. The purpose of freewheeling MOSFET 205 is to provide a third state when neither diode 202 nor low-side MOSFET 201 conducts but where the voltage on the $V_x$ node does not exhibit large transients or drive reverse-biased diode 207 into avalanche. One possible sequence of operation for the freewheeling up converter is illustrated in FIGS. 5A-5C, with waveforms shown in FIG. 6, including graph 260 illustrating $V_x$ graph 270 illustrating $V_{OUT}$ and graph 280 illustrating the current $I_L$ in inductor 203 and the current $I_{fw}$ in freewheeling MOSFET.

Figure 5A:
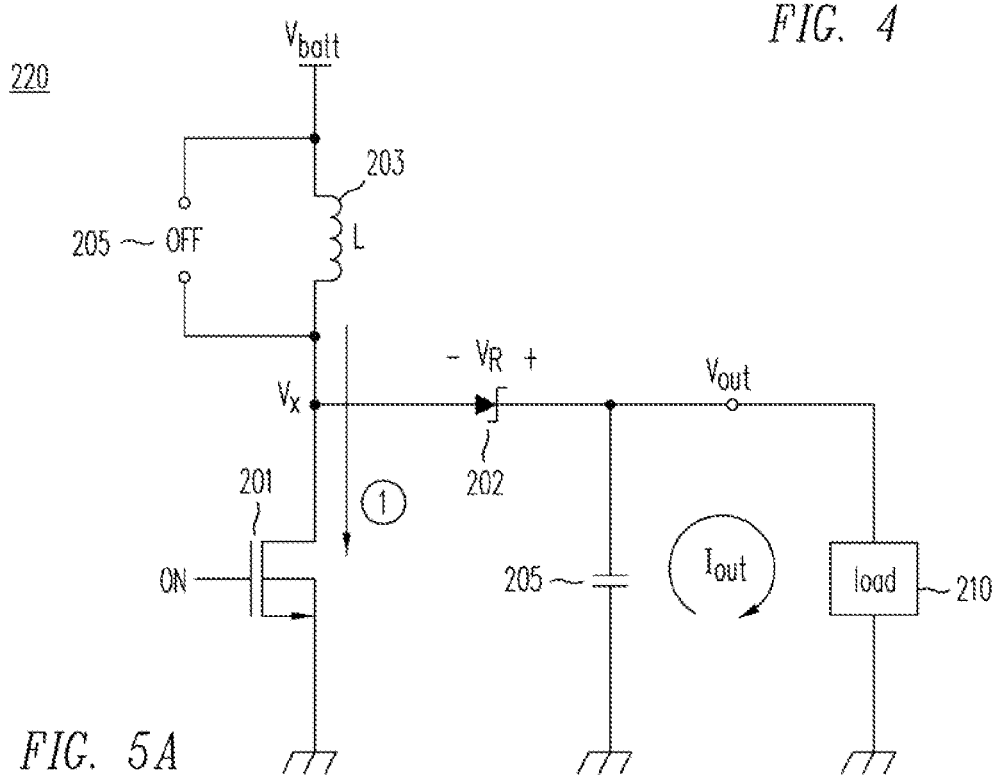
FIG. 5A is an equivalent circuit diagram of a non-synchronous freewheeling boost converter in the stage wherein the inductor is being magnetized.

Starting with first phase of operation 220, shown in FIG. 5A, where MOSFET 201 is on and conducting current $I_{D(LS)} = I_L$, freewheeling MOSFET 205 is off, and rectifier diode 202 is reverse-biased so that the current $I_{met}$ through diode 202 is equal to zero. While low-side MOSFET 201 is conducting, $V_x$ is equal to $I_L \cdot R_{DS1}$ (curve 261), slightly above ground, as shown in graph 260. The current $I_L$ in inductor 203, shown in graph 280 of FIG. 6, starts the cycle with a value 280 and ramps up to a value 282 (curve 281). During this time the output voltage $V_{OUT}$ decays from value 271 to a value 273 (curve 272) as it supplies whatever current is demanded by load 210. The first phase is referred herein as the magnetizing phase.

Figure 5B:
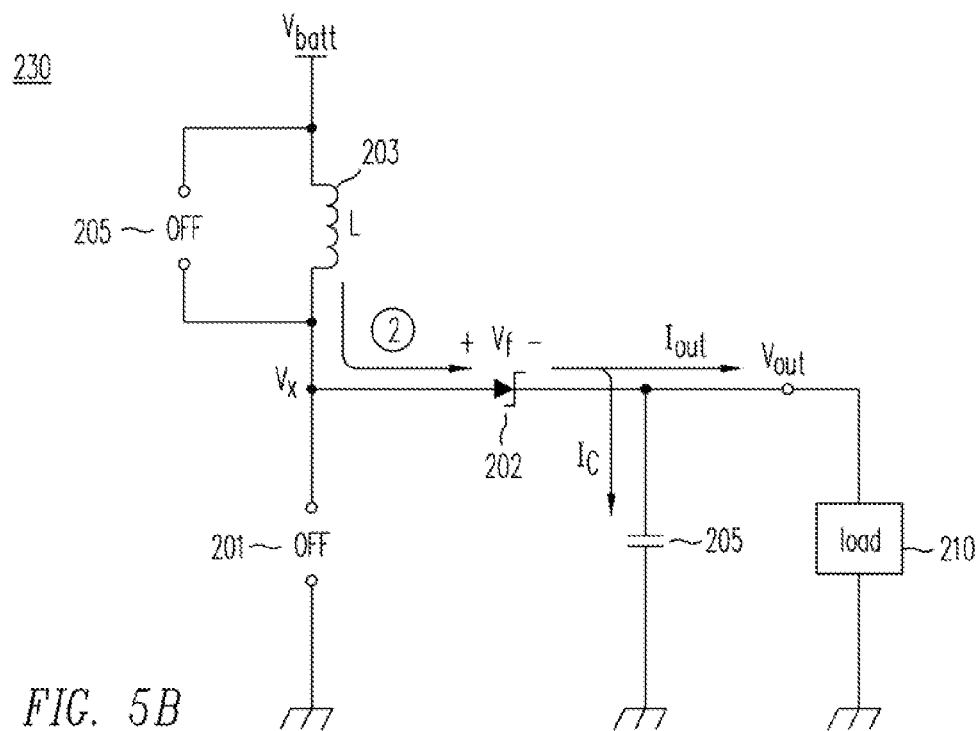
FIG. 5B is an equivalent circuit diagram of a non-synchronous freewheeling boost converter in the stage wherein the capacitor is being charged.
Figure 5C:
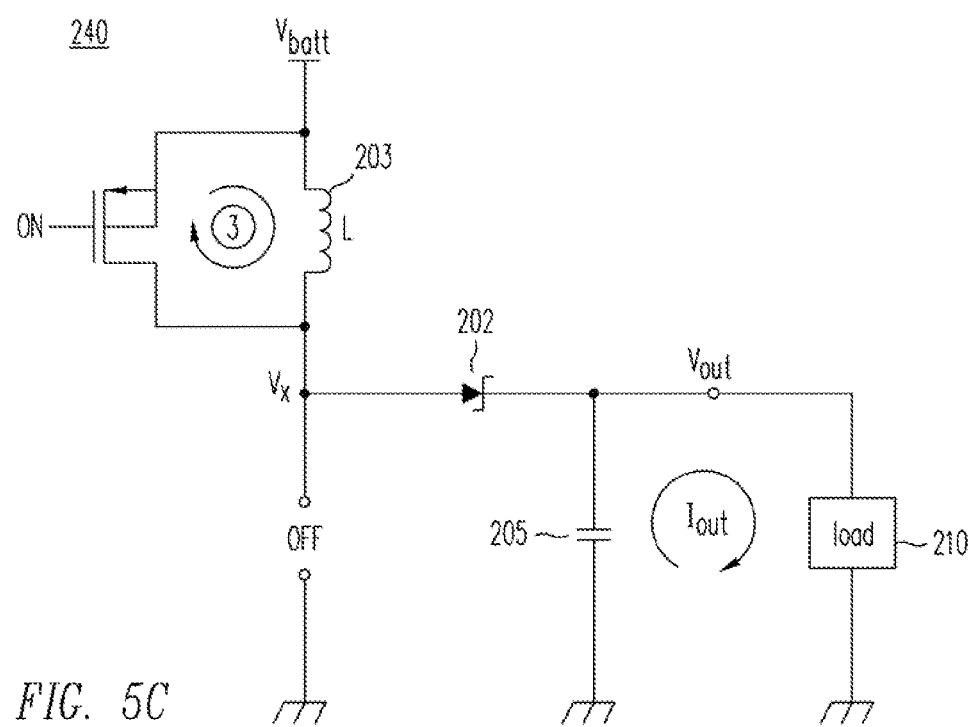
FIG. 5C is an equivalent circuit diagram of a non-synchronous freewheeling boost converter in the freewheeling stage.
Figure 6:
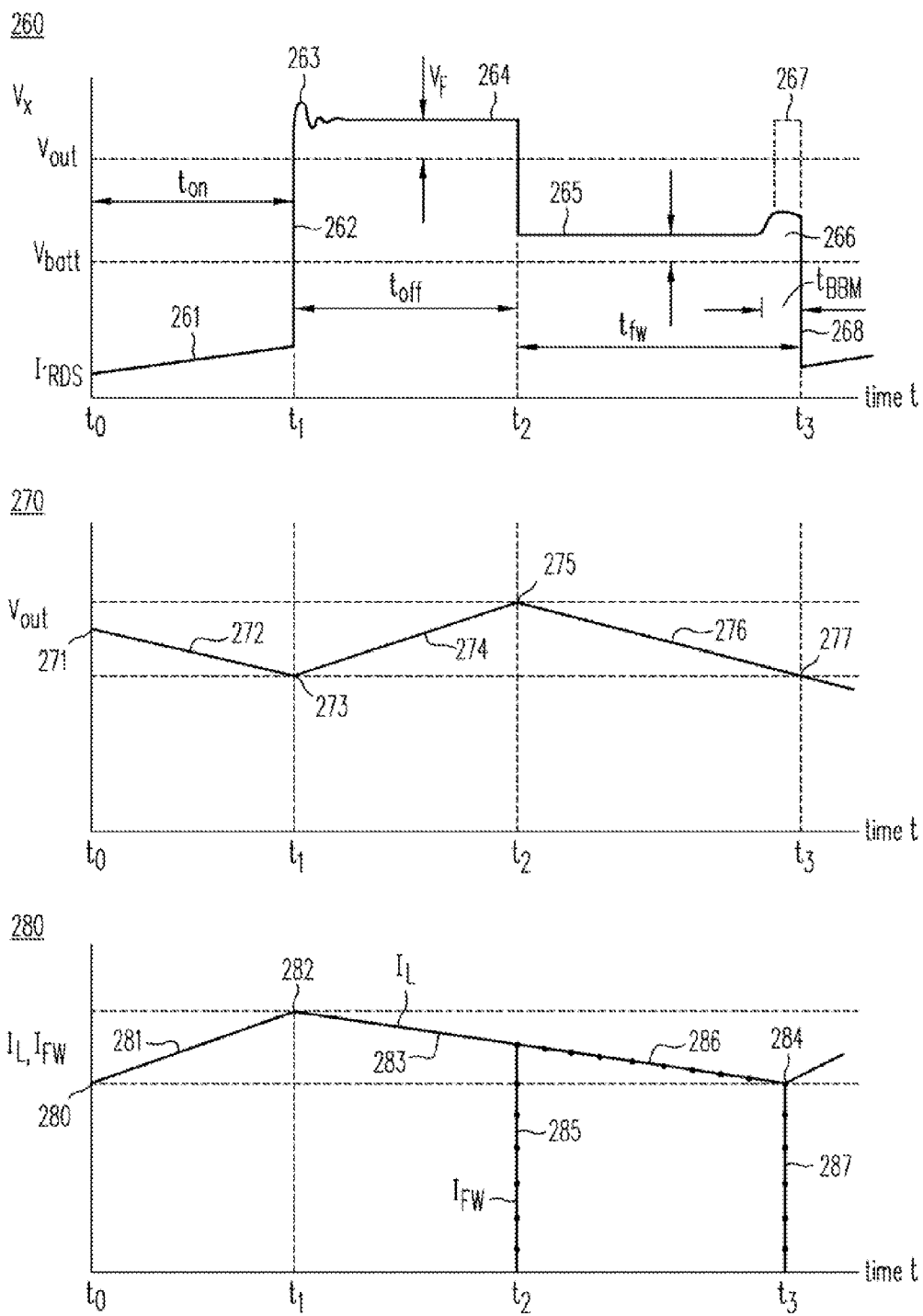
FIG. 6 shows graphs of waveforms in a non-synchronous freewheeling boost converter.

Circuit 230 of FIG. 5B illustrates the second phase of operation of the freewheeling up converter 200. As shown in FIG. 6, immediately after MOSFET 201 is shut off at time $t_1$, $V_x$ immediately jumps to potential (curve 264) one forward-biased diode-drop $V_f$ above the output, or ($V_{out}+V_f$), whereby $V_x$ is more positive than $V_{batt}$. During this interval, diode 202 becomes forward-biased, charging capacitor 204 from a voltage 273 at $t_1$ to a maximum voltage 275 at time $t_2$ (curve 274). In one embodiment, diode 202 remains forward-biased until the output voltage $V_{OUT}$ exceeds the target output voltage $V'_{OUT}$ or until a predetermined time interval expires.

During the second phase, the current $I_L$ in inductor 203 ramps down in corresponding fashion from a value 282 along a curve 283, where $I_L=I_{rect}$. The coulomb charge dQ delivered to output capacitor 205 per cycle is then $$dQ_c = I_L \cdot t_{off}$$

since $dV_c = dQ_c/C$, then the incremental change in the output capacitor's voltage $dV_c$ is given by $$dV_c = \frac{I_L \cdot t_{off}}{C}$$

As such, the time $t_{off}=(t_2-t_1)$ when both MOSFETs 201 and 205 are off determines the quantity of charge delivered to the load and output capacitor in any one cycle. The second phase is referred herein as the transfer phase.

In the third phase of operation, shown in FIG. 5C, freewheeling MOSFET 205 turns on, and diverts the current flowing through inductor 203 from diode 202 into freewheeling MOSFET 205. As shown in graph 260 of FIG. 6, $V_x$ is pulled down to a voltage equal $I_L \cdot R_{DS3}$ above $V_{batt}$ (curve 265). As $I_L \cdot R_{DS3}$ is very small, $V_x \approx V_{batt}$. Since $V_x < V_{OUT}$ under this condition, diode 202 becomes reverse-biased and non-conducting. As shown in graph 270, $V_{OUT}$ begins to decay from its peak value 275 to a value 277 at time $t_3=T$ (curve 276).

In greater detail, once low-side MOSFET 201 is turned off and freewheeling MOSFET 205 is turned on and carrying the full inductor current, then $I_L \approx I_{fw}$. As shown in graph 280, the freewheeling current $I_{fw}$ current jumps to magnitude equal to the inductor current during the entire period between time $t_2$ and time $t_3$ (curve 286). Accordingly, inductor 203 cannot force the voltage $V_{out}$ or $V_x$ to change during this period, i.e. because MOSFET 205 shunts the current flowing through inductor 203, inductor 203 cannot supply current to any other circuit elements or force the voltage on the output terminal or $V_x$ node to move. This freewheeling condition persists for a predetermined interval between times $t_2$ and $t_3$ or until $I_L$ falls to a specific value (point 284). During freewheeling, current in rectifier diode 202 supplying the converter's output and current flowing from $V_{batt}$ into converter 240 are both zero.

Figure 7:
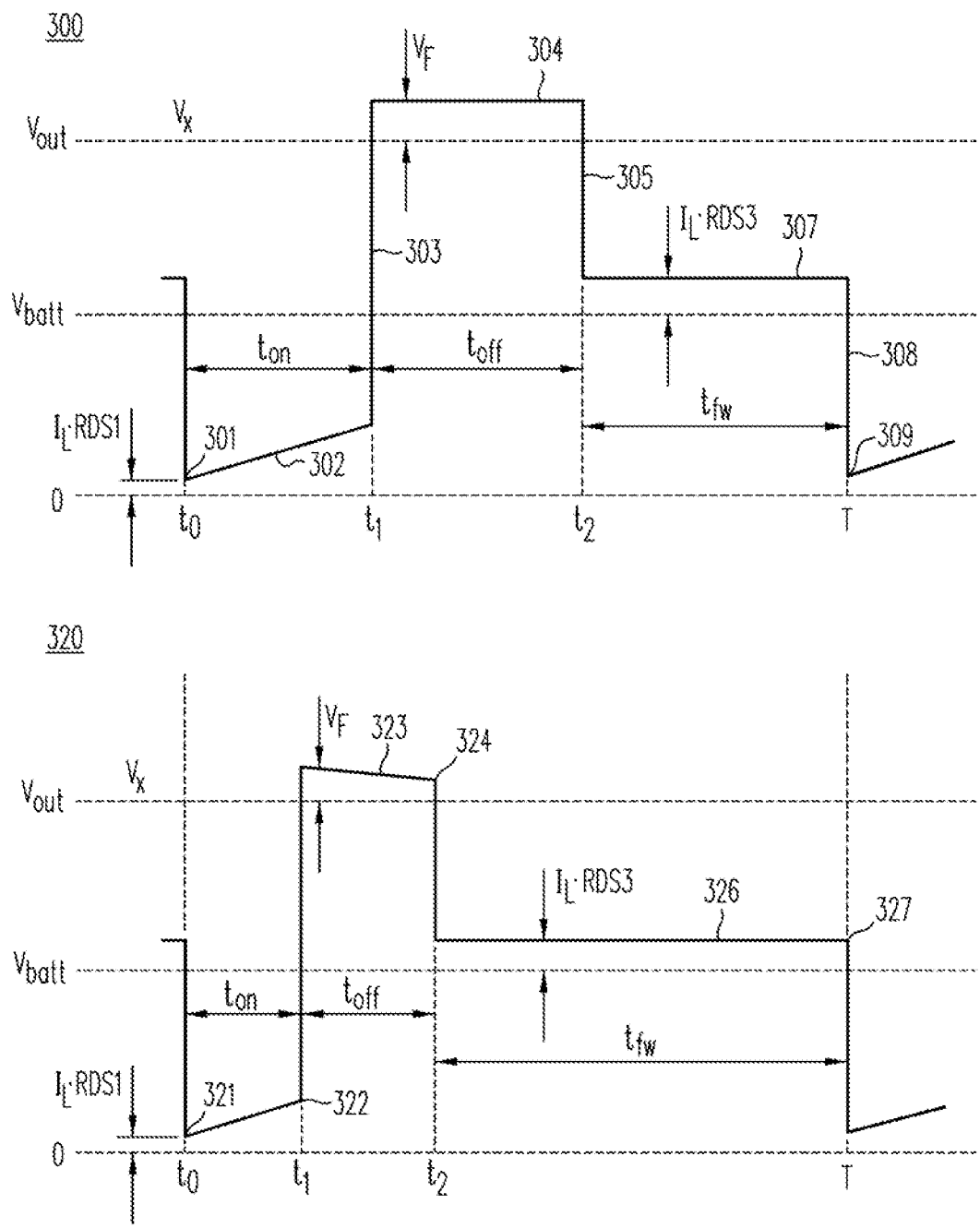
FIG. 7 contains graphs which illustrate the fixed frequency operation of a non-synchronous freewheeling boost converter with changes in the duty factor.

This state of operation is the freewheeling condition not present in conventional Buck or Buck-boost converters. The freewheeling condition may vary in time or be of a fixed duration. In the example shown in FIG. 7, the total period is fixed at a duration T' comprising some combination of magnetizing, transfer and freewheeling operation of corresponding durations $t_{on}$, $t_{xfer}$, and $t_{fw}$ respectively. In one possible control scheme, the freewheeling time fills in whatever portion of the period is not performed by magnetizing and transferring, i.e. where $t_{fw}=T-(t_{on}+t_{xfer})$.

Another unique signature of freewheeling operation is that current flow path (3) shown in FIG. 5C does not result in current flow to the inductor from the battery or to ground as does magnetizing current path (1) in FIG. 5A or transfer current path (2) in FIG. 5C. In other words, the only significant ground current flowing during freewheeling operation is from output capacitor 205 supplying temporarily load 210.

At time $t_3$, the period of the clock, freewheeling MOSFET 205 is turned off and $I_{fw}$ drops to zero (curve 287). During a brief transition $t_{BBM}$ shown by region 266 in graph 260, the voltage $V_x$ will start to rise. If no capacitance is present, the $V_x$ voltage can reach a voltage of magnitude $V_{OUT}+V_f$ (curve 267), whereby diode 202 becomes forward-biased and clamps its value. In practice, however, if the $t_{BBM}$ interval is short, the voltage only has time to rise partially before low-side MOSFET 201 is again turned on.

Thereafter, with low-side MOSFET 201 turning on, the cycle repeats itself, the voltage $V_x$ drops from $\sim V_{batt}$ to near ground, and the polarity across the inductor 203 returns to a positive value as shown in graph 260 of FIG. 6.

While operation of freewheeling step-up converter 200 is described in a specific sequence of magnetizing, transfer, and freewheeling, any other sequence may also be possible. For example one possible sequence is to magnetize, freewheel and then transfer.

The freewheeling converter may also spend an extended duration in two of the operating modes and only occasionally operate in the third state. For example the converter may repeatedly alternate between the transfer and freewheeling states and only infrequently magnetize the inductor, or repeatedly alternate between the magnetizing and transfer states and only infrequently operate in the freewheeling state.

Benefits of Non-Synchronous Freewheeling Boost Regulator:

Comparing the operation of a freewheeling up converter to the operation of a conventional non-synchronous or synchronous boost converter, some notable differences are clear. In a conventional boost converter, aside from break-before-make operation, only two states exist—putting energy into the inductor and delivering that energy to the load and output capacitor. To maintain a constant output voltage and avoid inductor saturation, the energy put into the inductor must be entirely removed each cycle, i.e. the converter must operate in energy balance. If a small residual current is left-over after every cycle, the average current will gradually increase until the inductor saturates. When an inductor saturates, its inductance and its AC impedance drops so that it can no longer control current. A saturated inductor behaves essentially as a "wire" leading to excess currents and overheating of power MOSFETs.

To avoid the average inductor from "creeping up" little by little, in a conventional converter the timing of the on time and the transfer time must be adjusted to balance the energy flowing into and out of the converter. In a conventional converter, the total period for one cycle is the sum of the on time of the low-side MOSFET $t_{on}$, when the inductor is being magnetized, and the time when the rectifier or synchronous rectifier transfers energy to the output capacitor $t_{xfer}$, i.e. $T=t_{on}+t_{xfer}$. For fixed frequency operation and a constant period T, any change in $t_{on}$ is compensated by a corresponding change in $t_{xfer}$. If however, $t_{on}$ or $t_{xfer}$ reaches a minimum duration (i.e., pulse width) holding a constant period causes a changing output voltage. This constraint necessarily forces a conventional boost converter to operate in variable-frequency mode under light load conditions. Moreover, the average inductor current has to follow the load's current demands or the wrong output voltage will result. Low inductor current makes it difficult for the converter to properly regulate its output in response to a step function increase in load current.

In the disclosed freewheeling converter, having three states or phases of operation, i.e. magnetizing, transfer and freewheeling state, the freewheeling state allows the converter to operate at a fixed clock frequency without saturating the inductor or driving the output voltage out of range. This benefit is illustrated by comparing two different $V_x$ waveforms of the freewheeling up converter shown in graphs 300 and 320 of FIG. 7. As shown in graph 300, a normal load current condition illustrates the on time $t_{on}$ of MOSFET 201 (segment 302) and the diode's conduction time $t_{off}$ (segment 304) are not at minimum width. The freewheeling MOSFET operates for some duration (segment 307) until the clock pulse repeats at time T. During the freewheeling stage, time $t_{fw}$, the inductor current is maintained continuously and does not interact with the load, avoiding issues with polarity reversal in inductor current and noise in the load.

As shown in graph 320, the $t_{on}$ pulse width (segment 321) is at minimum width equal to $(t_1-t_0)$, a shorter duration that that shown in graph 300. To maintain a constant output the interval $t_{off}$ adjusts accordingly to a duration $(t_2-t_1)$ also shorter than that shown in graph 300. To achieve constant frequency operation, the freewheeling time $t_{fw}$ increases to $(T-t_2)$, a duration longer than shown in graph 300. Identifying the $t_{on}$, $t_{off}$ and $t_{fw}$ durations as segments 302, 304 and 307 under normal operation and as segments 321, 323, and 326 during light load operation, then for constant frequency operation with a fixed period T $$T = t_{on(302)} + t_{off(304)} + t_{fw(307)} = t_{on(321)} + t_{off(323)} + t_{fw(326)}$$

Therefore, the freewheeling stage (segment 326) compensates for any changes in $t_{on}$ and $t_{off}$, so that T may remain constant. In this manner, fixed clock cycles may be used over a much wider range of application and the switching frequency and noise spectra can be better controlled.

Alternatively, the converter may also be used in variable frequency applications but with greater control over the noise spectrum it produces. For example the period T can be chosen a priori to avoid certain frequencies and undesirable harmonics such as a those frequencies falling into important communication bands or potentially interfering with radio frequency circuitry.

Controlling Inductor Current with a Freewheeling MOSFET:

A freewheeling boost converter offers a greater degree of control of inductor current than a normal boost converter. In a normal boost converter, the inductor is either connected to the converter's input or output, i.e. storing energy or transferring it to the load. In a normal boost converter, there is no means by which to disconnect the inductor from both the input and the output circuit without causing unclamped inductive switching spikes as described in FIG. 31. Leaving the inductor connected to the input longer than required stores too much energy in the inductor—energy that somehow must be subsequently removed without affecting output regulation. Leaving the inductor connected to the output too long removes excess energy from the inductor but overcharges the output capacitor and adversely impacts output regulation. Either way, the energy flow in a conventional boost converter may result in poor regulation under changing load and input conditions.

Figure 8A:
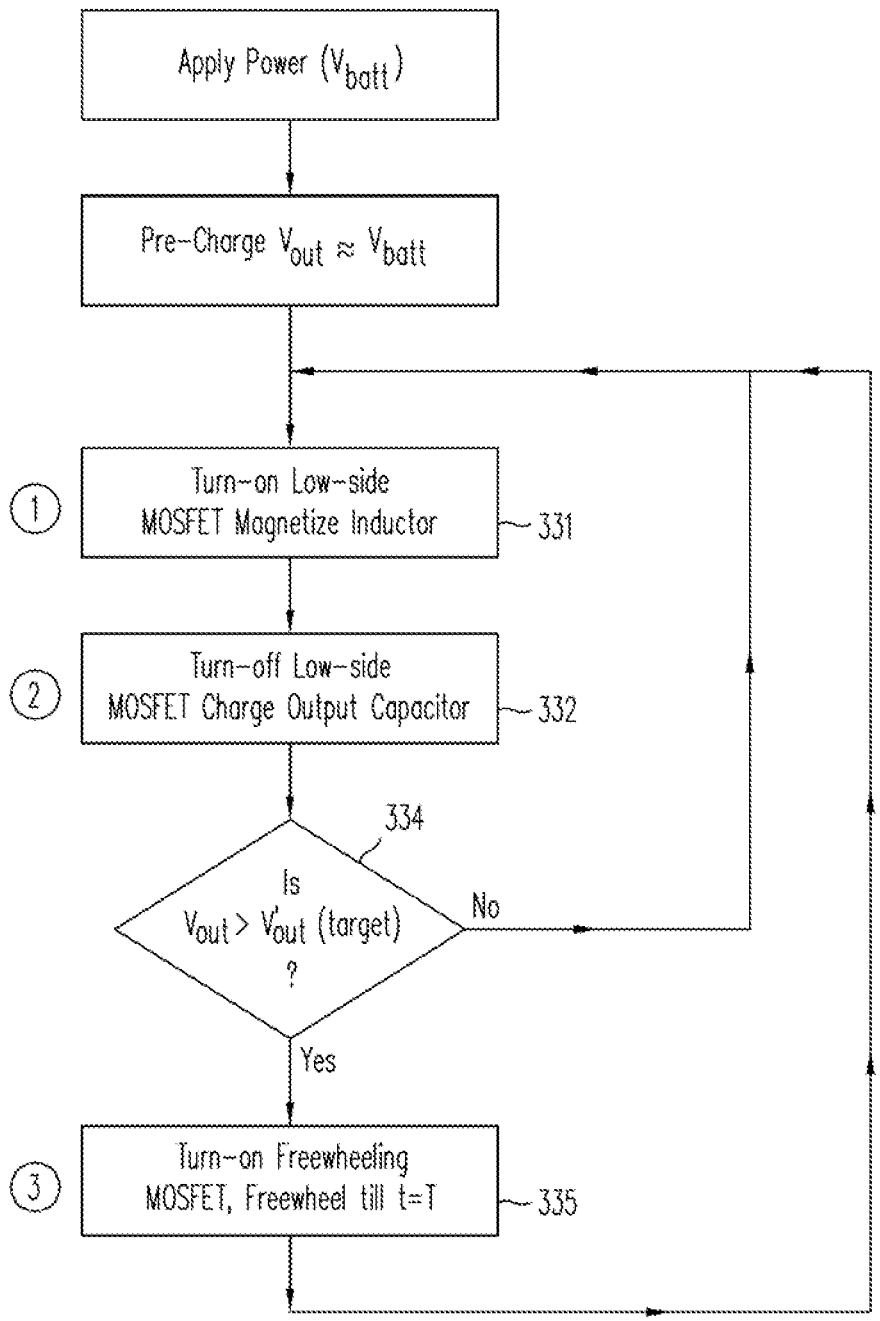
FIG. 8A is a flow chart of an algorithm describing the operation of a non-synchronous freewheeling boost converter.

The freewheeling boost converter eliminates this problem by introducing a third state or condition, i.e. freewheeling, where inductor current can recirculate without delivering more energy to the output or absorbing more energy from the input. This concept is illustrated graphically in algorithm 330 of FIG. 8A. As shown, after power is applied to the converter's input terminal, the output terminal charges to a voltage approximately equal to the input voltage, i.e. $V_{OUT} \rightarrow V_{batt}$, as an unavoidable consequence of forward-biasing rectifier diode 202. In freewheeling converter 200, this pre-charge condition occurs regardless of whether freewheeling MOSFET 205 is on or not. In the case where MOSFET 205 is off, the pre-charge current flows through inductor 203. In the case where MOSFET 205 is on, the pre-charge current can flow around inductor 203 through conducting MOSFET 205. The advantage of diverting the current around the inductor during pre-charging is that the output capacitor can be charged more quickly and the inductor does not need to reset to zero current before converter operation commences, speeding up the converter's startup. In either event, at the end of pre-charging, the voltage $V_{OUT}$ across capacitor 204 approximately equals the voltage $t_{batt}$.

Commencing switching operation, in stage 1 low-side MOSFET 201 is turned on and magnetizes inductor 203 with current flow (step 131). The duration of stage 1 can be controlled by any number of means, including employing an analog feedback signal fed into an error amplifier and compared to a ramp generator—a method common in conventional boost converters. Alternatively, the duration of on-time stage 1 may be controlled digitally according to certain target values of inductor current and output voltage. In another algorithmic approach, the on-time of low-side MOSFET 201 can start with a minimum pulse width and thereafter increase each time stage 1 is repeated until a steady state condition is reached. Alternatively, some maximum on time may be employed and then shortened or skipped in subsequent switching cycles as required.

Regardless of how the duration of stage 1 is controlled, when stage 2 begins low-side MOSFET 201 is turned off and freewheeling MOSFET 205 remains off (step 332). Immediately rectifier diode 202 becomes forward-biased, charging output capacitor 204 with current and increasing the output voltage above its precharged value. The duration of stage 2 may be fixed or vary as a function of other circuit variables. Alternatively, a fixed time or clock duration $(t_{on}+t_{off})$ may be allocated for the combination of stages 1 and 2. If the magnetizing stage (1) takes longer, less time is available for stage 2, when energy is transferred to the output terminal.

After some minimum duration in stage 2, a conditional test, shown in step 334, compares the actual output voltage $V_{OUT}$ to the target output voltage $V'_{OUT}$, and if $V_{OUT}$ is not greater than $V'_{OUT}$, stage 1 (box 331) is repeated, e.g. if $V_{OUT}$ is less than or equal to $V'_{OUT}$. If the voltage condition is satisfied, i.e. if $V_{OUT} > V'_{OUT}$, then the cycle of repeatedly magnetizing inductor 203 and transferring energy to capacitor 204 (stages 1 and 2) is terminated, and the converter 200 begins freewheeling in stage (3), as shown in step 335.

In the freewheeling condition (stage 3), freewheeling MOSFET 205 is on and conducting carrying current in inductor 203 while low-side MOSFET 201 remains off and diode 202 remains reverse-biased and non-conducting. The duration of the time that converter 200 remains in stage 3 may determined in any number of ways. In one embodiment, the freewheeling stage 3 is maintained for the remainder of a fixed clock cycle of period T, i.e. for a duration $t_{fw}=(T-t_{on}-t_{off})$. Alternatively, a condition may be imposed whereby converter 200 continues to freewheel until the current through inductor 203 decays to a specific value or whereby converter 200 continues to freewheel so long as the output voltage $V_{OUT}$ remains above $V'_{OUT}$, or any combination of parametric and timing criteria thereof. When stage 3 (step 335) concludes, as shown in algorithm 330, converter 200 returns to stage 1 (box 331).

Figure 8B:
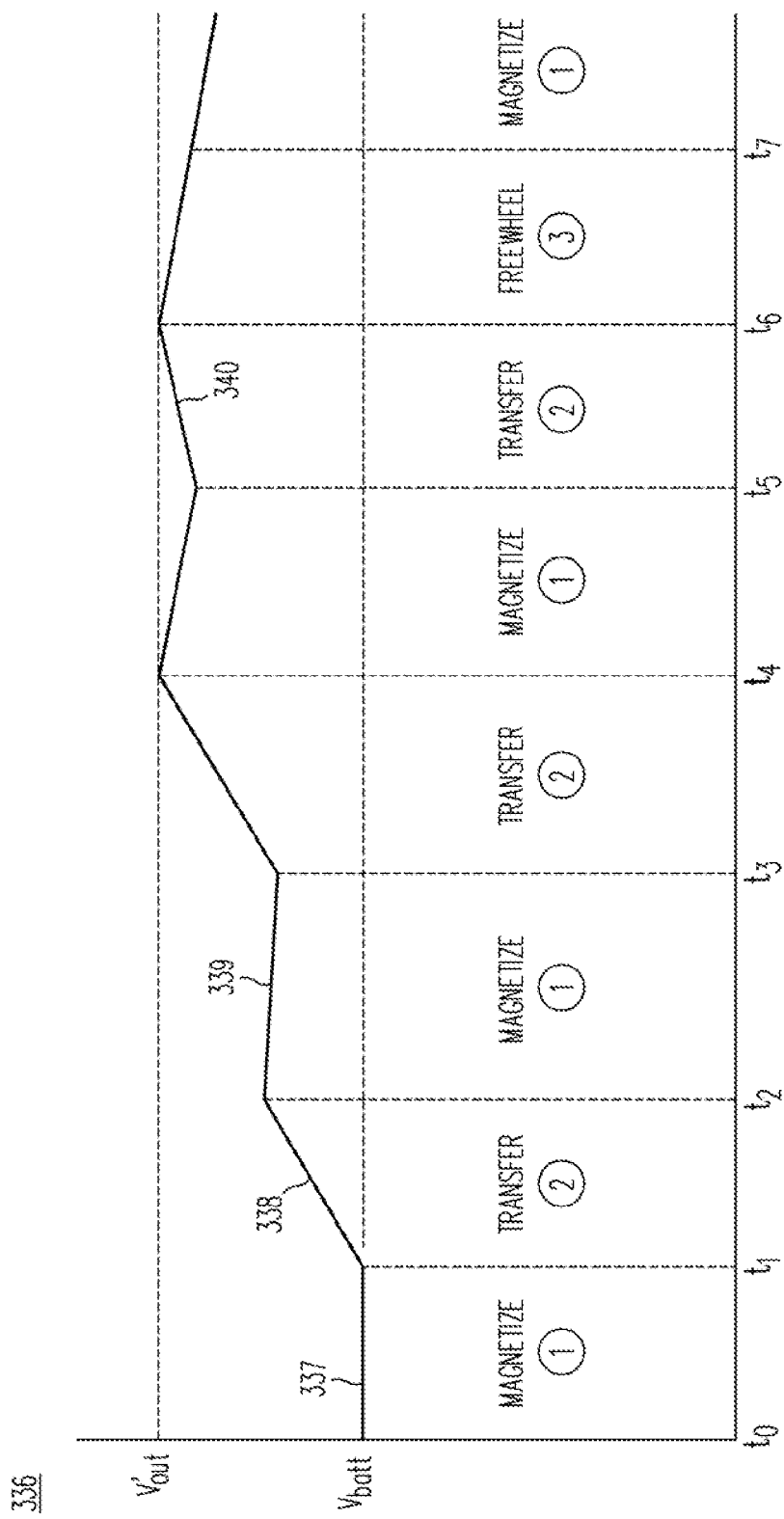
FIG. 8B shows a waveform of a freewheeling boost converter during start-up.

Algorithm 330 as shown maintains the inductor current and output voltage in a manner similar to normal boost converter operation. As illustrated, only when the output voltage exceeds a specified target voltage $V'_{OUT}$ does converter 200 enter the freewheeling state. This behavior is illustrated in the start-up waveform 336 of FIG. 8B where the freewheeling boost converter 200, pre-charged at a voltage $V_{batt}$ (segment 337), commences operation at time $t_1$ and the output voltage increases during transfer until time $t_2$ (segment 338), when the inductor 203 is again magnetized and the output voltage decays (segment 339).

Transfer to the output terminal occurs once more, from time $t_3$ to time $t_4$, charging the output terminal but not above the target value $V'_{OUT}$. Accordingly, another magnetize-and-transfer loop occurs from time $t_4$ to time $t_6$. At point 340, however, the output voltage finally passes the target value $V'_{OUT}$ and on the next clock cycle, at time $t_6$, the converter 200 enters into freewheeling operation. At time $t_7$ the converter again magnetizes its inductor and steady state operation is achieved. Alternatively the converter 200 could alternate between free-wheeling operation (stage 3) and charge transfer operation (stage 2) until the current in inductor 203 drops below some minimum value.

Note that the output voltage decays at the same rate whether inductor 203 is being magnetized (stage 1) or converter 200 is freewheeling (stage 3). The decline in output voltage during the freewheeling and magnetizing stages depends only on the load current and the size of output capacitor 204.

Figure 8C:
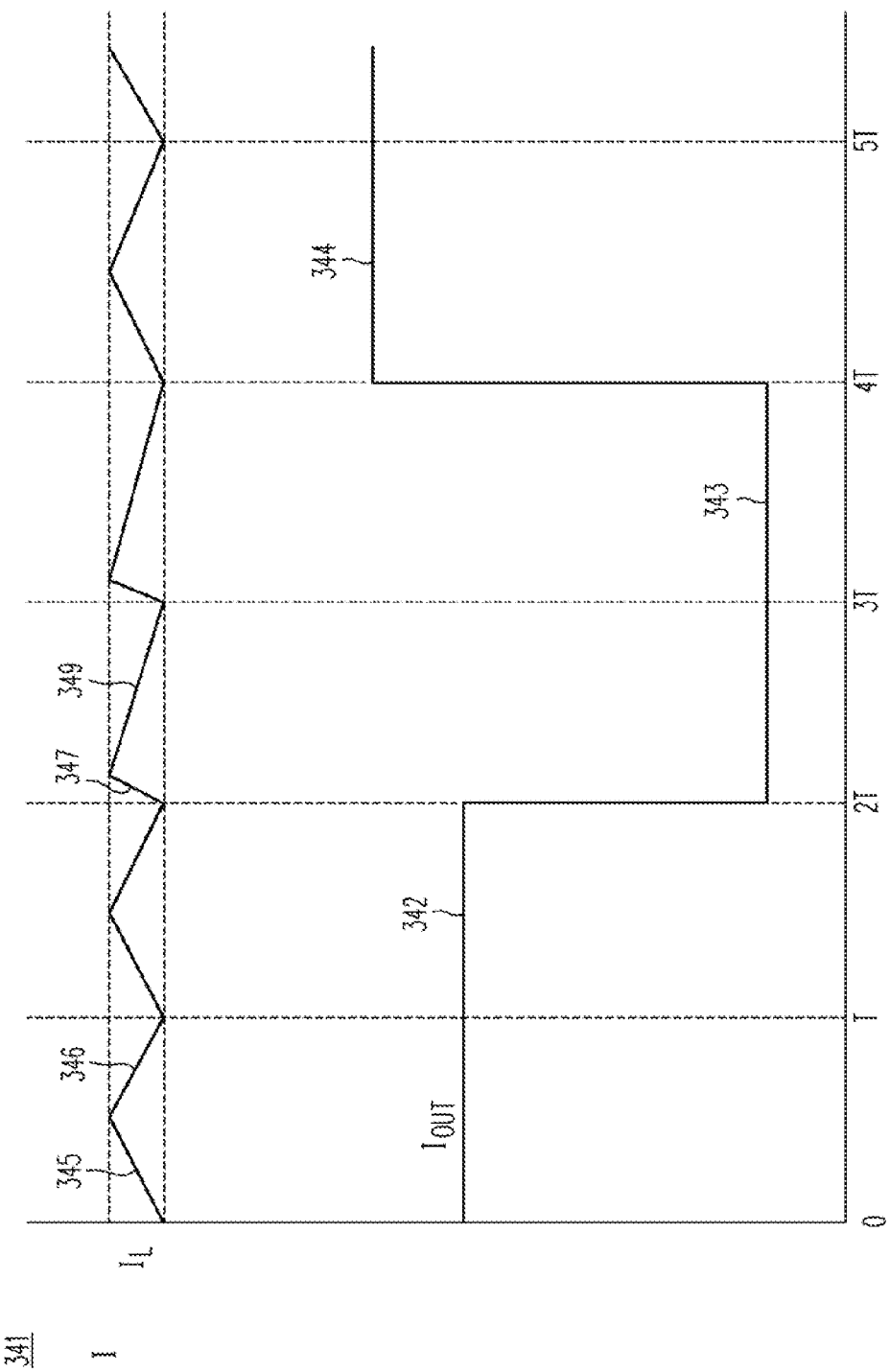
FIG. 8C shows a waveform illustrating the response of a freewheeling boost converter to a transient in the load current.

The algorithmic flexibility of the freewheeling boost converter is a consequence that the average inductor current does not necessarily set the output voltage. This means that unlike conventional boost converters, the freewheeling boost converter offers semi-independent control of the two state variables of the converter, namely output voltage $V_{OUT}$ and inductor current $I_L$. This fact is clearly illustrated in graph 341 of FIG. 8C where the inductor current $I_L$ is sustained far above the load current $I_{OUT}$ even while regulating the output voltage at a pre-specified magnitude and tolerance.

As an example, while the load current is at magnitude represented by segment 342, e.g. at 300 mA, the inductor current $I_L$ ramps up and down at magnitudes, represented by segments 345 and 346, that are higher than the load current $I_{OUT}$. The current ramp-up portion (segment 345) corresponds to the magnetizing phase $t_{on}$ (stage 1), while the current ramp-down (segment 346) comprises both the charge transfer time $t_{off}$ (stage 2) and the freewheeling time $t_{fw}$ (stage 3). The portion of the ramp-down period (segment 346) corresponding to freewheeling is shorter at higher values of $I_{OUT}$ and longer at lower values of $I_{OUT}$.

At time $t=2T$, graph 341 illustrates a step decrease in load current from a magnitude represented by segment 342 to a lower current represented by segment 343, e.g. from 300 mA to 50 mA. Immediately, the current ramp-up time (segment 347) is shortened, while the ramp-down (segment 349) increases by a corresponding amount. The clock frequency remains the same. Moreover, since the load is drawing less current, very little (if any) time is spent transferring energy to the output. Instead, most of the inductor current ramp-down is due to power losses during freewheeling, not to transferring energy to the output. In such a case, in order to prevent overcharging of the output, the times are adjusted such that $t_{off}$ approaches zero and $t_{fw}$ approaches $T-t_{on}$. In the event that no transfer of energy is needed to the output, the converter alternates between magnetizing and freewheeling and may skip any number of cycles before another transfer cycle occurs. In such a condition $t_{off}$ equals zero and $T=t_{on}+t_{fw}$.

The unique property of the freewheeling boost converter is its ability to sustain a higher inductor current even as the load current varies dramatically. At time $t=4T$ the load current jumps up to a new higher value represented by segment 344, even greater than the initial current (segment 342). Because the magnitude of $I_L$ is still higher than the load, the converter reacts instantly with no loss of regulation.

In contrast, a normal boost converter would exhibit a much poorer step response because in the period between times 2T and 4T the average inductor current would decline to a magnitude equal to load current (segment 343) and be unable to react to sudden changes, i.e. the increase, in the load's current demand. Poor transient regulation would result. The freewheeling boost converter avoids this problem altogether.

Synchronous Freewheeling Boost Converter

One possible drawback of freewheeling boost converter 200 of FIG. 4 is its use of rectifier diode 202 between the $V_x$ node and its output. Since all energy flowing from inductor 203 to capacitor 204 and load 210 must flow through this rectifier diode, power loss in the rectifier is not negligible. During the transfer phase the power loss in the diode is $I_L \cdot V_f$.

While this power loss may be a small percentage of the total losses for conditions of low load currents and higher output voltages, at higher currents the power loss can cause substantial heating and at lower output voltages, the power efficiency may also suffer. The use of a Schottky diode lowers these conduction losses but not eliminate them.

Figure 9:
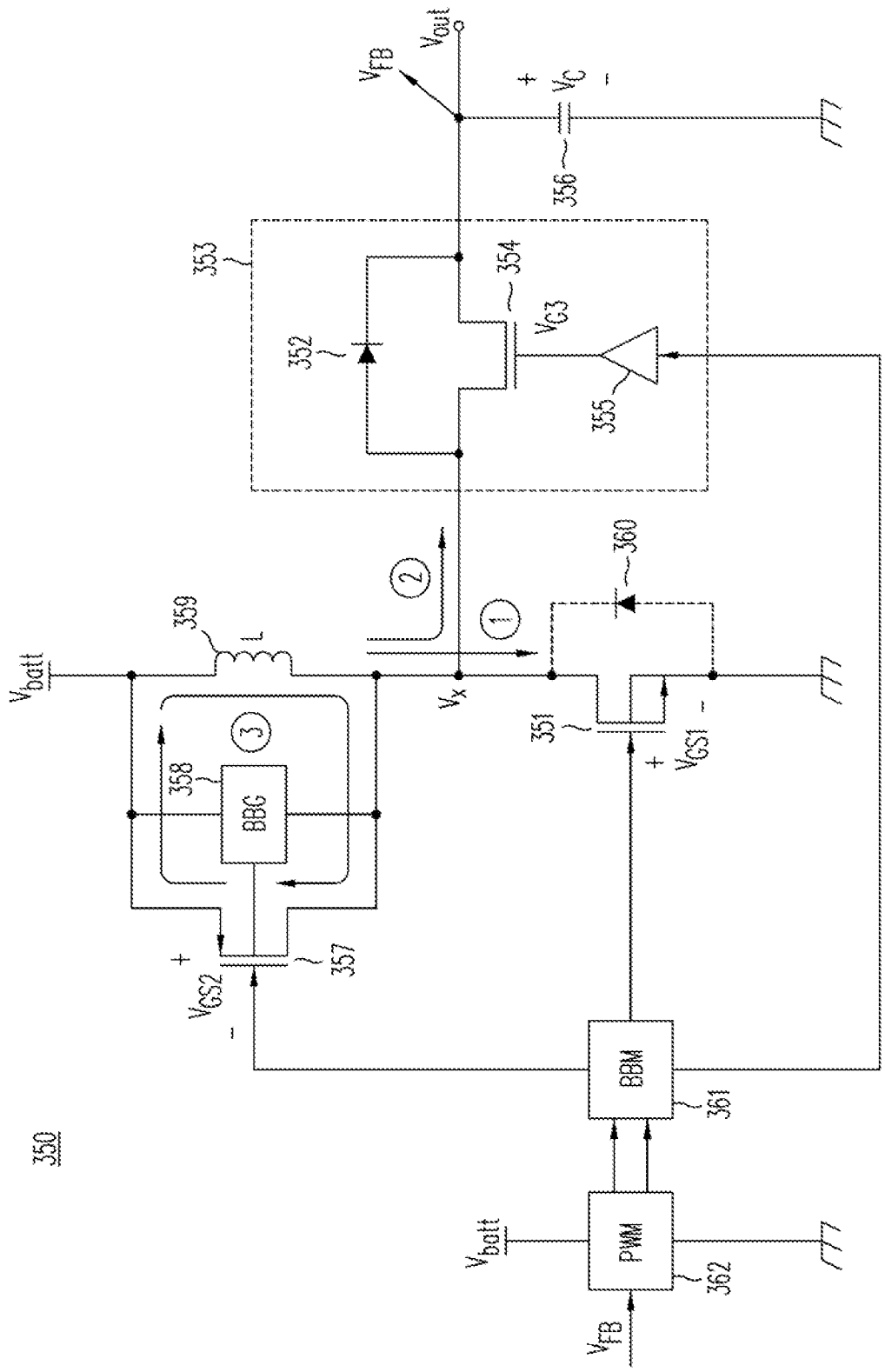
FIG. 9 is a circuit diagram of a synchronous freewheeling boost converter in accordance with the invention.

To reduce rectifier losses in the freewheeling boost converter, the diode can be replaced by a MOSFET. The resulting synchronous freewheeling boost converter is illustrated in FIG. 9. Like non-synchronous freewheeling boost converter 200, synchronous freewheeling converter 350 includes a low-side N-channel MOSFET 351, an inductor 359, a freewheeling MOSFET 357 with a body-bias-generator 358, an output capacitor 356 and a PWM controller 362. Inductor 359 is coupled to an input voltage, in this case a battery voltage $V_{batt}$, while low-side MOSFET 351 is coupled to ground. Ground is a circuit ground which could be actual ground or any other voltage; the potential difference between $V_{batt}$ and ground represents the input DC voltage.

A synchronous rectifier 353 comprises a rectifier diode 352 and a MOSFET 354 driven by a gate buffer 355. MOSFET 354 may be P-channel or N-channel with appropriate adjustments to gate buffer 355 and the signal range or the gate signal $V_{G3}$. Diode 352 may comprise a P-N junction intrinsic to MOSFET 354 or may comprise a Schottky diode or a parallel combination thereof. MOSFET 354 is timed to conduct some portion of the time when diode 352 is forward-biased. Synchronous rectifier MOSFET 354 has a sufficiently large width to exhibit a lower voltage drop in its on state than the voltage across diode 352 carrying the same current.

Freewheeling MOSFET 357 may be N-channel or P-channel but a P-channel MOSFET is more convenient for implementing gate drive circuitry to supply gate signal $V_{G2}$. Body bias generator 358 eliminates any forward-biased P-N diode across the source-to-drain terminals of freewheeling MOSFET 357, i.e. no forward-biased diode can be present in either polarity between $V_x$ and $V_{batt}$. A break-before-make buffer 361 controls the gate signals to low-side MOSFET 351, synchronous rectifier MOSFET 354, and freewheeling MOSFET 357 to prevent overlapping conduction. Only one of the three power MOSFETs may conduct at any one time. The transition between turning one MOSFET off and another on, i.e. the break-before-make time should preferably occur in the shortest possible time without overlapping conduction.

Similar to non-synchronous freewheeling boost converter 200, converter 350 operates in three states, magnetizing, transfer, and freewheeling, corresponding to current flow arrows (1), (2), and (3), respectively, in FIG. 9. Unique to the synchronous freewheeling converter, synchronous rectifier MOSFET 354 conducts and shunts current around diode rectifier 352 for some portion of the time when diode 352 is forward-biased, thereby lowering power dissipation during the transfer stage represented by current flow arrow (2). Operation of synchronous freewheeling boost converter is illustrated in FIGS. 10A-10D, following algorithm 420 of FIG. 11A, with corresponding $V_x$ and I waveforms shown in graphs 430 and 440 of FIG. 11B, respectively.

Figure 10A:
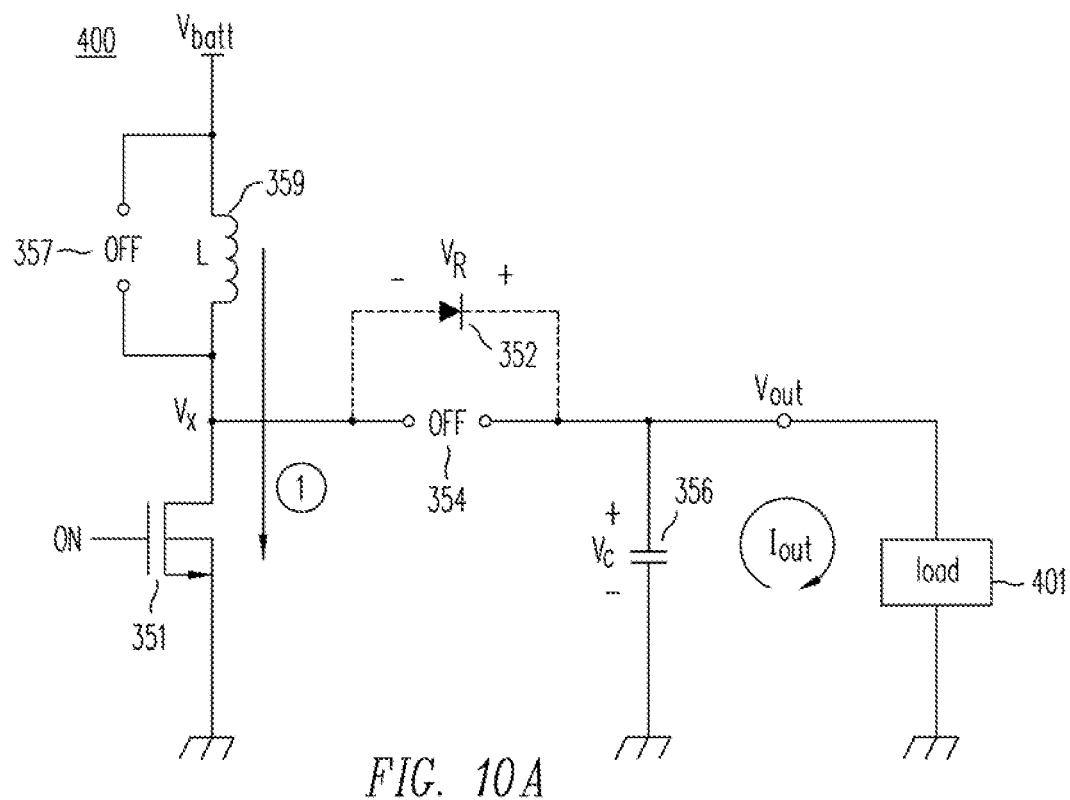
FIG. 10A is an equivalent circuit diagram of a synchronous freewheeling boost converter in the magnetizing stage.

In stage 1, shown schematically in step 421 of FIG. 10A, low-side MOSFET 351 conducts and MOSFETs 352 and 357 are off. Current flow represented by arrow (1) magnetizes inductor 359 for some duration $t_{on}$ controlled by PWM controller 362. Since, as shown in graph 430 of FIG. 11B, $V_x$ is biased near ground at a voltage of magnitude $I_L \cdot R_{DS(LS)}$ (segment 431), rectifier 352 is reverse-biased and non-conducting, so that $I_{rect}$, shown in graph 440, is zero (segment 444). With no rectifier current flowing, capacitor 356 must supply load 401 with its necessary current $I_{OUT}$, causing the output voltage $V_{OUT}$ sag during this "magnetizing" phase of operation. Meanwhile, $I_L$ ramps up (segment 441) for the entire duration of $t_{on}$, until time $t_1$, when converter 350 enters its second phase of operation.

Figure 10B:
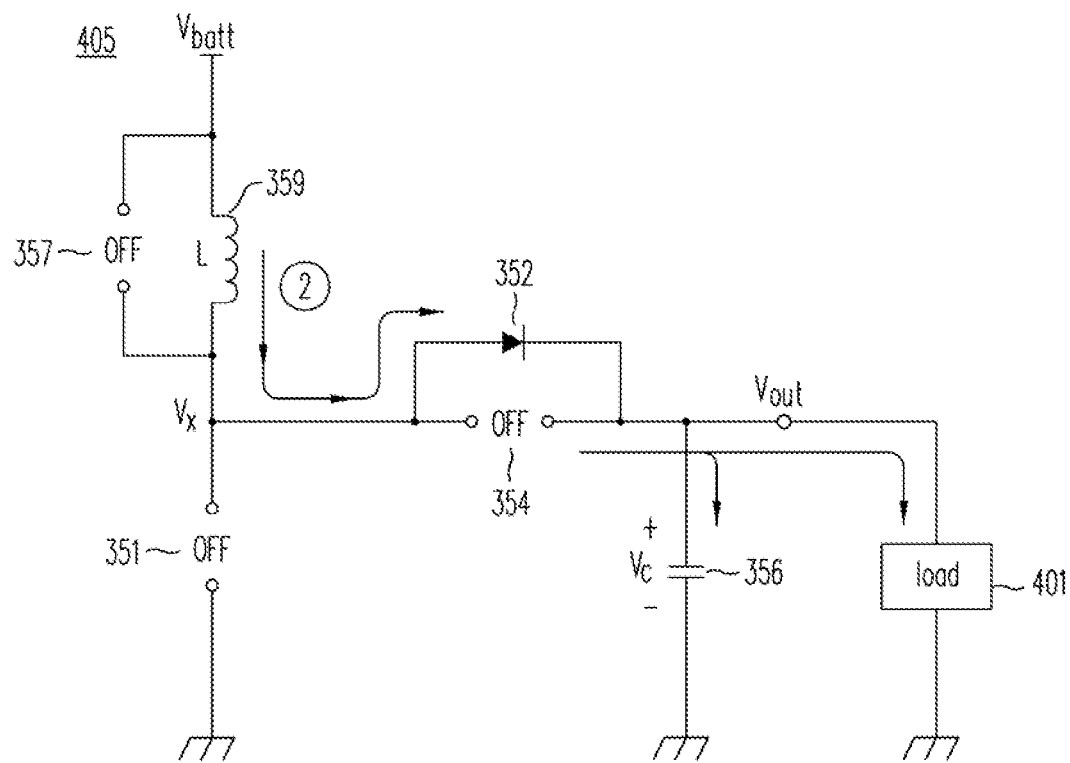
FIG. 10B is an equivalent circuit diagram of a synchronous freewheeling boost converter in a break-before-make (BBM) interval.
Figure 11A:
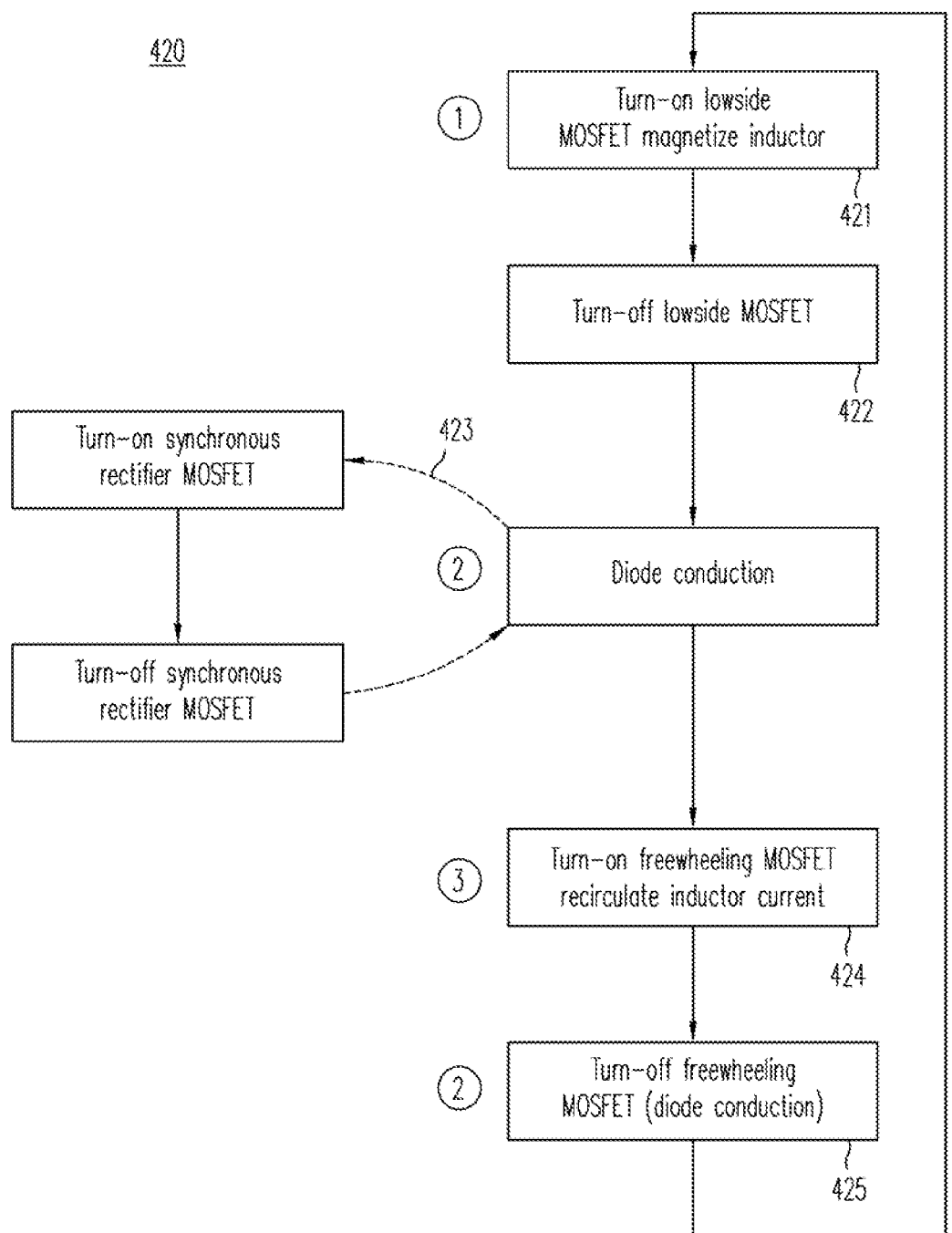
FIG. 11A is a flow chart of an algorithm describing the operation of a synchronous freewheeling boost converter.
Figure 11B:
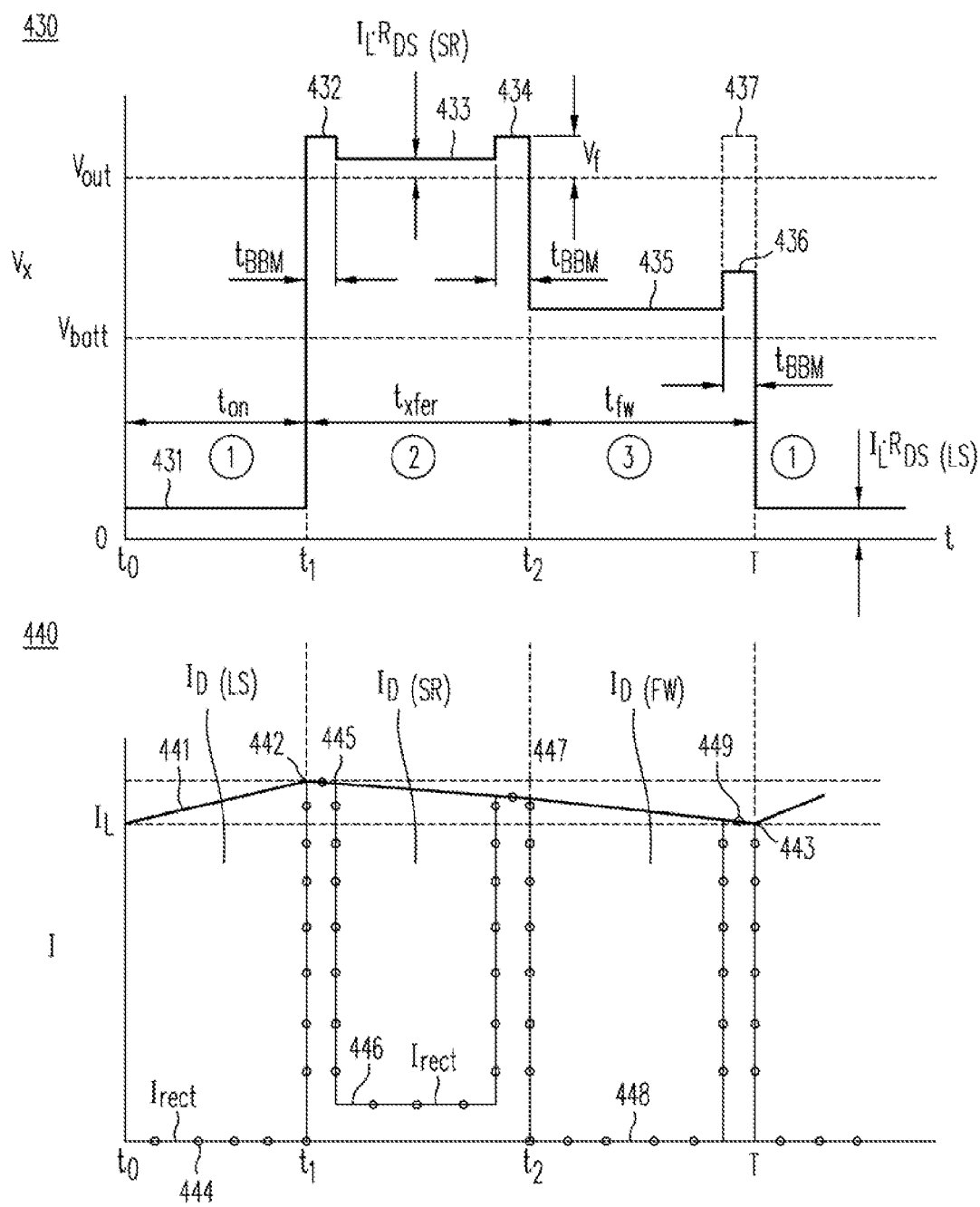
FIG. 11B contains waveforms showing the voltage and current in stages of operation of a synchronous freewheeling boost converter.

The second phase or operating state begins at time $t_1$ in FIG. 11B (point 422, when low-side MOSFET 351 is turned off. As shown in FIG. 10B, when MOSFET 351 is turned off, inductor 359 instantly forces $V_x$ to fly up and forward bias diode 352, charging capacitor 356 with current (arrow (2)). Immediately prior to time $t_1$ (time $t_1-$), the inductor current $I_L$ at its peak value (point 442) is entirely carried by the low-side MOSFET 351, i.e. $I_L(t_1^-)=I_{D(LS)}$. Immediately subsequent to time $t_1$ (at time $t_1+$), the inductor current $I_L$ is entirely carried by the rectifier diode 352, so that $I_L(t_1+)=I_{rect}$, shown by the dotted line 445 in graph 440. Since inductor current cannot be discontinuous, i.e. $I_L(t_1^-) \approx I_L(t_1^+)$, then rectifier diode 352 must carry the full inductor current at the moment of switching off low-side MOSFET 351. At current $I_L$, diode 352 exhibits a voltage drop of magnitude $V_f$. As a result, the voltage $V_x$ jumps to a value $V_x=(V_{OUT}+V_f)$ (segment 432). While in a circuit comprising the components as shown, the voltage jumps instantly, in reality parasitic capacitance present in the MOSFETs slows the transition. Some of the current is therefore carried by the parasitic capacitances and not by the ideal element as shown.

Figure 10C:
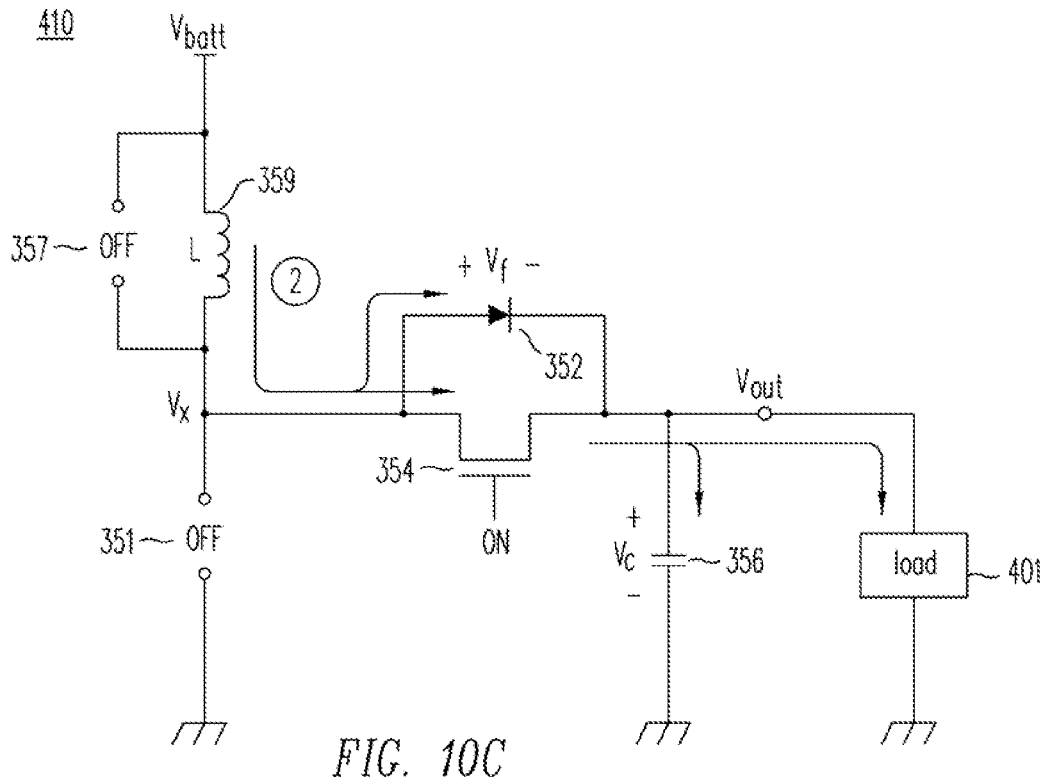
FIG. 10C is an equivalent circuit diagram of a synchronous freewheeling boost converter in the stage wherein the output capacitor is being charged.

After a break-before-make interval $t_{BBM}$ as controlled by BBM circuit 361, synchronous rectifier MOSFET 354 is turned "on," corresponding to arrow 423 in algorithm 420. As shown in FIG. 10C, the inductor current $I_L$ (arrow (2)) splits into two parts, so that $I_L=I_{rect}+I_{D(SR)}$ as illustrated by the drop in $I_{rect}$ current (segment 446 in graph 440 of FIG. 11B). At a lower current the diode voltage $V_f$ drops to a value approximately equal to the voltage drop $I_L \cdot R_{DS(SR)}$ across the synchronous rectifier power MOSFET 354. The voltage $V_x$ drops to a value 433 of magnitude of $V_x=(V_{OUT}+I_L \cdot R_{DS(SR)})$ (segment 433 in graph 430 of FIG. 11B), and power dissipation is reduced.

Prior to the next phase of operation, synchronous rectifier MOSFET 354 is again turned off for a duration, $t_{BBM}$, diode 352 must carry the full load current (segment 447), and $V_x=(V_{OUT}+V_f)$ as shown by segment 434. The duration $t_{xfer}$ of stage 2 therefore comprises three sub-stages: a break-before-make interval illustrated in FIG. 10B, synchronous rectifier conduction illustrated in FIG. 10C, and a second break-before-make interval, also illustrated in FIG. 10B. During the entirety of stage 2, the inductor current (arrow (2) in FIGS. 10B and 10C) supplies load 401 and charges output capacitor 336, while the current in inductor 359 ramps down during this transfer phase from a value represented by point 442 to a lower magnitude represented by point 447 in graph 440 of FIG. 11B. So long as the break-before-make intervals 432 and 434 are short in comparison to the synchronous rectifier MOSFET conduction interval 433, the average power dissipated during energy transfer to the output is reduced and the converter's efficiency is improved.

Figure 10D:
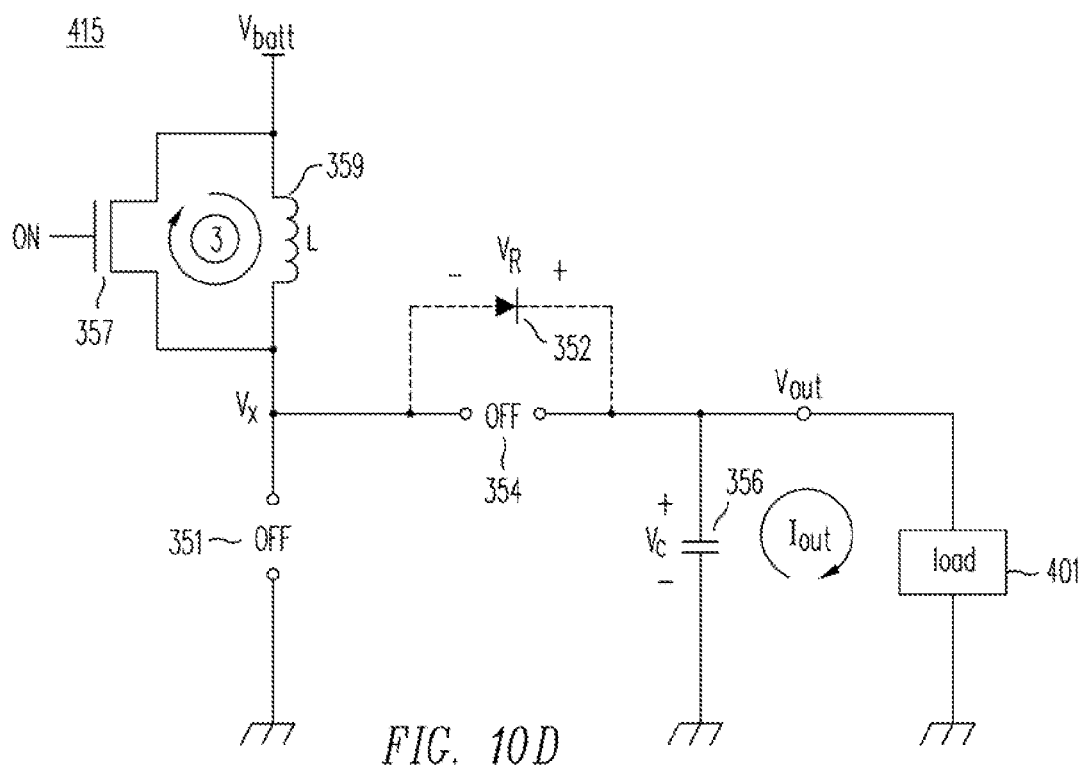
FIG. 10D is an equivalent circuit diagram of a synchronous freewheeling boost converter in the freewheeling stage.

The next operating phase is represented by step 424 in FIG. 11A and is shown in the equivalent circuit of FIG. 10D. Freewheeling MOSFET 357 is turned on and carries the entire inductor current (arrow (3)), i.e., $I_L=I_{FW}$, with an initial value represented by point 447 and decaying to a value represented by point 443 at time t=T. The voltage at node $V_x$ 435 drops to $V_x=(V_{batt}+I_L \cdot R_{DS(FW)})$ a value less than $V_{OUT}$ but greater than $V_{batt}$. Accordingly diode, 352 becomes reverse-biased and non-conducting as shown by dotted line 448 in graph 440. This state of operation is the freewheeling condition not present in conventional Buck or Buck-boost converters. The freewheeling condition may vary in time or be of a fixed duration. In the example shown in FIG. 11B, the total period is fixed at a duration T comprising some combination of magnetizing, transfer and freewheeling operation of corresponding durations $t_{on}$, $t_{xfer}$, and $t_{fw}$ respectively. In one possible control scheme, the freewheeling time fills in whatever portion of the period is not performed by magnetizing and transferring, i.e. where $t_{fw}=T-(t_{on}+t_{xfer})$.

A unique signature of freewheeling operation is that current flow path (3) shown in FIG. 10D does not result in current flow to the inductor from the battery or to ground as does magnetizing current path (1) in FIG. 10A or transfer current path (2) in FIG. 10C. In other words, the only significant ground current flowing during freewheeling operation is from output capacitor 356 supplying temporarily load 401.

Before repeating the cycle shown in algorithm 420, freewheeling MOSFET must be turned off for a duration $t_{BBM}$ (step 425). Since all MOSFETs are momentarily off the condition returns to that shown in FIG. 10B, where the current (represented by point 449 in graph 440) forward-biases diode 352, and where $V_x$ increases back to the voltage shown by waveform 437 in graph 430. If the transition is short enough or the turn off of freewheeling MOSFET 357 is slowed, the peak of the voltage $V_x$ during this transition may be reduced to a smaller value illustrated by curve 436 or to some intermediate current depending on the magnitude of parasitic capacitances.

Power MOSFET Body and Gate Biasing in Freewheeling Boost Converters

A critical component in both the non-synchronous and synchronous freewheeling boost converters of FIGS. 4 and 9 is the body bias generator that controls the body terminal of the freewheeling MOSFET in parallel with the inductor. If a forward-biased diode in parallel with the freewheeling MOSFET's channel is present in either polarity, the circuit will not operate. In step up operation, the $V_x$ node must be free to switch from near ground to above $V_{OUT}$ irrespective of the value of $V_{batt}$. The freewheeling MOSFET must therefore be fabricated in a manner where no P-N diode can become forward-biased and limit its voltage swing in either Quadrant I or Quadrant III. In other words, the freewheeling MOSFET must be a bidirectional switch capable of blocking current in either direction when it is turned off.

Figure 14:
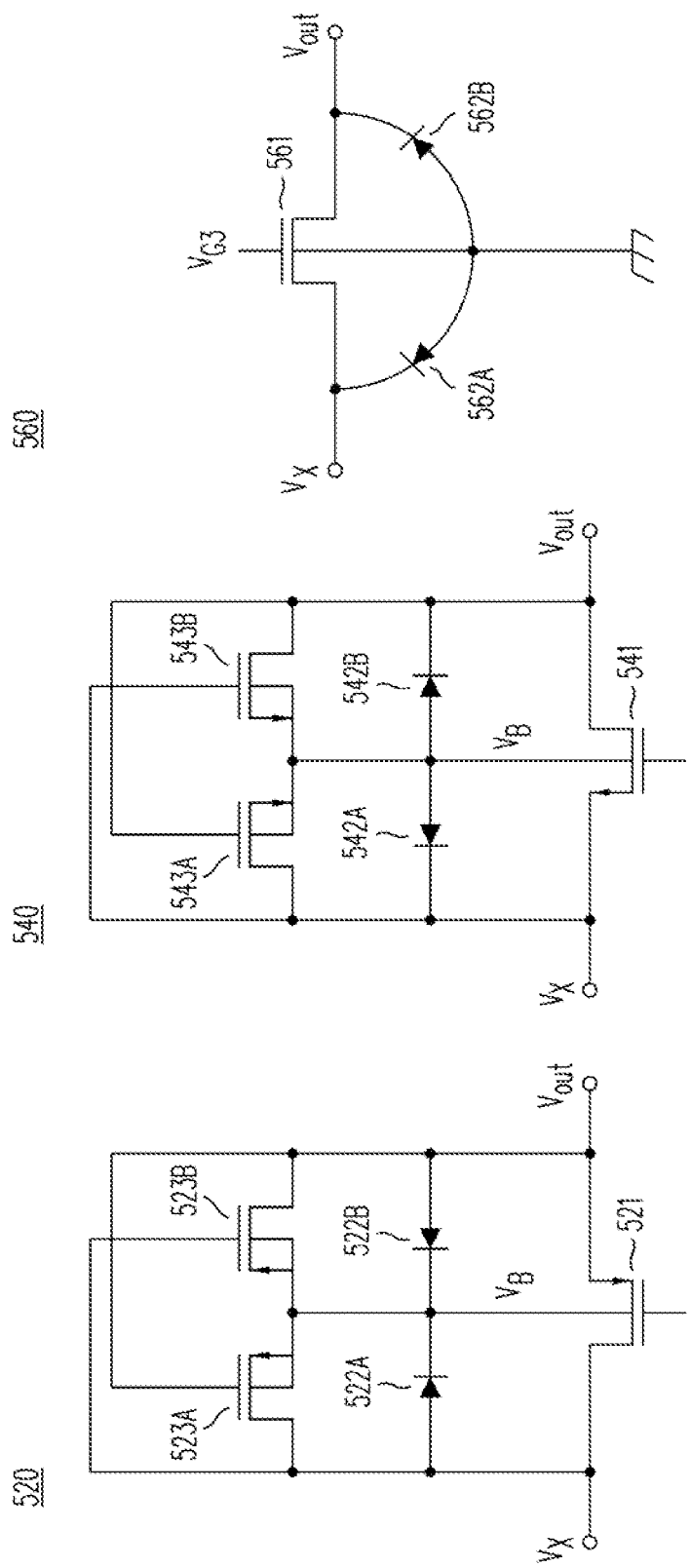
FIG. 14A, is a circuit diagram of an unclamped synchronous rectifier comprising a P-channel MOSFET with a body-bias-generator.
FIG. 14B is a circuit diagram of an unclamped synchronous rectifier comprising an N-channel MOSFET with a body-bias-generator.
FIG. 14C is a circuit diagram of an unclamped synchronous rectifier comprising an N-channel MOSFET with a grounded body.

One such way to avoid forward-biasing of any P-N diode is to implement the free beefing MOSFET using an N-channel power MOSFET with its body grounded and not being shorted to either its source or its drain. In such a case both source-to-body and drain-to-body diodes remain reverse-biased at all times. N-channel MOSFETs with grounded, i.e.

substrate connected, body terminals are commonly available in non-isolated CMOS processes. A MOSFET of this type is shown in FIG. 14C.

The alternative approach is to employ either a P-channel or an N-channel power MOSFET with a body bias generator as the freewheeling MOSFET.

Figure 12A:
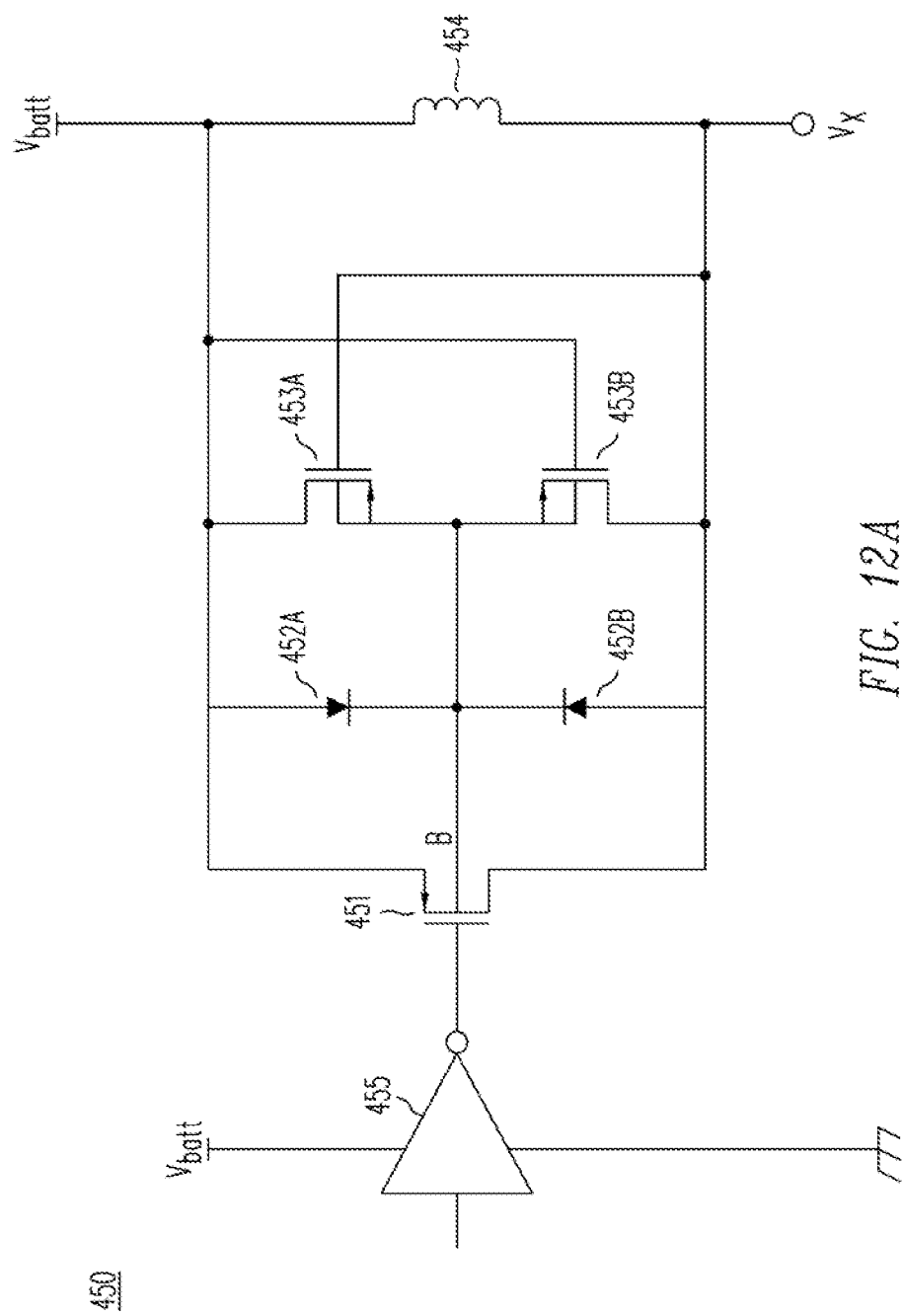
FIG. 12A is a circuit diagram of a body-bias generator for a P-channel freewheeling MOSFET.

The purpose of the body bias generator is to prevent the forward-biasing of any source-to-body or drain-to-body diodes regardless of the source-to-drain voltage and polarity. Circuit 450, shown in FIG. 12A, illustrates a freewheeling P-channel MOSFET 451 connected in parallel with an inductor 454 between the $V_x$ and $V_{batt}$ circuit nodes in a freewheeling boost converter in accordance with this invention. As a battery connected "high-side" device, the gate drive of P-channel 451 can be facilitated using a CMOS inverter 455 powered from $V_{batt}$. Pulling the gate of MOSFET 451 to ground turns on the device fully enhanced with a gate bias of $V_{GS}=-V_{batt}$.

Diodes 452A and 452B represent the source-to-body or drain-to-body diodes intrinsic to power MOSFET 451. In parallel with these diodes P-channel MOSFETs 453A and 453B operate to shunt, i.e. short out, whichever diode becomes forward-biased, ensuring that the other one of MOSFETs 453A and 453b remains reverse-biased and blocking current. Such MOSFETs are sometimes referred to as body-bias or "body snatcher" devices since they control the bias on the power MOSFET's body or back-gate terminal "B". The gates of the body bias MOSFETs are cross coupled, meaning that the gate of MOSFET 453A is connected to the source of MOSFET 453B and conversely, the gate of MOSFET 453B is connected to the source of MOSFET 453A. As shown, device 450 is symmetric in its construction so that the nomenclature of source and drain elements is arbitrary.

In operation, whenever $V_{batt}>V_x$ the $V_{GS}$ of P-channel MOSFET 453B is positive and therefore MOSET 453B is off. Under such conditions, the $V_{GS}$ of P-channel 453A is negative, turning the MOSFET 453A on, shorting out diode 452A, and biasing the body terminal B of power MOSFET 451 to the $V_{batt}$ potential. With the cathode of diode 452B biased to $V_{batt}$ and its anode biased to a more negative $V_x$ potential, diode 452B remains reversed-biased and non-conducting. Such a condition occurs in the freewheeling boost converter when the low-side MOSFET is on and $V_x$ is pulled down to a near ground potential.

Conversely, whenever V, $V_x>V_{batt}$, the $V_{GS}$ of P-channel MOSFET 453A is positive and therefore MOSFET 453A is off. Under such conditions, the $V_{GS}$ of P-channel 453 is negative, turning the MOSFET 453B on, shorting out diode 452B, and biasing the body terminal B of power MOSFET 451 to the $V_x$ node. With the cathode of diode 452A biased to $V_x$ and its anode biased to a more negative $V_{batt}$ potential, diode 452A remains reversed-biased and non-conducting. Such a condition occurs in the freewheeling boost converter when the low-side MOSFET is off and $V_x$ flies up to a potential above $V_{batt}$, either during freewheeling or during the transfer phase of operation.

Figure 12D:
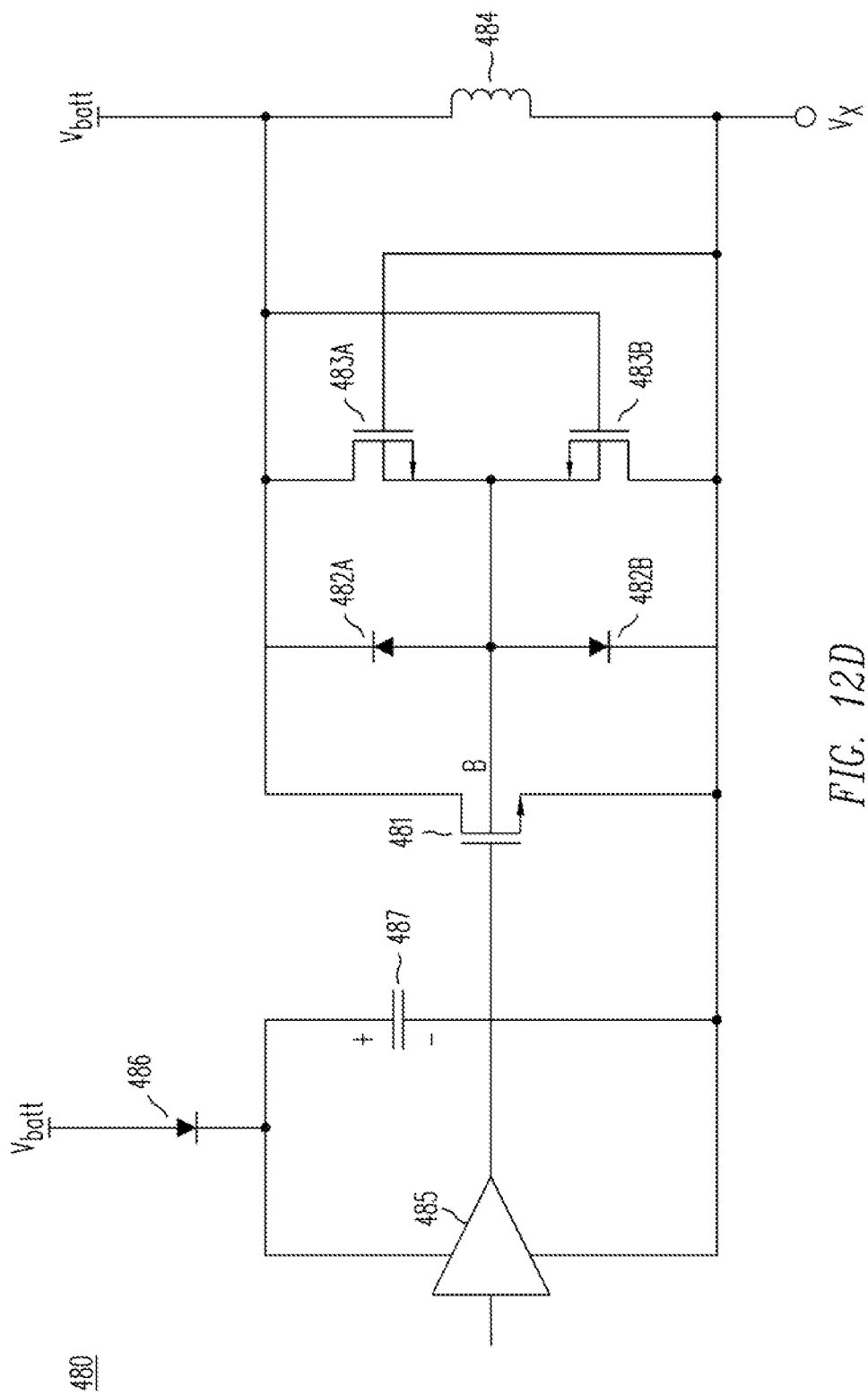
FIG. 12D is a circuit diagram of a body-bias generator for an N-channel freewheeling MOSFET.

FIG. 12D illustrates an N-channel implementation of the freewheeling MOSFET. Circuit 480 includes N-channel freewheeling MOSFET 481 in parallel with inductor 484. MOSFET 481 includes intrinsic body P-N diodes 482A and 482B having their anodes electrically connected to the P-type body terminal B of MOSFET 481 and with their cathodes electrically connected to $V_{batt}$ and $V_x$ respectively. In parallel with diodes 482A and 482B, N-channel MOSFETs 483A and 483B operate to shunt, i.e. short out, whichever diode becomes forward-biased, ensuring that the other one of MOSFETs 483A and 483B remains reverse-biased and blocking current. Such MOSFETs are sometimes referred to as body-bias or "body snatcher" devices since they control the bias on the power MOSFET's body or back-gate terminal "B". The gates of the body-bias MOSFETs 483A and 483B are cross coupled, meaning that the gate of MOSFET 483A is connected to the source of MOSFET 483B and conversely, the gate of MOSFET 483B is connected to the source of MOSFET 483A. As shown, circuit 480 is symmetric in its construction so that the nomenclature of source and drain elements is arbitrary.

In operation, whenever $V_{batt}>V_x$ the $V_{GS}$ of N-channel MOSFET 483B is positive and therefore MOSFET 483B is on, shorting out diode 482B and biasing the body terminal B of power MOSFET 481 to $V_x$. Under such conditions, the $V_{GS}$ of N-channel MOSFET 483A is negative, turning MOSFET 483A off. With the cathode of diode 482A biased to $V_{batt}$ and its anode biased to the more negative $V_x$, diode 482A remains reversed-biased and non-conducting. Such a condition occurs in the freewheeling boost converter when the low-side MOSFET is on and $V_x$ is pulled down to a near ground potential.

Conversely, whenever $V_x>V_{batt}$, the $V_{GS}$ of N-channel MOSFET 483B is negative and therefore MOSFET 483B is off. Under such conditions, the $V_{GS}$ of N-channel 483A is positive, turning the MOSFET 483A on, shorting out diode 482A, and biasing the body terminal B of power MOSFET 481 to $V_{batt}$. With the anode of diode 482B biased to $V_{batt}$ and its cathode biased to the more positive $V_x$, diode 482B remains reversed-biased and non-conducting. Such a condition occurs in the freewheeling boost converter when the low-side MOSFET is off and $V_x$ flies up to a potential above $V_{batt}$, either during freewheeling or during the transfer phase of boost operation. In this manner body bias generator circuit 480 prevents the forward biasing of any P-N diodes in N-channel freewheeling MOSFET 481 in a manner analogous to the way circuit 450 in FIG. 12A prevents forward-biased diode conduction in P-channel MOSFET 451.

Because freewheeling MOSFET 481 is an N-channel MOSFET, biasing it into a conducting on condition requires a gate drive with a potential several volts greater than $V_x$, even when $V_{batt}$ and $V_x$ and are at approximately the same potential. That means gate buffer 485 must be powered by a potential greater than the battery input voltage $V_{batt}$. One method to achieve such a floating supply is to employ a bootstrap diode 486 and bootstrap capacitor 487 as illustrated in circuit 480. Whenever the $V_x$ node is biased near ground, bootstrap diode 486 conducts and charges bootstrap capacitor 487 to a voltage $V_{cap}$ approximately equal to $V_{batt}$.

When MOSFET 481 is turned on and $V_x$ rises, the positive terminal of capacitor 487 rises along with it, powering gate buffer 485 with a voltage approximately equal to $V_{cap}+V_x$ regardless of the value of $V_x$. Such bootstrap gate drive requires constant switching operating to prevent the voltage on capacitor 487 from decaying. Alternative gate drive circuits, such as a charge pump or a switched capacitor circuit well known to those skilled in the art, may be used to power buffer 485.

Aside from the added circuit complexity in driving the gate of N-channel freewheeling MOSFET 481, the P-channel freewheeling MOSFET 451 has one other advantage. In implementing body bias circuits 450 and 480, the body of the freewheeling MOSFET must be electrically disconnected from ground and allowed to float to various potentials. In conventional CMOS processes, the body of a P-channel device is formed in N-type material and naturally forms a reversed-biased junction to surrounding P-type substrate material. No special process steps are required to electrically isolate its body terminal.

In contrast, conventional CMOS processes do not employ isolation techniques and therefore all N-channel MOSFETs share a common ground-connected P-type substrate. To form an isolated device needed to implement an N-channel freewheeling MOSFET, extra processing steps are required, adding cost and complexity to wafer fabrication. On the other hand, N-channel MOSFETs have the advantage that they are typically two to three times smaller than P-channel MOSFET's of the same on-resistance.

Body bias circuits are also described in U.S. Pat. No. 5,689,209 to Williams et al., which is incorporated herein in its entirety.

While a body bias generator circuit is known, its function in biasing the freewheeling MOSFET in a freewheeling converter is novel. The body bias generator represents one means by which to facilitate freewheeling MOSFET operation in the freewheeling boost converter without unwanted diode conduction. Without eliminating the forward-biased diode condition in the freewheeling MOSFET, the maximum value of $V_x$ in a freewheeling converter would be limited to a voltage one forward-biased diode-drop $V_f$ above $V_{batt}$, rendering the regulator inoperative as a boost converter.

In contrast to the freewheeling MOSFET which must avoid forward biased diode conduction between its source and drain, the synchronous rectifier MOSFET in the freewheeling boost converter includes a parallel source-to-drain diode which is allowed to conduct during some phases of circuit operation. Accordingly any power MOSFET with a source-body short may be used as the synchronous rectifier device in a freewheeling boost converter without the necessity of a body-bias generator circuit. FIGS. 12B and 12C illustrate two such implementations.

In FIG. 12B circuit 460 comprises a P-channel MOSFET 461 with source-body short and a parallel diode 462. The anode of diode 462 is connected to the $V_x$ node while its cathode is connected to the output terminal. The gate of P-channel synchronous rectifier MOSFET 461 is driven by a gate buffer 463 which may comprise a CMOS inverter or functionally similar device. Biasing $V_{G3}$ to ground turns on synchronous rectifier MOSFET 461 shunting current around diode 462 whenever it is forward-biased. MOSFET 461 is shut off by connecting its gate to the most positive voltage, in the case of a boost converter, to $V_{OUT}$. As a P-channel device, synchronous rectifier MOSFET 461 can remain on and conducting for extended durations and does not require constant switching.

In FIG. 12C, circuit 470 comprises an N-channel MOSFET 471 with source-body short and a parallel diode 472. The anode of diode 472 is connected to the $V_x$ node while its cathode is connected to the output pin $V_{OUT}$. The gate of N-channel synchronous rectifier MOSFET 471 is driven by a gate buffer 473 which may comprise a CMOS inverter or a functionally similar device powered by a floating bootstrap capacitor 474. Biasing $V_{G3}$ to the positive terminal of capacitor 474 turns on synchronous rectifier MOSFET 471, thereby shunting current around diode 472 whenever it is forward-biased. MOSFET 471 is shut off by connecting its gate to ground.

Bootstrap capacitor 474 must be periodically charged to maintain adequate gate drive to power synchronous rectifier MOSFET 471. Specifically, whenever V, is biased to a potential near ground, i.e. when the converter's low-side MOSFET is on, a bootstrap diode 475 conducts and charges capacitor 474 to a voltage $V_{boost} \to (V_{batt} - V_f)$. Whenever the low-side MOSFET is off and $V_x$ is above $V_{batt}$, diode 475 is reverse-biased. The charge on capacitor 474 is then used to drive the gate of synchronous rectifier MOSFET 471. In its conducting state where $V_x \approx V_{batt}$, then $V_{G3} = (V_x + V_{boost})$. The gate to source bias on N-channel. MOSFET 471 is then equal to $V_{boost}$ at the onset of conduction and decays gradually thereafter from leakage currents. Thus, unlike P-channel synchronous rectifier 461, N-channel synchronous rectifier 471 requires repeated switching and cannot remain on and conducting for extended durations.

Unclamped Synchronous Freewheeling Up-Down Converter

Figures 1A, 1B:
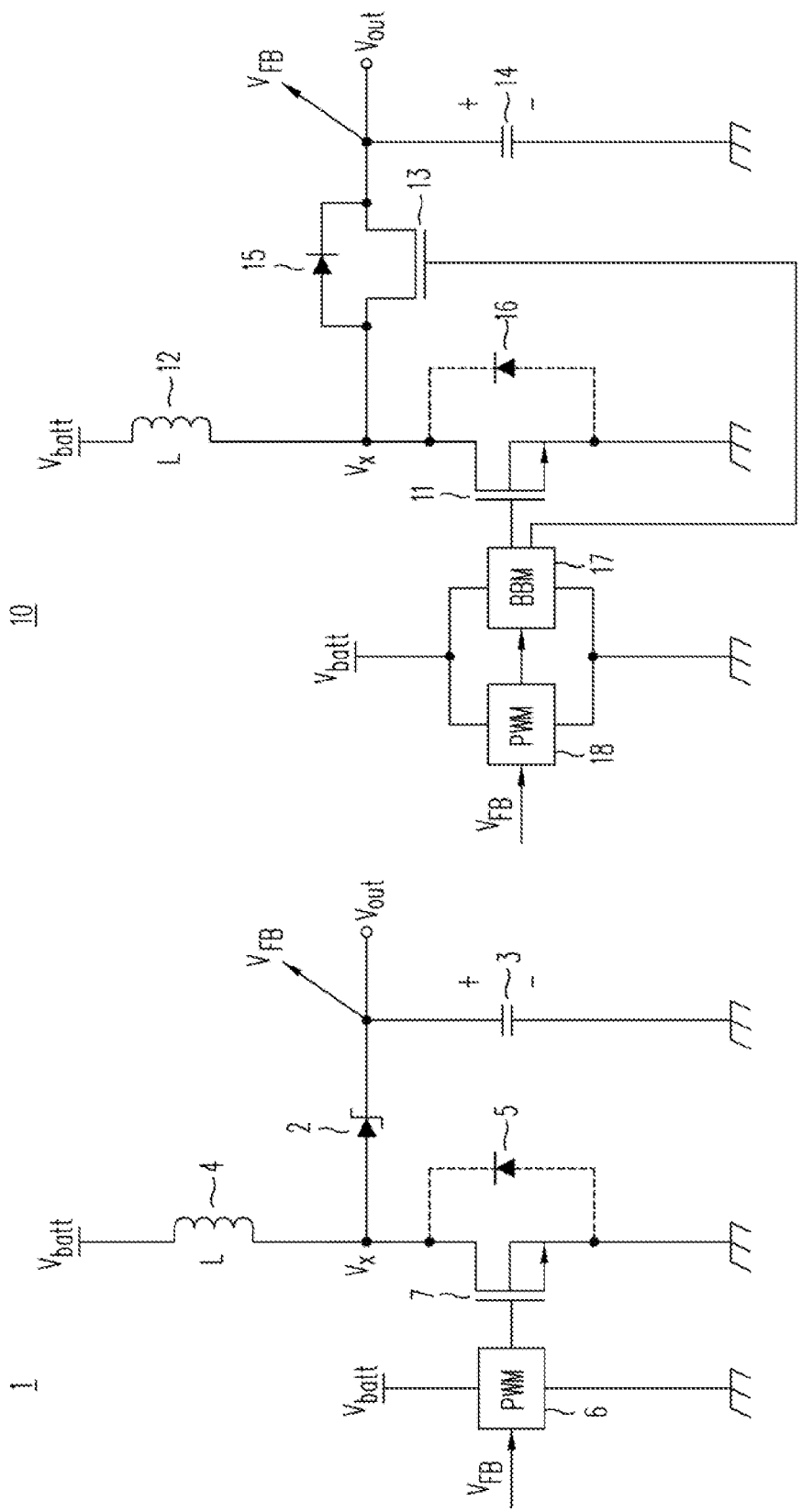
FIG. 1A is a circuit diagram of a conventional non-synchronous boost converter.
FIG. 1B is a circuit diagram of a conventional synchronous boost converter.
Figure 1C:
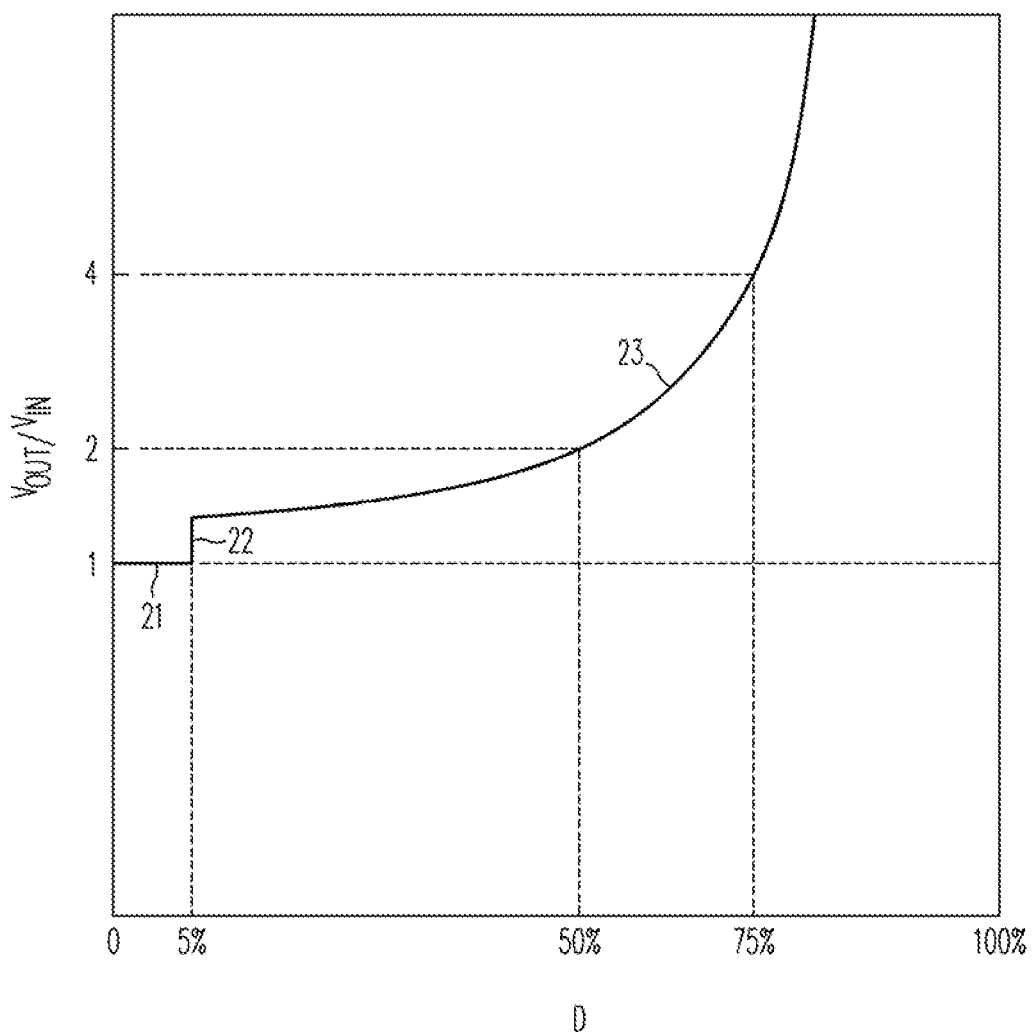
FIG. 1C is a graph showing the transfer characteristics of a conventional boost converter.
Figure 1D:
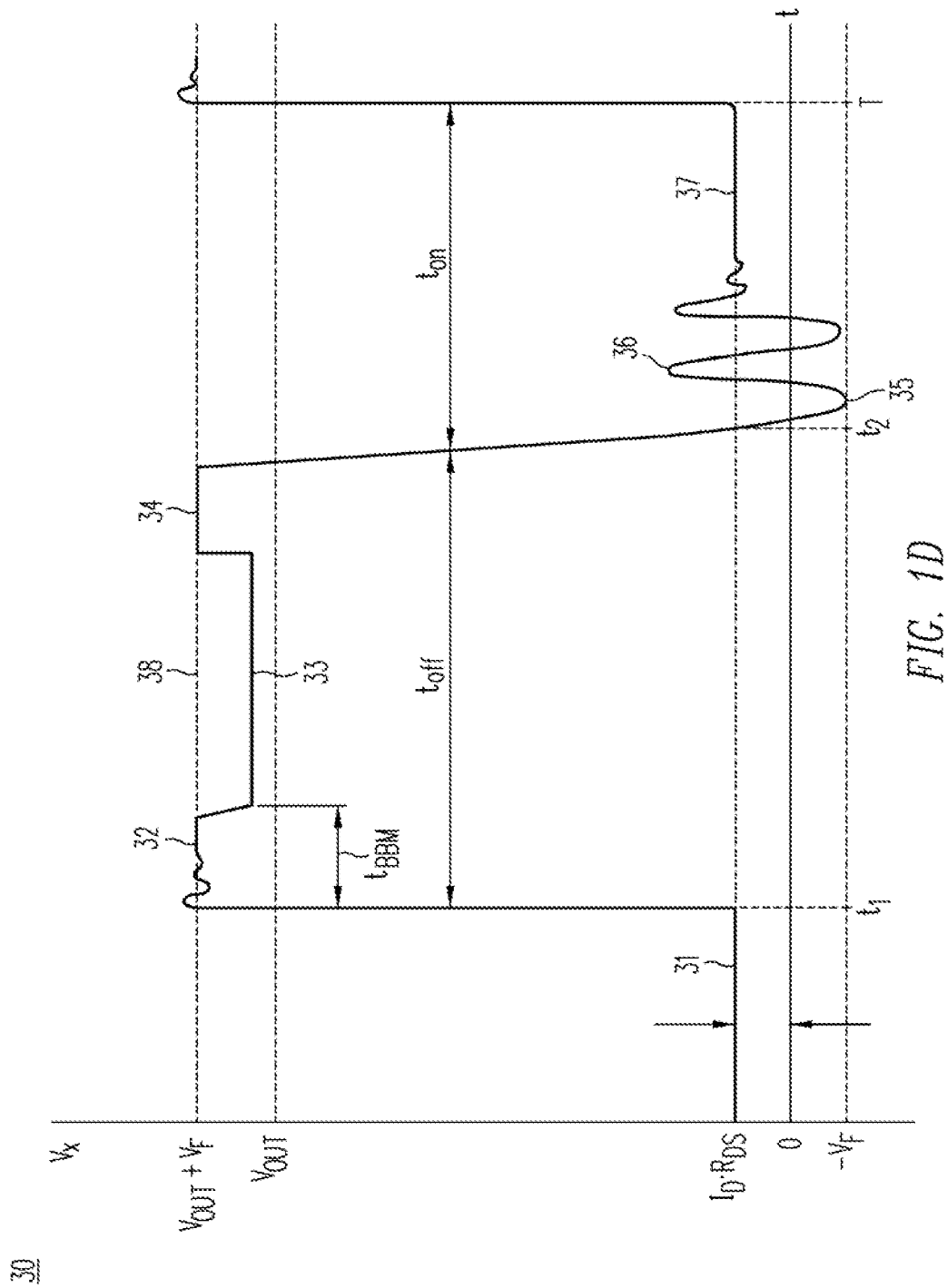
FIG. 1D is a graph of the switching waveforms of a conventional boost converter.
Figure 2A:
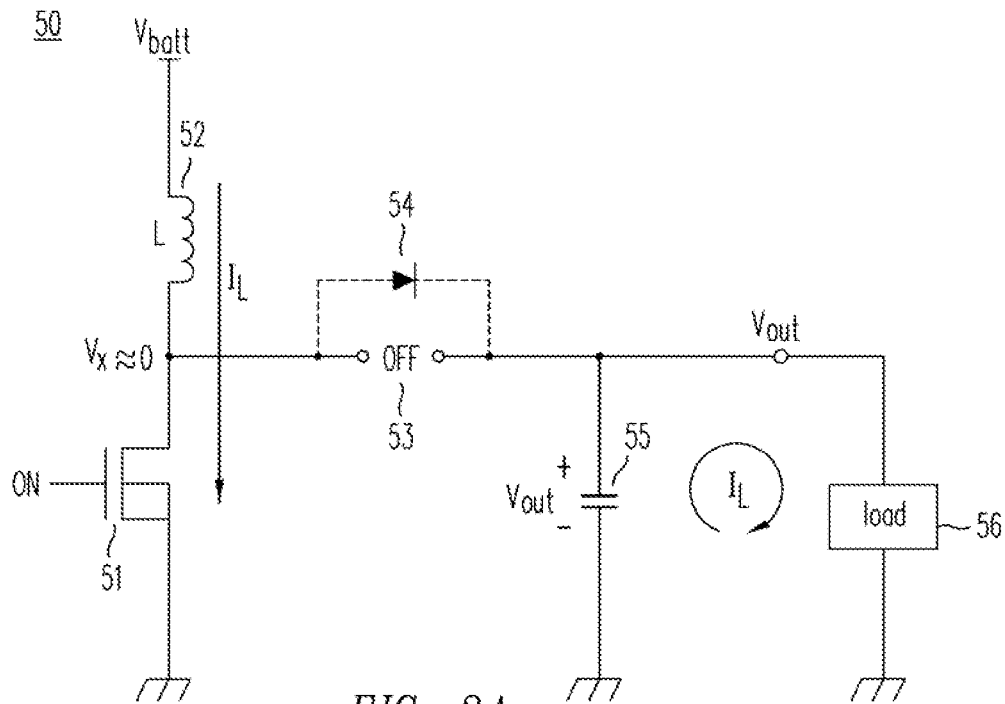
FIG. 2A is an equivalent circuit diagram of a conventional synchronous boost converter in the magnetizing stage.
Figure 2B:
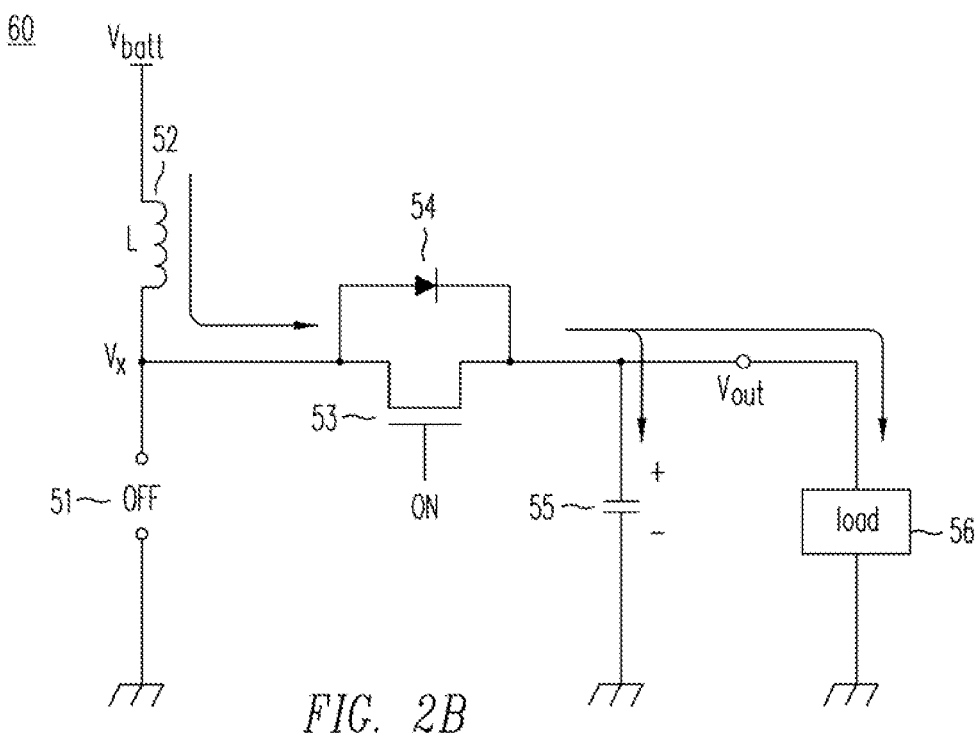
FIG. 2B is an equivalent circuit diagram of a conventional synchronous boost converter in the charge transfer stage.
Figure 2C:
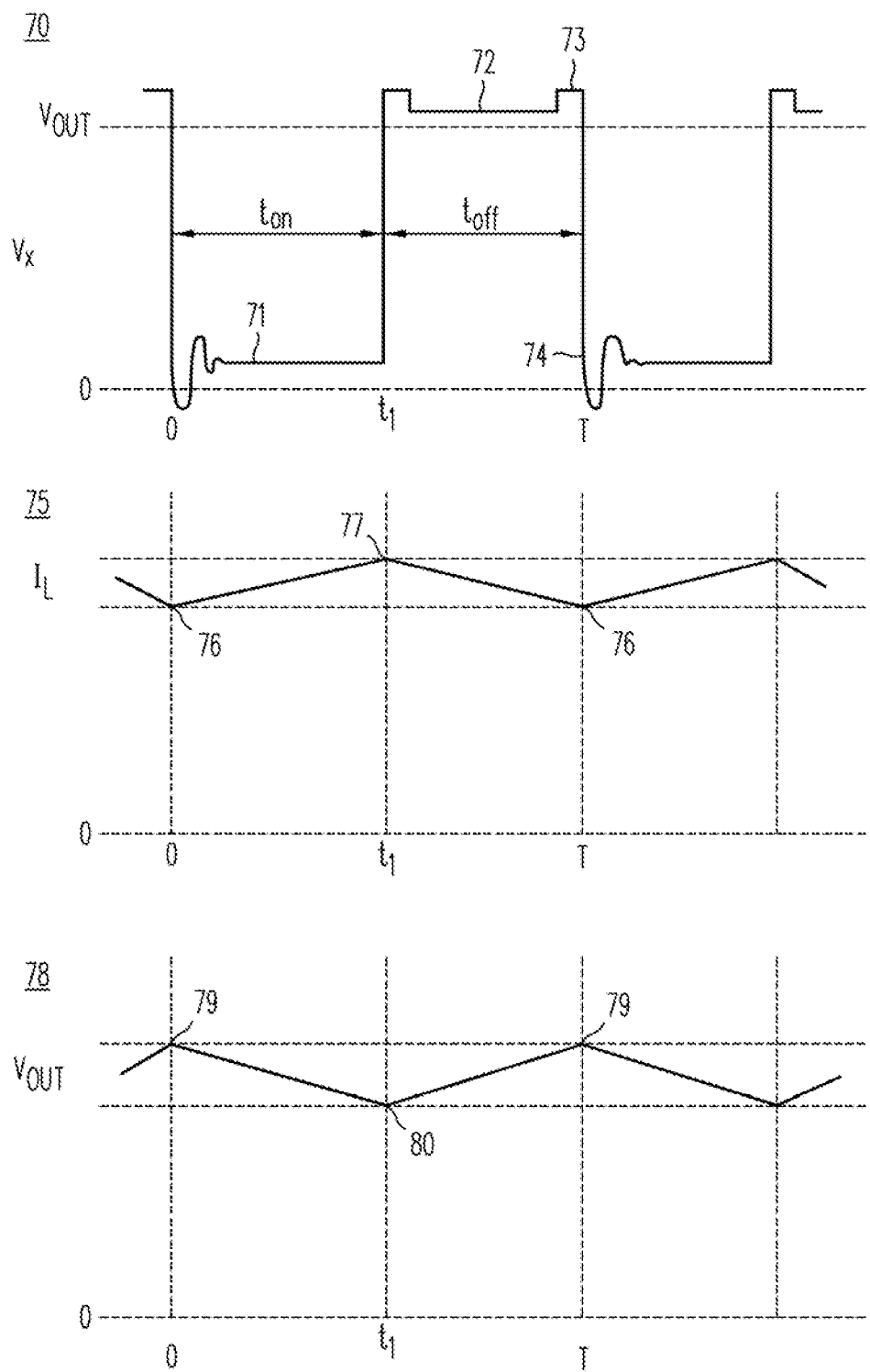
FIG. 2C shows graphs of waveforms in a conventional boost converter operating in a full load condition.
Figure 2D:
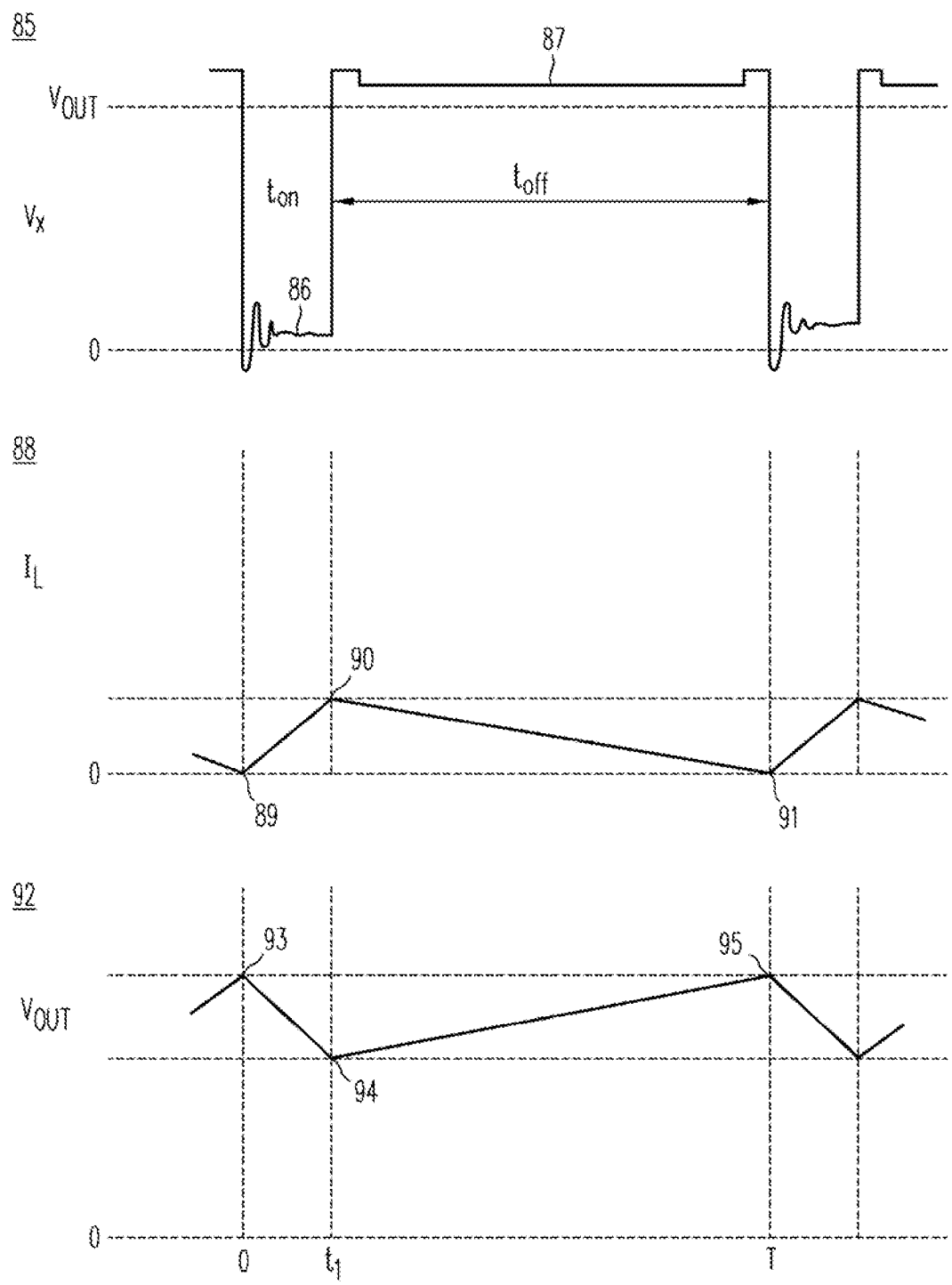
FIG. 2D shows graphs of waveforms in a conventional boost converter operating in a light load condition.
Figure 2E:
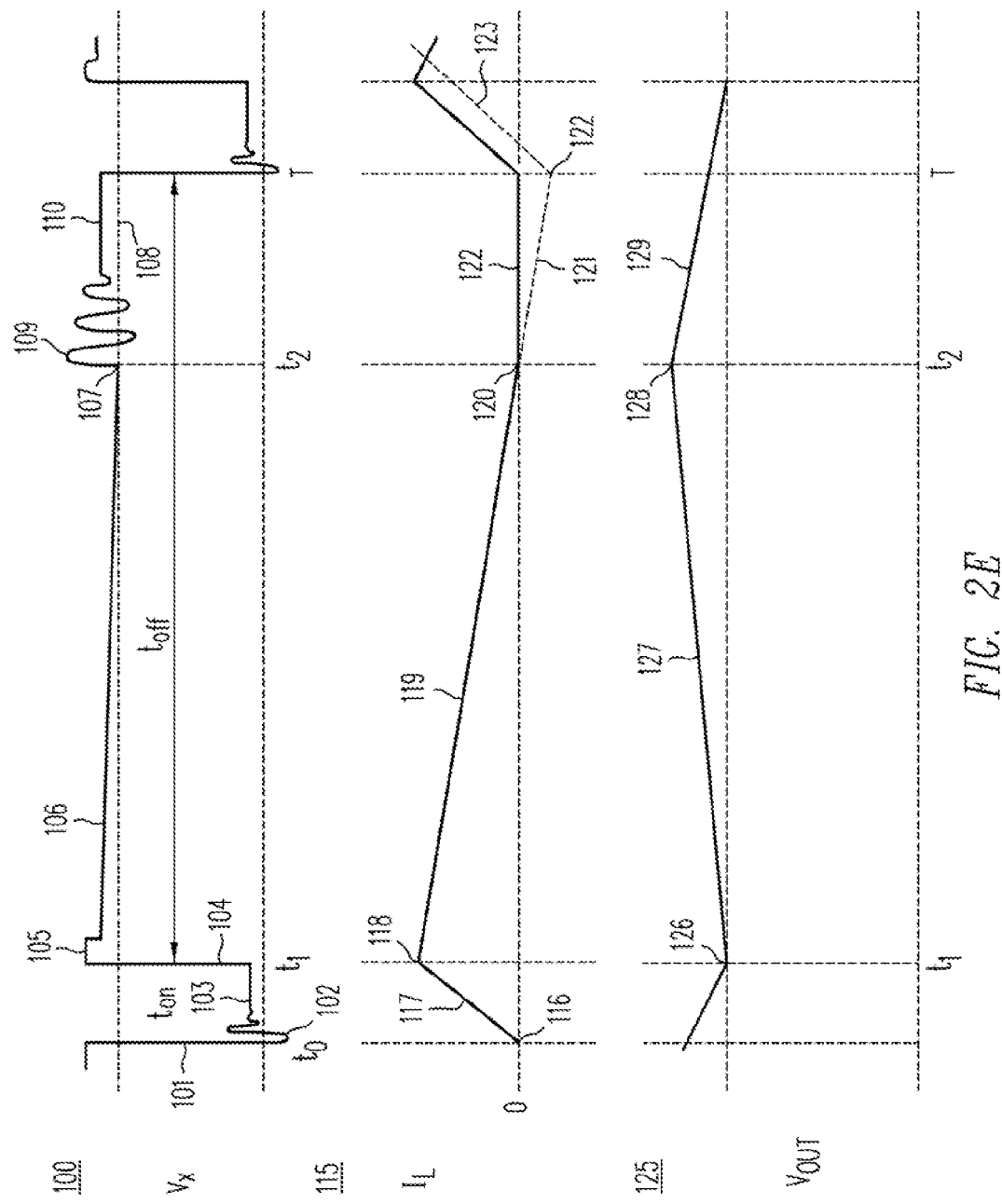
FIG. 2E shows graphs of waveforms in a conventional boost converter operating in a discontinuous conduction condition.

In the prior art boost converters of FIGS. 1A and 1B and in the disclosed freewheeling boost converters of FIGS. 4 and 9, a rectifier diode is connected between the $V_x$ node and the converter's output terminal. This rectifier diode becomes forward-biased whenever energy is being transferred to the load and otherwise remains reverse-biased and non-conducting.

Because of this output-connected rectifier diode, the output voltage pre-charges to $V_{batt}$ as soon as power is applied to the converter's input. As a result, the boost converter cannot be used to step down an input voltage to a lower voltage. The lowest possible voltage output of a boost converter is therefore equal to its input, even approaching a duty cycle of 0%.

The rectifier diode performs another important role—to clamp the maximum voltage on the $V_x$ node. With the diode present under any circumstance, the maximum value of $V_x$ is a voltage one diode drop above the output voltage, i.e. $V_x \leq (V_{OUT} + V_f)$.

Figure 3A:
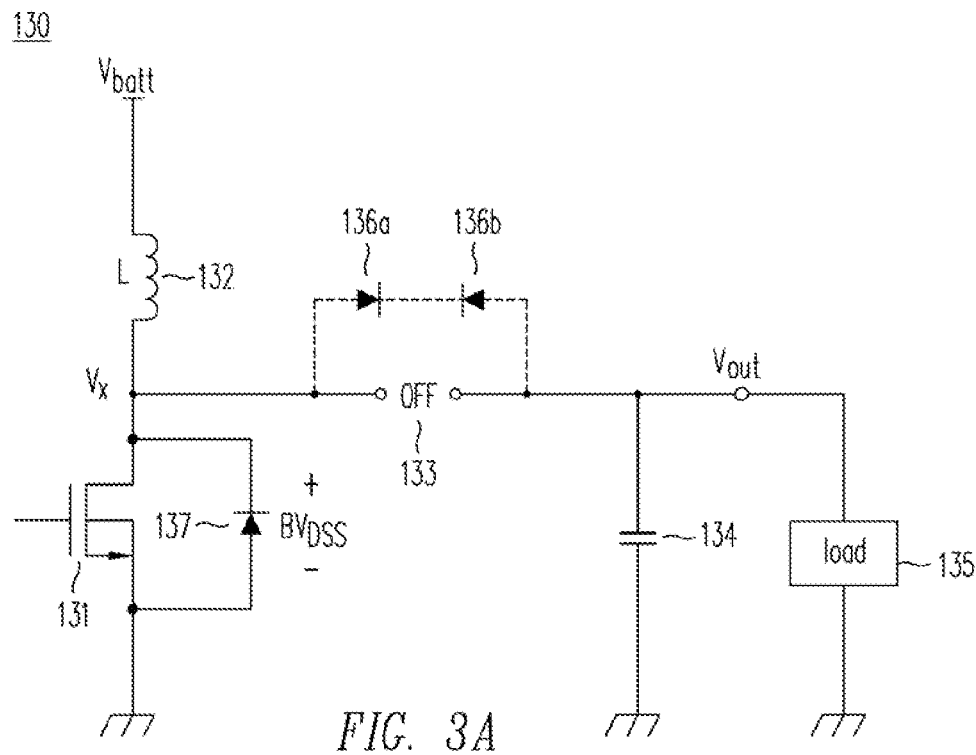
FIG. 3A is an equivalent circuit diagram of a synchronous boost converter without a rectifier diode.
Figure 3B:
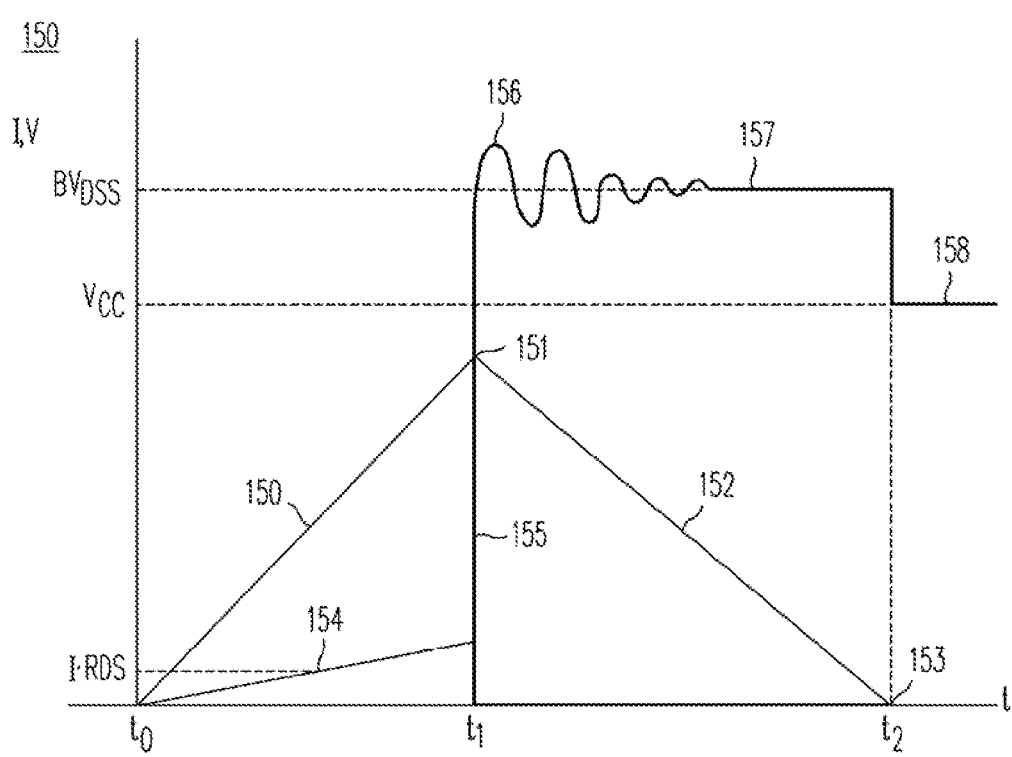
FIG. 3B is a graph of waveforms in a synchronous boost converter in an unclamped inductive switching (UIS) condition.

As described with respect to FIG. 3, eliminating the output rectifier allows $V_x$ to rise without limit until the diode 137 across the low-side MOSFET 131 goes into avalanche breakdown. In boost converter 1 in FIG. 1A eliminating Schottky diode 2 would cause diode 5 to avalanche whenever low-side MOSFET 7 is off. In synchronous boost converter 10 in FIG. 1B eliminating P-N diode 15 would cause diode 16 to avalanche whenever low-side MOSFET 11 and synchronous rectifier MOSFET 13 are both off.

Unfortunately, to step down an input voltage to a lower output voltage using a high-side connected inductor, i.e. modifying a boost converter for step-down operation, it is necessary to disconnect the inductor from the output whenever the output hits its target output voltage without causing unclamped inductive switching. No existing converter topology today meets that criterion—the ability to sustain a condition where neither the inductor is being magnetized nor is the output capacitor being charged yet unclamped inductive switching does not occur.

As described previously and in contrast to normal boost converters, the disclosed freewheeling boost converters 200 and 350 shown in FIGS. 4 and 9 operate in three stable states, namely magnetization, energy transfer and freewheeling. Normal boost converters do not include a freewheeling state and therefore cannot sustain any condition that does not involve moving energy out of the source or into the load.

By appropriately modifying the freewheeling converter 350 of FIG. 9, an up-down converter and regulator can be implemented capable of stepping up or down a voltage input dynamically and continuously using a single circuit. Specifically, by eliminating rectifier diode 352 and the source-body short in synchronous rectifier MOSFET 354, the converter is able to disconnect the output from the $V_x$ node at any time, including a condition when the output capacitor 356 is only partially charged and $V_{OUT} < V_{batt}$, i.e. during step down operation. To eliminate the source-body short, a body bias generator may be used to bias the body of the synchronous rectifier MOSFET 354. The body bias generator described previously in FIGS. 12A and 12D for the freewheeling MOSFET can be adapted for the same purpose.

Figure 13:
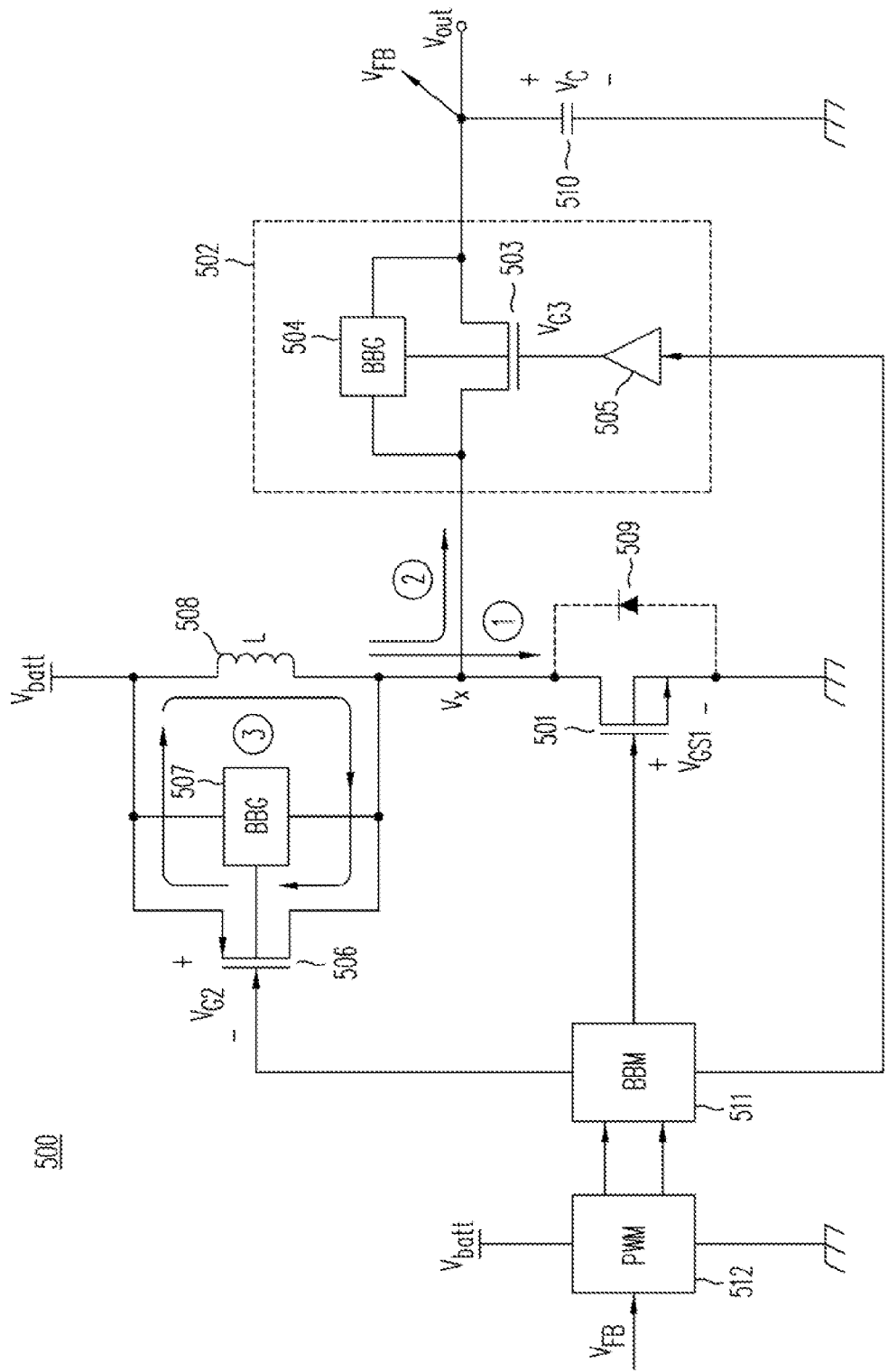
FIG. 13 is a circuit diagram of an unclamped synchronous freewheeling up-down converter.

The resulting synchronous freewheeling up-down converter 500 is illustrated in FIG. 13. Like the synchronous freewheeling boost converter 350 shown in FIG. 9, synchronous freewheeling up-down converter 500 includes a low-side N-channel MOSFET 501, an inductor 508, a freewheeling MOSFET 506 with a body-bias-generator 507, an output capacitor 510, a PWM controller 512, and a break-before-make buffer 511.

Unique to up-down converter 500, a synchronous rectifier 502 comprises a MOSFET 503 with a body bias generator 504 and a gate buffer 505 for driving its gate. No rectifier diode is present in synchronous rectifier 502. Synchronous rectifier MOSFET 503 may be P-channel or N-channel with appropriate adjustments to gate buffer 505 and the signal range $V_{G3}$.

For example, in one embodiment synchronous rectifier 502 may comprise a P-channel power MOSFET without a source-body short implemented using circuit 520 shown in FIG. 14A. For P-channel synchronous rectifier gate drive, the circuit 460 of FIG. 12B may be employed to create gate signal $V_{G3}$. As shown, power MOSFET 521 connected between the $V_x$ and $V_{OUT}$ nodes includes source-to-body and drain-to-body diodes 522A and 522B and has its body biased by cross coupled P-channel MOSFETs 523A and 523B in parallel with diodes 522A and 522B, respectively.

In operation, whenever $V_x > V_{OUT}$, MOSFET 523A is on and shorts out diode 522A while MOSFET 523B remains off and non-conducting. With MOSFET 523A on, the body bias $V_x = V_{OUT}$ and diode 522B is reverse-biased and non-conducting. Conversely if $V_x < V_{OUT}$, MOSFET 523B is on and shorts out diode 522B while MOSFET 523A remains off and non-conducting. With MOSFET 523B on, the body bias $V_B = V_{OUT}$ and diode 522A is reverse-biased and non-conducting. So no matter what the polarity of the source-to-drain potential applied to MOSFET 521, no diode conduction occurs in parallel with the channel of synchronous rectifier MOSFET 521.

In another embodiment, synchronous rectifier 502 may comprise a N-channel power MOSFET 541 without a source-body short implemented using circuit 540 shown in FIG. 14B. For a gate drive for N-channel MOSFET 541, bootstrap circuit 470 of FIG. 12C may be employed to create a gate signal $V_{G3}$. As shown, power MOSFET 541 connected between $V_x$ and $V_{OUT}$ nodes includes source-to-body and drain-to-body diodes 542A and 542B and has its body biased by cross coupled N-channel MOSFETs 543A and 543B in parallel with diodes 542A and 542B, respectively.

In operation, whenever $V_x > V_{OUT}$, MOSFET 543B is on and shorts out diode 542B while MOSFET 543A remains off and non-conducting. With MOSFET 543B on, the body bias $V_B = V_{OUT}$ and diode 542A is reverse-biased and non-conducting. Conversely if $V_x < V_{OUT}$, MOSFET 543A is on and shorts out diode 542A while MOSFET 543B remains off and non-conducting. With MOSFET 543A on, the body bias $V_B = V_x$ and diode 542B is reverse-biased and non-conducting. So no matter what the polarity of the source-to-drain potential applied to MOSFET 541, no diode conduction occurs in parallel to the channel of synchronous rectifier MOSFET 541.

In yet another embodiment, synchronous rectifier 502 may comprise a N-channel power MOSFET 561 without a source-body short implemented using a grounded body circuit 560 as shown in FIG. 14C. For a gate drive for N-channel MOSFET 561, bootstrap circuit 470 of FIG. 12C may be employed to create gate signal $V_{G3}$. As shown, power MOSFET 561 connected between $V_x$ and $V_{OUT}$ nodes includes source-to-body and drain-to-body diodes 562A and 562B with grounded anodes. Since $V_x > 0$ and $V_{OUT} > 0$, these diodes remain reverse-biased at all times. In operation however, since the source is not electrically connected to the body, a body effect will occur undesirably increasing the MOSFET's threshold potential by an amount proportional to the square root of the body bias voltage, i.e. where $$V_t = V_{to} + \Delta V_t \approx V_{to} + \gamma \sqrt{V_{SB}} = V_{to} + \gamma \sqrt{V_{OUT}}$$

A higher gate bias is needed to offset this increase in threshold potential or the on-resistance of synchronous rectifier MOSFET 561 will be higher than a comparably sized N-channel MOSFET 541 using body-bias generator technique as shown in circuit 540 of FIG. 14B.

Referring again to FIG. 13, freewheeling MOSFET 506 may be an N-channel or a P-channel MOSFET, but a P-channel MOSFET may be more convenient for implementing gate drive circuitry to supply gate signal $V_{G2}$. Body bias generator 507 eliminates any forward-biased P-N diode across the source-to-drain terminals of freewheeling MOSFET 506, i.e. no forward-biased diode can be present in either polarity between $V_x$ and $V_{batt}$. Break-before-make buffer 511 controls the gate signals to low-side MOSFET 501, synchronous rectifier MOSFET 505, and freewheeling MOSFET 506 to prevent overlapping conduction. Only one of the three power MOSFETs may conduct at any one time.

Similar to the operation of a synchronous freewheeling boost converter 350 shown in FIG. 9, converter 500 comprises three states, magnetizing, energy transfer, and freewheeling, corresponding to current flow arrows (1), (2), and (3) respectively. Unique to the synchronous freewheeling up-down converter 500, synchronous rectifier MOSFET 503 is able to partially charge capacitor 510 to any voltage above or below the $V_{batt}$ input, allowing converter 500 to operate in either step-up or step down mode, simply by controlling the time $t_{xfr}$ during which capacitor 510 is charged. If the $I_L$ is assumed constant for any short duration, then whenever MOSFET 503 is on and conducting, inductor 508 charges capacitor 510 so that $$\Delta V_{OUT} = \frac{\Delta Q}{C_{OUT}} = \frac{I_L \cdot t_{xfr}}{C_{OUT}}$$

Starting at zero, the voltage $V_{OUT}$ across output capacitor 510 can be charged to any arbitrary voltage above or below $V_{batt}$ simply by controlling the charging time $t_{xfr}$. For example, as shown in graph 580 of FIG. 15, after magnetizing inductor 508 with current for a time $t_1$ (interval (1)), low-side MOSFET 501 is turned off and synchronous rectifier MOSFET 503 is turned on, ramping the output voltage from ground at point 581 to some target $V'_{OUT}$ voltage (point 582) at time $t_2$ during which current flows into capacitor 510 (interval (2)). The voltage represented by point 582 is less than $V_{batt}$. Shutting off synchronous rectifier MOSFET 503 at time $t_2$ stops the charging of capacitor 510 at its target voltage. Since $V_{batt}$ exceeds $V'_{OUT}$, the operation of converter 500 in this mode is that of a step-down converter.

Ignoring the brief interval for break-before-make switching, freewheeling MOSFET 506 is turned on at the same time that MOSFET 503 is turned off allowing inductor current to freewheel without driving node $V_x$ into unclamped inductive switching (interval (3)). A fundamental component of converter 500, the conduction of freewheeling MOSFET 506, prevents UIS induced avalanche whenever both low-side and synchronous rectifier MOSFETs 501 and 503 are simultaneously off.

The output voltage is able to remain at the target value 583 for an indefinite period of time until, at time $t_3$, the PWM controller 512 may either refresh the charge on output capacitor 510 by turning off the freewheeling MOSFET 506 and turning on the synchronous rectifier MOSFET 503, or as shown in graph 580, refresh the current in inductor 508 by turning off the freewheeling MOSFET 506 and turning on low-side MOSFET 501 (interval (1)). The target voltage $V'_{OUT}$ may be therefore sustained indefinitely (segment 585) by the repeated application of magnetizing, transfer and freewheeling currents (intervals (1), (2) and (3)) in any sequence. Since $V_{OUT}<V_{batt}$ converter 500 is operating in step-down mode.

Alternatively in graph 590 of FIG. 15 after magnetizing inductor 508 with current for a time $t_1$ (interval (1)), low-side MOSFET 501 is turned off and synchronous rectifier MOSFET 503 is turned on, ramping the output voltage from ground at point 591 to some target $V'_{OUT}$ voltage (point 592) at time $t_2$ during which current flows into capacitor 510 (interval (2)). The time $t_2$ in graph 590 occurs later than the time $t_2$ in graph 580, and hence the output voltage rises to a value (point 592) higher than the value represented by point 582 in graph 580. The voltage represented by point 592 is also greater than $V_{batt}$. Shutting off synchronous rectifier MOSFET 503 at time $t_2$ stops the charging of capacitor 540 at its target voltage. Since $V'_{OUT}$ exceeds $V_{batt}$, the operation of converter 500 in this mode is that of a step-up converter.

Ignoring the brief interval for break-before-make switching, freewheeling MOSFET 506 is turned on at the same time MOSFET 503 is turned off, allowing the current in inductor 508 to freewheel, without driving node $V_x$ into unclamped inductive switching (interval (3)). A fundamental component of this converter, the conduction of freewheeling MOSFET 506 prevents UIS induced avalanche whenever both low-side and synchronous rectifier MOSFETs 501 and 503 are simultaneously off.

This condition is unique to a freewheeling converter since no current is flowing into the converter from the battery, and no energy is flowing from the inductor to ground or to the load, yet energy is still maintained in the inductor for some extended time, the time depending on the resistance of the freewheeling MOSFET.

The output voltage is able to remain at the target value 593 for an indefinite period of time until, at time $t_3$, the PWM controller 512 may either refresh the charge on output capacitor 510 by turning off the freewheeling MOSFET 506 and turning on the synchronous rectifier MOSFET 503, or as shown in graph 580 refresh the current in inductor 508 by turning off the freewheeling MOSFET 506 and turning on low-side MOSFET 501. The target voltage $V'_{OUT}$ may be therefore sustained indefinitely 595 by the repeated application of magnetizing, transfer and freewheeling currents (intervals (1), (2) and (3)) in any sequence.

So step-up and step-down operation of the free-wheeling converter 500 are essentially identical—the main difference is the time duration $t_{xfer}$ during which inductor 508 charges capacitor 510. For short transfer intervals, the output voltage rises by a small amount and step-down operation is achieved. For longer intervals, the output voltage rises by a larger amount and step-up operation is achieved. At some intermediate duration the output voltage will equal to the input voltage, i.e. a conversion ratio of unity. Whether stepping up or down or at unity conversion, there is no essential difference in the operating mode of the freewheeling converter disclosed herein.

While conventional so called Buck-boost converters must switch circuitry and operating modes from Buck to unity conversion and again to boost operation as a battery input decays, the freewheeling up-down converter has only one operating mode for all conversion ratios. Higher efficiency, more stable operation results from its simple control.

As described, synchronous freewheeling up-down converter 500 avoids unclamped inductive switching by turning on the freewheeling MOSFET whenever the other two MOSFETs are off. During break-before-make operation, all three MOSFETs are off. Unless the BBM interval is extremely short, the $V_x$ voltage will rise without limit and possibly go into unclamped inductive switching induced avalanche. If the interval is sufficiently short, parasitic capacitance associated with the power MOSFETs can filter and momentarily slow the otherwise rapid rise in $V_x$ in an unclamped condition.

In other words, a synchronous freewheeling up-down converter is unclamped during break before make operation. To clamp the voltage during BBM operation a momentarily forward-biased diode is required to limit the $V_x$ voltage swing. Unfortunately, except during BBM operation, the presence of a hard-wired forward-biased diode is problematic for normal operation of the freewheeling up-down converter. As described previously, the presence of a diode parallel to the synchronous rectifier interferes with step-down operation. Conversely a diode parallel to the freewheeling MOSFET interferes with step-up operation.

Adaptively Clamped Synchronous Freewheeling Up-Down Converter

To prevent unclamped inductive switching transients; a forward-biased diode must be present during the break-before-make interval. Since the diode connection needed for a boost or step-up conversion is different than that needed for step-down conversion, no single hardwired diode circuit can prevent UIS transients over the full range of bias conditions without interfering with normal up-down converter operation.

As an embodiment of this invention, an adaptive diode clamp circuit prevents unclamped inductive switching in the disclosed synchronous freewheeling up-down converter without affecting up-down converter operation. The principle of adaptive clamping is to connect a diode into the circuit that provides clamping depending on the bias conditions without interfering with normal operation.

Figure 16:
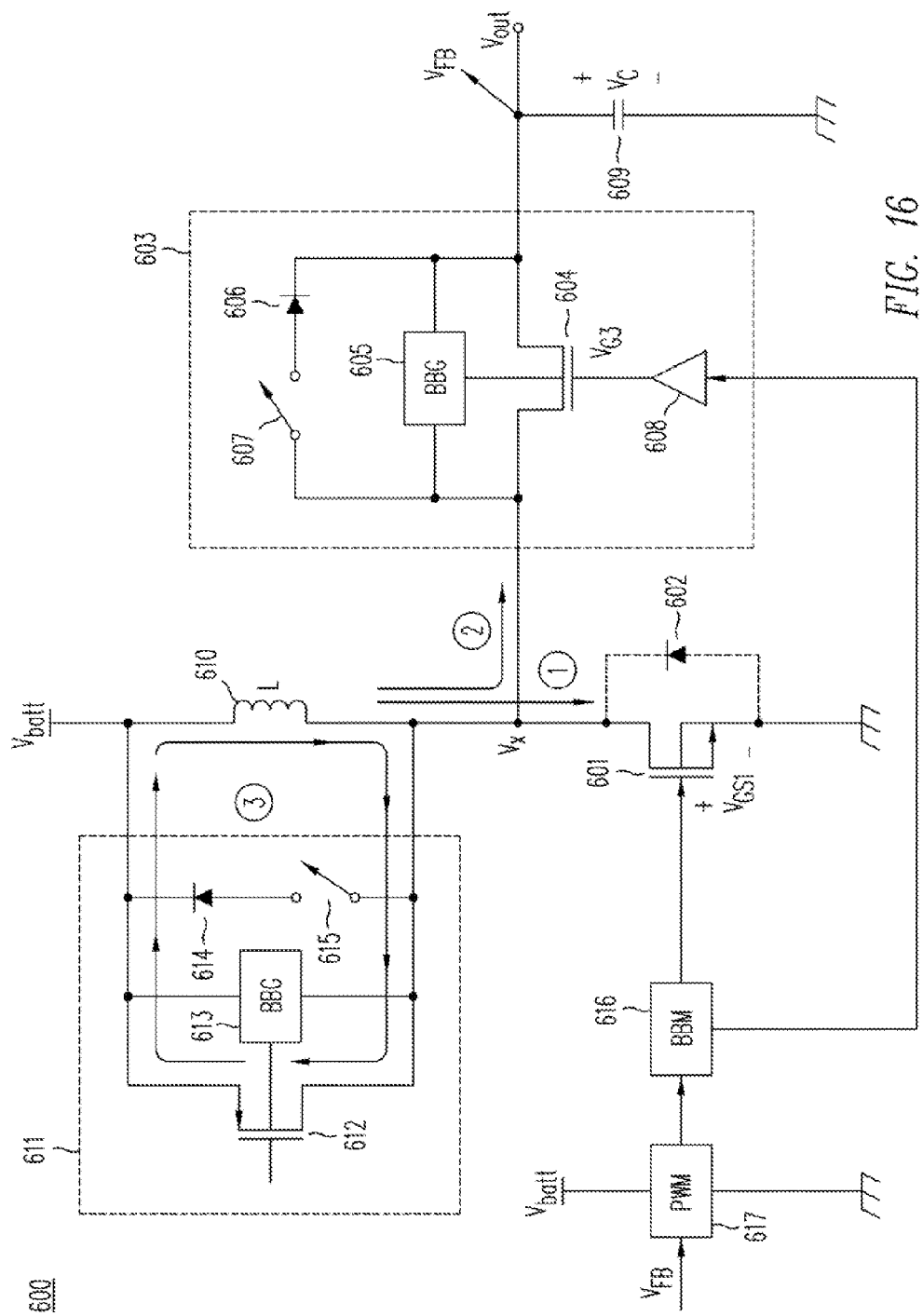
FIG. 16 is a circuit diagram of an adaptively-clamped synchronous freewheeling up-down converter.

As shown in FIG. 16, a clamped synchronous freewheeling up-down converter 600 comprises the circuit of converter 500 with the added elements of diodes 614 and 606 with associated switches 615 and 607, respectively. Like converter 500, circuit 600 includes a low-side N-channel MOSFET 601, an inductor 610, a freewheeling MOSFET 612 with a body-bias-generator 613, a synchronous rectifier 603 comprising a MOSFET 604 with a body bias generator 605 and a gate buffer 608, an output capacitor 609, a PWM controller 617, and a break-before make buffer 616. Synchronous rectifier MOSFET 604 and freewheeling MOSFET 612 may be P-channel or N-channel with appropriate adjustments to gate drive.

The switches 615 and 607, typically implemented using MOSFET devices, represent a means of connecting or disconnecting their corresponding diode. To facilitate adaptive clamping, only one of the diodes is connected at any given time depending on the relative magnitude of the $V_{batt}$ and $V_{OUT}$ voltages. In a preferred embodiment a comparator compares these magnitudes and turns on the appropriate switch according to truth Table 4:

TABLE 4

| Operating Mode | Condition | Switch 615 | Switch 607 | FW Diode 614 | SR Diode 607 |
|---|---|---|---|---|---|
| Step Down | $V_{batt} > V_{OUT}$ | closed | open | $V_x < V_{batt} + V_f$ | disconnected |
| Unity Transfer* | $V_{batt} \approx V_{OUT}$ | closed | open | $V_x < V_{batt} + V_f$ | disconnected |
| Boost/Step Up | $V_{batt} < V_{OUT}$ | open | closed | Disconnected | $V_x < V_{OUT} + V_f$ |

The asterisk * in Table 4 indicates an arbitrary condition where either diode may be connected. Since in battery applications, it is common for the battery to start fully charged requiring step down operation and to discharge, the diodes are initially connected in that configuration and remain so until step up operation is needed. The electrical equivalent of circuit 600 using adaptive clamping is illustrated in FIGS. 17A and 17B.

In FIG. 17A, equivalent circuit 620 illustrates the step-down condition where $V_{batt} > V_{OUT}$ and switch 615 is closed, i.e. on and conducting. As a result, freewheeling diode 614 is connected in parallel with freewheeling MOSFET 612 and inductor 610. As such, $V_x$ may vary from ground to ($V_{batt} + V_f$) unimpeded and be used to transfer power to $V_{OUT}$ whenever synchronous rectifier MOSFET 604 is conducting. When synchronous rectifier MOSFET 604 is off and non-conducting, body bias generator 605 prevents any conduction between $V_{OUT}$ and $V_x$, so that the voltage range of $V_x$ is not limited by the value of $V_{OUT}$ during step-down operation. Notice that even though converter 620 is performing step-down operation, it is not equivalent to the circuit of a prior art Buck converter and is therefore not referred to as such.

Figure 18A:
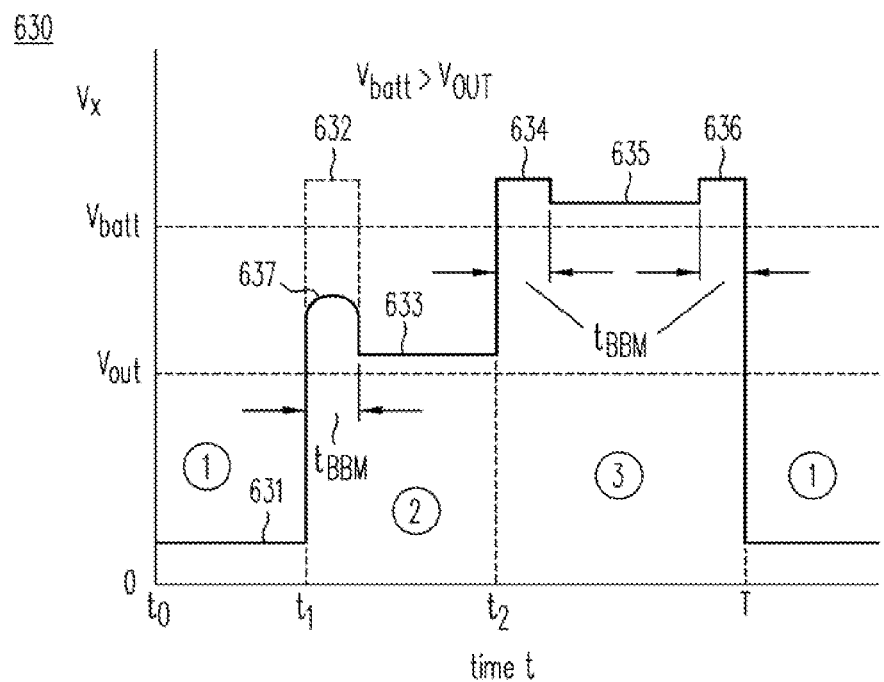
FIG. 18A illustrates the waveforms of $V_x$ in the three operating conditions of an adaptively clamped synchronous up-down converter operating in step-down operation.

FIG. 18A illustrates the $V_x$ waveform 630 for the three operating conditions of the adaptively clamped synchronous up-down converter 600 operating in step-down mode. As shown, between times $t_o$ and $t_1$, the voltage $V_x$ (segment 631) represents the voltage drop across on-state low-side MOSFET 601 of magnitude $I_L \cdot R_{DS(LS)}$ corresponding to current flow arrow (1) in FIG. 16.

Between times $t_1$ and $t_2$, except for the break-before make interval $t_{BBM}$ (segment 637) the voltage $V_x$ is equal to the output voltage $V_{OUT}$ plus any drop across synchronous rectifier MOSFET 604 (segment 633) so that $V_x = V_{OUT} + I_L \cdot R_{DS(SR)}$ corresponding to current flow arrow (2) in FIG. 16. During $t_{BBM}$ when all three power MOSFETs are off and non-conducting, $V_x$ rises higher than $V_{OUT} + I_L \cdot R_{DS(SR)}$, but it cannot exceed the voltage $V_{batt} + V_{f(FW)}$, as shown by the dotted line 632 without becoming clamped by the forward-biasing of clamping diode 614. Including capacitance, the voltage transient, as shown by segment 637, can be substantially lower than $V_{batt} + V_{f(FW)}$.

Between times $t_2$ and T, except for the break-before make intervals (segments 634 and 636) freewheeling MOSFET 612 clamps the maximum voltage of $V_x$ at a value of $V_{batt} + I_L \cdot R_{DS(FW)}$ (segment 635) corresponding to current flow arrow (3) in FIG. 16. During the two break-before-make intervals $t_{BBM}$, when all three power MOSFETs are off and non-conducting, ether just after time $t_2$ or just prior to time T, $V_x$ rises higher than $V_{batt} + I_L \cdot R_{DS(FW)}$, but it cannot exceed the voltage ($V_{batt} + V_{f(FW)}$), as shown by the segments 634 and 636, without becoming clamped by the forward-biasing of clamping diode 614.

In this manner, converter 600 operating in step-down mode behaves according to equivalent circuit 620 with $V_x$ in one of three stable voltage states (represented by segments 631, 633 and 635) when one of the three power MOSFETs is on and conducting, yet the $V_x$ node remains clamped to a maximum voltage of $V_x \leq (V_{batt} + V_{f(FW)})$ during break-before-make operation when all three MOSFETs are momentarily off.

In FIG. 17B, equivalent circuit 625 illustrates the step-up condition, where $V_{batt} < V_{OUT}$ and switch 607 is closed, i.e. on and conducting. As a result rectifier diode 606 is connected in parallel with synchronous rectifier MOSFET 604. As such, $V_x$ may vary from ground to ($V_{OUT} + V_f$) unimpeded and be used to transfer power to $V_{OUT}$ whenever low-side MOSFET 601 and freewheeling MOSFET 612 are both off and non-conducting. During such conditions, body bias generator 613 prevents any conduction between $V_{batt}$ and $V_x$, so that the voltage range of $V_x$ is not limited by the $V_{batt}$ potential during step-up operation.

Figure 18B:
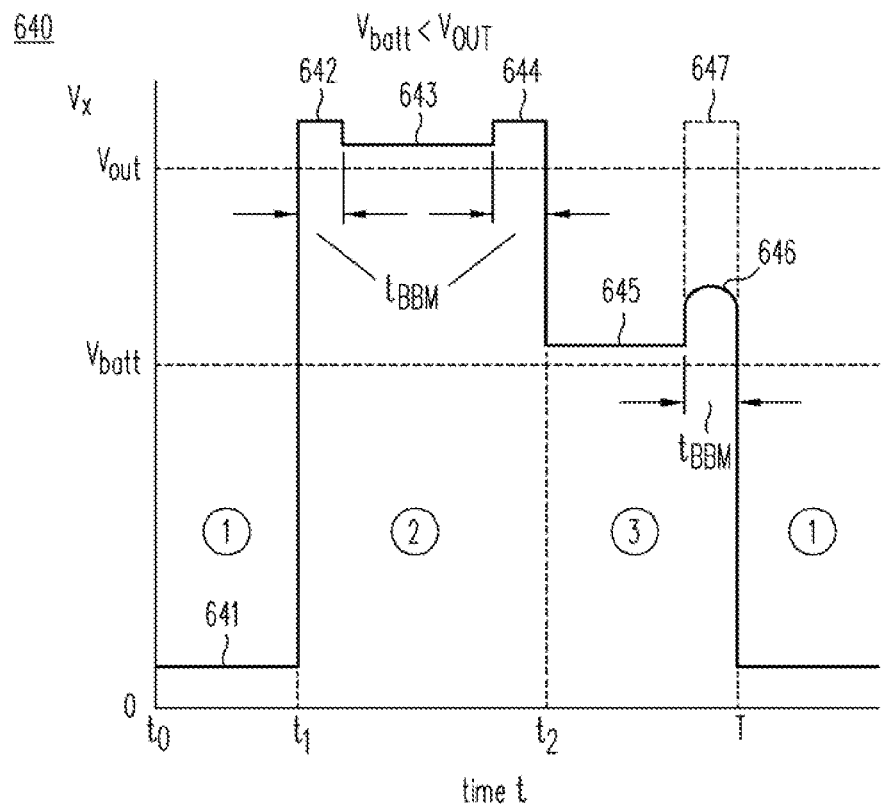
FIG. 18B illustrates the waveforms of $V_x$ in the three operating conditions of an adaptively clamped synchronous up-down converter operating in step-up operation.

FIG. 18B illustrates the $V_x$ waveform 640 for the three operating conditions of the adaptively clamped synchronous up-down converter operating in step-up or boost mode. As shown, between times $t_o$ and $t_1$, the voltage $V_x$ (segment 641) represents the voltage drop across on-state low-side MOSFET 601 of magnitude $I_L \cdot R_{DS(LS)}$ corresponding to current flow arrow (1) in FIG. 16. As shown in FIGS. 18A and 18B, the operation of converter 600 between times $t_1$ and $t_2$ is identical in either step-up or step-down mode.

Between times $t_1$ and $t_2$, except for the break-before make intervals (segments 642 and 644) $V_x$ is equal to the output voltage $V_{OUT}$ plus any drop across synchronous rectifier MOSFET 604 so that $V_x = V_{OUT} + I_L \cdot R_{DS(SR)}$, corresponding to current flow arrow (2) in FIG. 16. In this step-up case $V_{OUT} > V_{batt}$. During the break-before-make intervals $t_{BBM}$, when all three power MOSFETs are off and non-conducting, ether just after time $t_1$ or just prior to time $t_2$, $V_x$ rises higher than $V_{OUT} + I_L \cdot R_{DS(SR)}$ (segments 642 and 644), but it cannot exceed the voltage ($V_{OUT} + V_{f(SR)}$) without becoming clamped by the forward-biasing of clamping diode 606.

Between times $t_2$ and T, except for the break-before make interval, freewheeling MOSFET 612 clamps the maximum voltage of $V_x$ at a value 645 of $V_{batt} + I_L \cdot R_{DS(FW)}$ (segment 645), corresponding to current flow arrow (3) in FIG. 16. During the break-before-make interval $t_{BBM}$, when all three power MOSFETs are off and non-conducting, $V_x$ rises higher than $V_{batt} + I_L \cdot R_{DS(FW)}$, but it cannot exceed the voltage ($V_{OUT} + V_{f(SR)}$), as shown by the dotted line 647 without becoming clamped by the forward-biasing of clamping diode 606. Including capacitance, the voltage transient (segment 646) can be substantially lower than $V_{OUT} + V_{f(SR)}$.

In this manner, converter 600 operating in step-up mode behaves according to equivalent circuit 625, with $V_x$ in one of three stable voltage states (represented by segments 641, 643, and 645) when one of the three power MOSFETs is on and conducting, yet the node $V_x$ remains clamped to a maximum voltage of $V_x \leq (V_{OUT} + V_{f(SR)})$ during break-before-make operation when all three MOSFETs are momentarily off.

In summary, adaptive clamping allows step-up and step-down conversion in a single converter without subjecting its components to unclamped inductive switching transients or avalanche breakdown. The maximum $V_x$ voltage is thereby limited to ($V_{batt} + V_{f(FW)}$) or ($V_{OUT} + V_{f(SR)}$), whichever is higher, without impeding step-up and step-down operation. This operation is summarized in Table 5.

TABLE 5

| Conducting MOSFET | Current Flow | $V_x$ (Step-Down Mode) | $V_x$ (Step-Up Mode) |
|---|---|---|---|
| Low Side | (1) | $I_L * R_{DS(LS)}$ | $I_L * R_{DS(LS)}$ |
| Synchronous Rectifier | (2) | $V_{OUT} + I_L * R_{DS(SR)} < V_{batt}$ | $V_{OUT} + I_L * R_{DS(SR)} > V_{batt}$ |
| Freewheel | (3) | $V_{batt} + I_L * R_{DS(FW)} > V_{OUT}$ | $V_{batt} + I_L * R_{DS(FW)} < V_{OUT}$ |
| None | BBM | $(V_{batt} + V_{f(FW)}) > V_{OUT}$ | $(V_{out} + V_{f(SR)}) > V_{batt}$ |

Algebraically, the value of $V_x$ in the synchronous freewheeling up-down converter is identical in both step-down and step-up modes. During the magnetizing stage, $V_x$ is equal to $I_L \cdot R_{DS(LS)}$. During the energy transfer stage, when the synchronous rectifier MOSFET conducts, $V_x$ is equal to $V_{OUT} + I_L \cdot R_{DS(SR)}$. During the freewheeling stage, $V_x$ is equal to $V_{batt} + I_L \cdot R_{DS(FW)}$. In step-up and step-down modes, the actual relative magnitudes of $V_{batt}$ and $V_{OUT}$ differ but the same equations for $V_x$ apply to both conditions.

The maximum value of $V_x$ therefore occurs when all three power MOSFETs are off, i.e. during the break-before-make intervals. In step-down mode this voltage is given by $(V_{batt} + V_{f(FW)})$ while in step-up mode the voltage is equal to $(V_{out} + V_{f(SR)})$. For all practical purposes the forward voltages of the freewheel and rectifier diode clamps are the same, i.e. $V_f \approx V_{f(SR)} \approx V_{f(FW)}$.

The highest voltages occur in step up mode where $V_x \leq (V_{OUT} + V_f)$, a condition that the determines the voltage ratings of the low-side MOSFET as illustrated in Table 6. In the very least, the breakdown voltage $BV_{DSS(LS)}$ of the low-side MOSFET must exceed this voltage, i.e. $BV_{DSS(LS)} > (V_{OUT} + V_f)$. An even hither breakdown may be required as a necessary guardband to achieve adequate MOSFET hot-carrier lifetime.

TABLE 6

| Off Device | Worst Stress $V_x$ Condition | Maximum $V_{DS}$ |
|---|---|---|
| Low Side MOSFET | $(V_{OUT} + V_f)$ | $(V_{OUT} + V_f)$ |
| Synchronous Rectifier MOSFET | $I_L * R_{DS(LS)} \approx 0 V$ | $V_{OUT} - I_L * R_{DS(LS)} \approx V_{OUT}$ |
| Freewheel MOSFET | $(V_{OUT} + V_f)$ $I_L * R_{DS(LS)} \approx 0 V$ | $(V_{OUT} + V_f) - V_{batt}$ $V_{batt} - I_L * R_{DS(LS)} \approx V_{batt}$ |

The highest $V_{DS}$ condition during boost operation for the synchronous rectifier occurs when $V_x$ is near ground so that $BV_{DSS(FW)} > V_{OUT}$. The maximum voltage rating required for the freewheeling MOSFET depends on the operating range of the converter itself. If $(V_{OUT(max)} - V_{batt}) > V_{batt}$, then the worst case condition occurs when $V_x = (V_{OUT} + V_f)$ then approximately $BV_{DSS(FW)} > (V_{OUT} + V_f - V_{batt})$. If not, then $BV_{DSS(FW)} > V_{batt}$. For the sake of simplicity, $V_f$ can be assumed to be 1V when estimating requisite device ratings.

For example, in a 5V to 12V boost converter, $BV_{DSS(LS)} > 13V$, $BV_{DSS(SR)} > 12V$, and $BV_{DSS(FW)} > 8V$. On the other hand, in a 9V to 12V boost converter, $BV_{DSS(SR)} > 13V$, $BV_{DSS(SR)} > 12V$, and $BV_{DSS(FW)} > 9V$.

Implementing Adaptive Clamping

As described above, in order to implement adaptive clamping in the converter 600 if FIG. 16, the conduction of freewheeling diode 614 is controlled by switch 615 and the conduction of rectifier diode 606 is controlled by switch 607. The closing and opening of switches 607 and 615 is conditional, depending on the relative magnitude of the $V_{batt}$ and $V_{OUT}$ voltages. In a preferred embodiment, only one switch, either switch 607 controlling the rectifier diode 606, or switch 615 controlling the freewheeling diode 614 is closed at any given time.

In practice, whenever the low side MOSFET is on and $V_x$ is near ground, both diodes 606 and 615 may be connected without interfering with converter operation, since both diodes are reverse-biased. A similar situation occurs whenever $V_{OUT} \approx V_{batt}$, and more specifically whenever $|V_{OUT} - V_{batt}| < V_f$, since neither diode carries substantial current when forward-biased at a voltage below its forward voltage drop $V_f$. In such a condition, both diodes 606 and 614 may be connected so long that only one of them, the correct one, remains on and conducting during break before make operation.

Figure 19A:
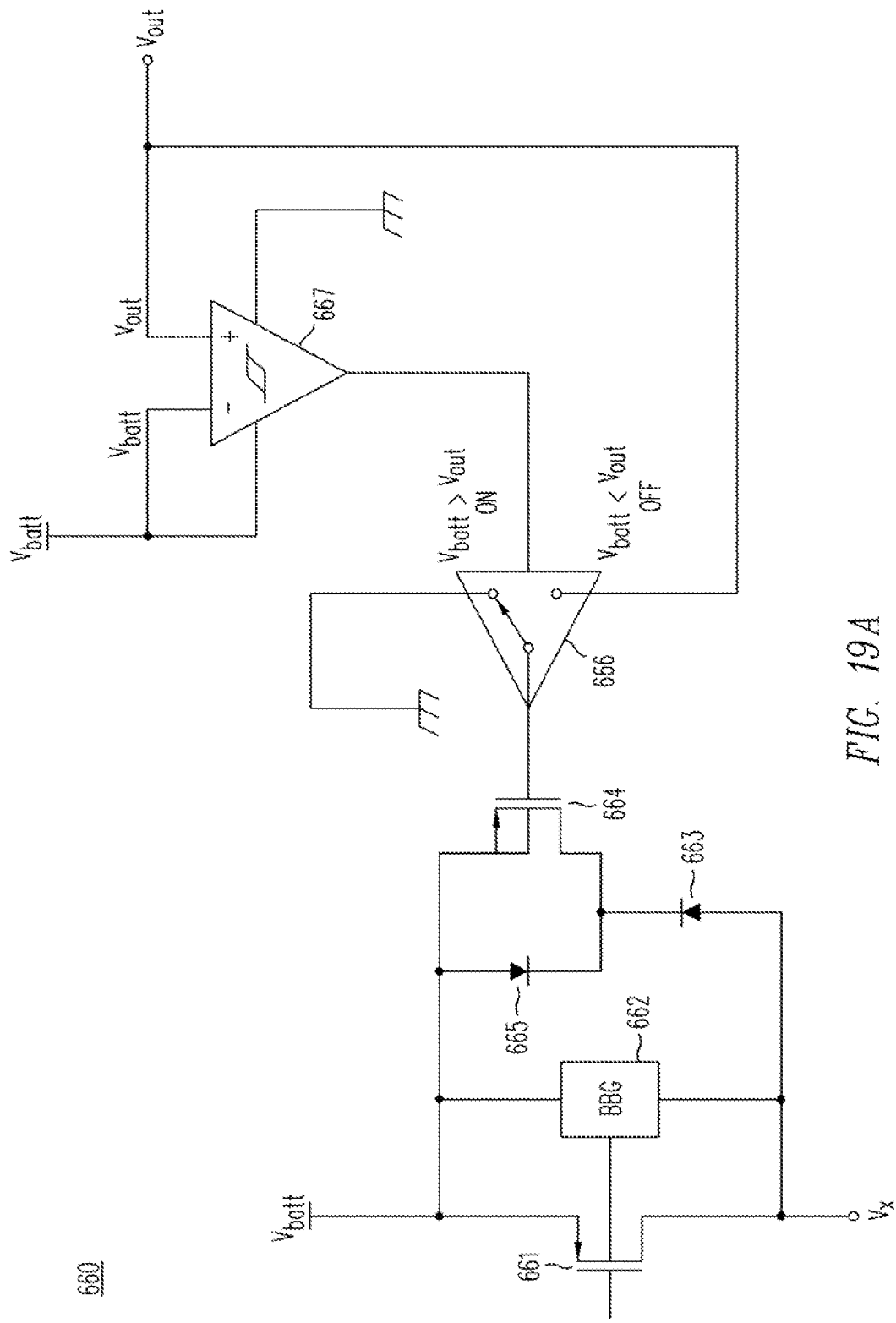
FIG. 19A is a circuit diagram of an adaptive clamping circuit for the freewheeling MOSFET.

Various implementations of adaptive clamping are illustrated in FIGS. 19A-19D. In FIG. 19A, circuit 660 with adaptive clamping connected between $V_{batt}$ and $V_x$ is implemented using P-channel freewheeling MOSFET 661 with a body bias generator 662, a clamping diode 663 with series-connected P-channel adaptive clamping MOSFET 664 with a source-body short and an intrinsic parallel diode 665. The gate of adaptive clamping MOSFET 664 is controlled by a gate buffer 666 which may comprise a CMOS inverter powered between $V_{OUT}$ and ground. The input of gate buffer 666 is powered by an analog hysteretic comparator 667 comparing the magnitude of $V_{batt}$ and $V_{OUT}$.

Adaptive clamping operation involves comparing the magnitude of $V_{batt}$ and $V_{OUT}$ in comparator 667 and then using the output of comparator 667 to determine if diode 663 is connected in parallel with freewheeling MOSFET. When $V_{batt} < V_{OUT}$, the converter 600 is in step-up conversion mode and no parallel diode is connected across MOSFET 664. In this condition, MOSFET 664 is biased off with its gate preferably connected to the most positive potential, which in step up mode is $V_{OUT}$. Because diodes 665 and 663 are connected back-to-back, no diode conduction can occur in either source-drain direction through freewheeling MOSFET 661. Likewise, because of the operation of body bias generator 662, the source-to-body and drain-to-body diodes of freewheeling MOSFET 661 also remain reverse-biased and non-conducting. Body bias generator 662 and gate drive of MOSFET 661 may be implemented using the body bias generator and gate buffer circuit 455 shown in FIG. 12A.

Conversely, when $V_{batt} > V_{OUT}$, the converter 600 is in step-down conversion mode and freewheeling diode 663 is connected in parallel to freewheeling MOSFET 661. In this condition, MOSFET 664 is biased on with its gate ideally connected to the most negative potential, i.e. ground. With MOSFET 664 on and clamp diode 663 connected in parallel to freewheeling MOSFET 661, the maximum $V_x$ voltage is limited to $(V_{batt} + V_f)$. In step-down mode, however, such a condition only occurs in the freewheeling up-down converter 600 during break-before-make operation when all the transistors; the low-side MOSFET 601, the synchronous rectifier MOSFET 604, and the freewheeling MOSFET 612, are off and non-conducting.

Figure 19B:
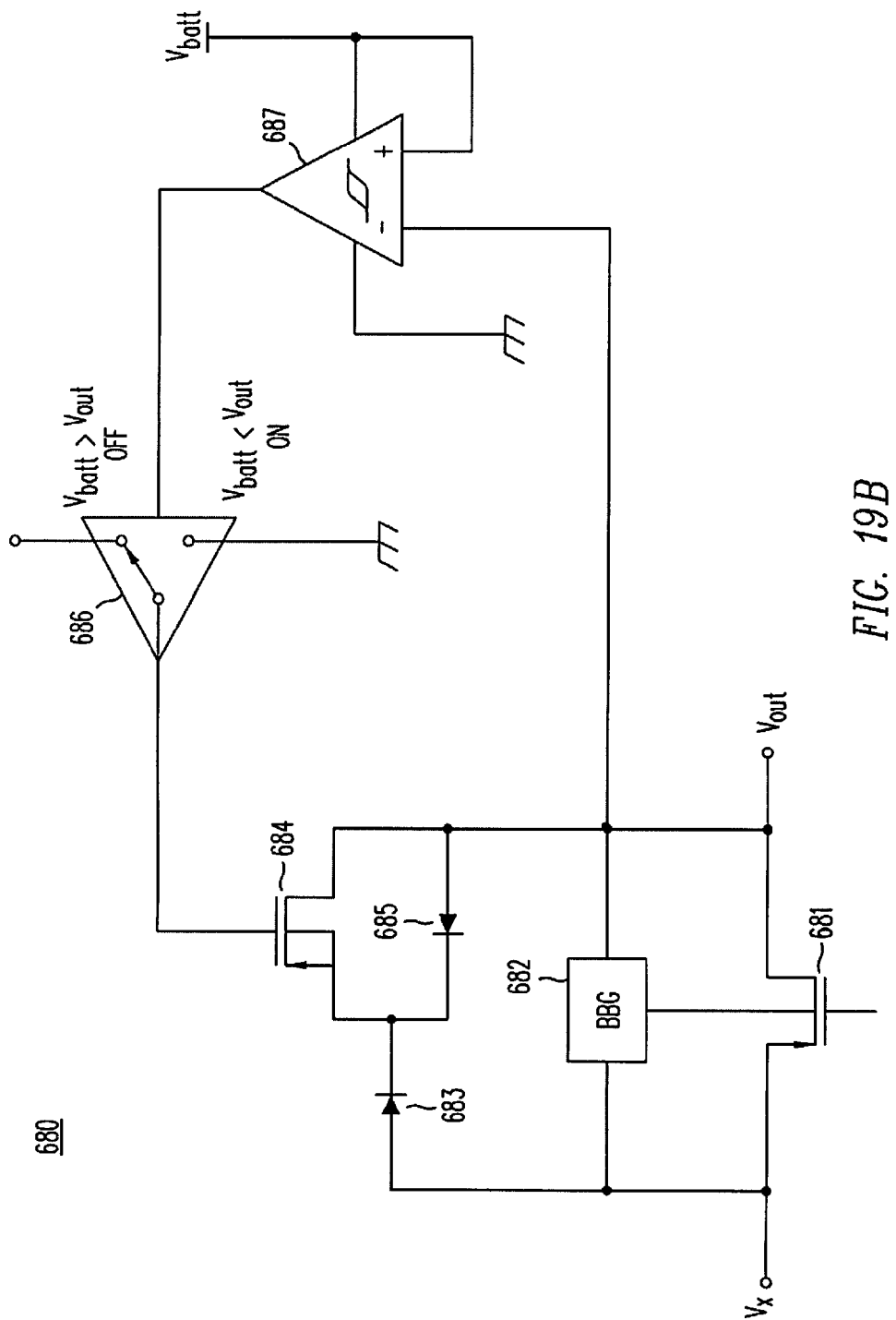
FIG. 19B is a circuit diagram of an adaptive clamping circuit for the synchronous rectifier MOSFET.

In FIG. 19B, circuit 680 with adaptive clamping connected between $V_x$ and $V_{OUT}$ is implemented using a P-channel MOSFET 681 with a body bias generator 682, a clamping diode 683 with a series-connected P-channel adaptive clamping MOSFET 684 with a source-body short and an intrinsic parallel diode 685. The gate of adaptive clamping MOSFET 684 is controlled by a gate buffer 686 which may comprise a CMOS inverter powered between $V_{batt}$ and ground. The input of gate buffer 686 is powered by analog hysteretic comparator 687 comparing the magnitude of $V_{batt}$ and $V_{OUT}$. Adaptive clamping operation involves comparing the magnitude of $V_{batt}$ and $V_{OUT}$ in comparator 687 and then using the output of comparator 687 to determine if diode 683 is connected in parallel with synchronous rectifier MOSFET 681.

When $V_{batt}>V_{OUT}$, the converter is in step-down conversion mode and no parallel diode is connected across synchronous rectifier MOSFET 681. As such, MOSFET 684 is biased off with its gate preferably connected to the most positive potential, which in step-down mode is $V_{batt}$. Because diodes 685 and 683 are connected back-to-back, no diode conduction can occur in either source-drain polarity across MOSFET 684. Likewise, because of the operation of BBG 682, the source-to-body and drain-to-body diodes of synchronous rectifier MOSFET 681 also remain reverse-biased and non-conducting. BBG 682 may be implemented using the body-bias-generator circuit 520 shown in FIG. 14A.

Conversely, when $V_{batt}<V_{OUT}$, the converter 600 is in step-up conversion mode and rectifier diode 683 is connected in parallel to synchronous rectifier MOSFET 681. In this condition, MOSFET 684 is biased on with its gate ideally connected to the most negative potential, i.e. ground. With MOSFET 684 on and clamping diode 683 connected in parallel with synchronous rectifier MOSFET 684, the maximum $V_x$ voltage is limited to $(V_{OUT}+V_f)$. In step-up mode, however, such a condition only occurs in the freewheeling up-down converter 600 during break-before-make operation when all the transistors; the low-side MOSFET 601, the synchronous rectifier MOSFET 604, and the freewheeling MOSFET 612, are off and non-conducting.

Implementing actively-clamped synchronous freewheeling up-down converter 600 using the techniques illustrated in FIGS. 19A and 19B requires an additional diode, MOSFET, inverter and comparator for the freewheeling clamp and another set of the same elements for the rectifier clamp. The active clamp circuitry described operates independently of BBG 33 circuits 662 and 682. The comparator function comparing $V_{OUT}$ and $V_{batt}$ can be shared by both rectifier and freewheeling adaptive clamp circuits.

On closer inspection of the body bias generators shown in FIGS. 12A and 14A it becomes evident that necessary clamping diode and MOSFET are already present within the body bias generators themselves, but in this capacity they are operated in a manner not to facilitate adaptive clamping, but merely to eliminate conduction through the parallel diode. By modifying the design of the body bias generator, adaptive clamping can be implemented using devices already contained within the body-bias-generator, thereby eliminating extra components and saving die area. Such an approach is illustrated in FIG. 19C for a freewheeling MOSFET and in FIG. 19D for a synchronous rectifier MOSFET.

Figure 19C:
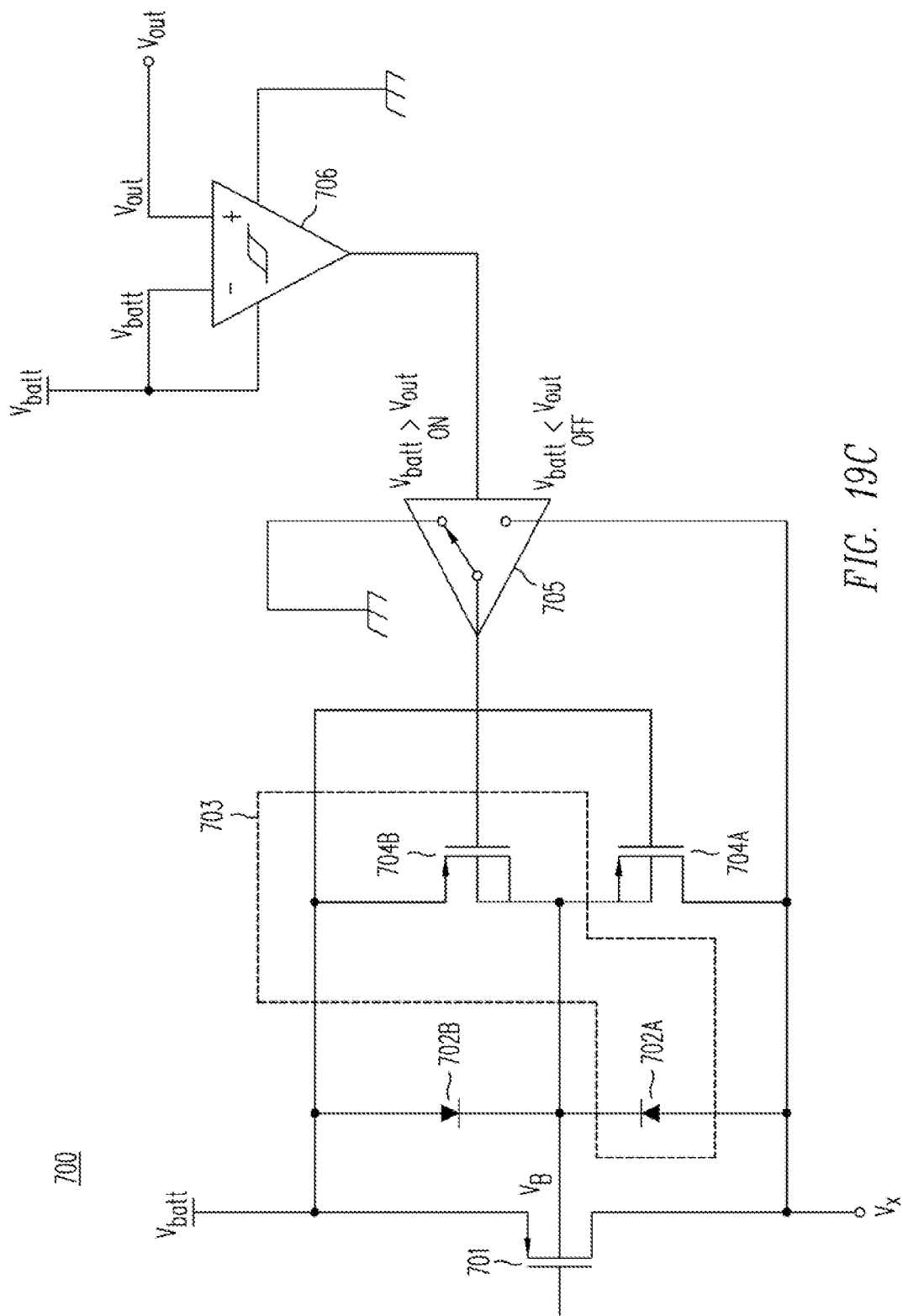
FIG. 19C is a circuit diagram of a freewheeling MOSFET having a body bias generator with integrated adaptive clamping.

As an example, FIG. 19C illustrates a freewheeling circuit 700 with body bias generator-integrated adaptive clamping. Freewheeling circuit 700 connected between $V_{batt}$ and $V_x$ is implemented using a P-channel freewheeling MOSFET 701 with an adaptive clamp 703 comprising a clamping diode 702A with a series-connected P-channel MOSFET 704B with source-body short. MOSFET 704B includes an intrinsic parallel diode 702B. Together with diode 702B and adaptive clamp 703, MOSFET 704A completes the body-bias-generator circuitry.

Instead of being cross-coupled to the $V_x$ terminal of the freewheeling MOSFET, as in the body bias generator shown in FIG. 12A, the gate of adaptive clamping MOSFET 704B is controlled by a gate buffer 705 which operates as analog switch choosing between $V_x$ and ground. The equivalent function can also be achieved using digital circuitry appropriately level-shifted, but is more easily explained using an analog switch where the $V_x$ voltage depends on the state of the low-side, synchronous rectifier, and freewheeling MOSFETs. The input of gate buffer 705 is powered by analog hysteretic comparator 706 comparing the magnitude of $V_{batt}$ and $V_{OUT}$. The gate of body-bias-generator MOSFET 704A is cross-coupled to $V_{batt}$.

Circuit 700 operates in two distinct modes, step-down mode and step-up mode. In its step-down mode, MOSFET 704B is always on, shorting the body of P-channel MOSFET 701 to $V_{batt}$ and shunting body diode 702B regardless of the condition of the low-side, synchronous rectifier and freewheeling MOSFETs, as shown in Table 7 below.

With $V_B$ tied to $V_{batt}$ and diode 702B shunted in the step-down mode, the conduction condition of adaptive clamp diode 702A depends on the operating state of the converter. For example, in both magnetizing and transfer states, diode 702A remains reverse-biased because $V_x<V_{batt}$. As a result, the freewheeling current $I_{FW}$, the sum of currents in freewheeling MOSFET 701 and freewheeling diode 702A, is zero.

Conversely, in the freewheeling state, freewheeling MOSFET 701 turns on and essentially shorts the $V_x$ and $V_{batt}$ terminals, sustaining the inductor's current $I_L$ with minimal power loss provided the resistance of freewheeling MOSFET 701 is sufficiently low. The voltage at the $V_x$ node is then given by the expression $(V_{batt}+I_L \cdot R_{DS(FW)})$ which can be approximated by the voltage $V_{batt}$. Strictly speaking, since $V_x$ is slightly more positive than $V_{batt}$ during freewheeling, diode 702A is forward-biased, but because conducting MOSFET 701 shunts its conduction, little current flows in forward-biased diode 702A during the freewheeling state.

In the break-before-make interval, however, no power MOSFET is on and conducting to control the voltage on the $V_x$ node. In such a condition, $V_x$ flies above $V_{batt}$ forward-biasing diode 702A and diode 702A clamps the maximum value of $V_x$ to $(V_{batt}+V_f)$. During this $t_{BBM}$ duration, with the exception of any capacitive displacement currents, adaptive clamp 703 comprising diode 702A in series with on MOSFET 704B must carry the full inductor current $I_L$, but due to its short duration, the actual average power dissipation is negligible. So in essence, in step-down mode, the disclosed adaptive clamp 703 carries no substantial diode current except during break before make intervals.

TABLE 7

| Mode | Stage | LS | SR | FW | $V_x$ | $V_B$ | BBG | 702B | 702A | $I_{FW}$ |
|---|---|---|---|---|---|---|---|---|---|---|
| Step Down $V_{batt}>V_{OUT}$ | Mag | on | off | off | ~0V | $V_{batt}$ | 704B | shunt | RB | 0 |
| | Xfer | off | on | off | ~$V_{OUT}$ | $V_{batt}$ | 704B | shunt | RB | 0 |
| | FW | off | off | on | ~$V_{batt}$ | $V_{batt}$ | 704B | shunt | shunt | FW |
| | BBM | off | off | off | $V_{batt}+V_f$ | $V_{batt}$ | 704B | shunt | FB | clamp |
| Step Up $V_{batt}<V_{OUT}$ | Mag | on | off | off | 0V | $V_{batt}$ | 704B | shunt | RB | 0 |
| | Xfer | off | on | off | $V_{OUT}$ | $V_x$ | 704A | RB | shunt | 0 |
| | FW | off | off | on | $V_{batt}$ | $V_x$ | 704A | shunt | shunt | FW |
| | BBM | off | off | off | $V_{OUT}+V_f$ | $V_x$ | 704A | RB | shunt | 0 |

In Table 7, the following abbreviations apply: Mag—Magnetization Stage; Xfer—Energy Transfer Stage; FW—Freewheeling Stage (or MOSFET); BBM—Break-before-make interval; LS—Low-side MOSFET; SR—Synchronous rectifier MOSFET; $V_B$—Body voltage (of freewheeling MOSFET 701. BBG—Body bias generator; 702B—Diode 702B; 702A—Diode 702A; $I_{FW}$=Current in freewheeling MOSFET; FB Forward—biased; RB—Reverse-biased.

In step-up operation, buffer 705 connects the gate of MOSFET 704B to the $V_x$ node, the same as in its cross-coupled configuration. As a result, circuit 700 operates as through no parallel diode is present across freewheeling MOSFET 701. The only $I_{FW}$ current in this condition occurs when FW MOSFET 701 is turned on and conducting and does not involve forward-biasing of any P-N junction diode. So in the step-up mode of converter 600, circuit 700 and adaptive clamp 703 provide no clamping action and therefore do not limit the voltage swing on the $V_x$ node.

In summary, circuit 700 implements a freewheeling MOSFET that behaves as a switch with no conducting parallel diodes except during the break-before-make interval and then only during step-down operation, during which diode 702A conducts and clamps $V_x$ to a maximum voltage of $(V_{batt}+V_f)$. During step-up operation no forward-biased diode is present across freewheeling MOSFET 701 and no clamping occurs, whatsoever.

Figure 19D:
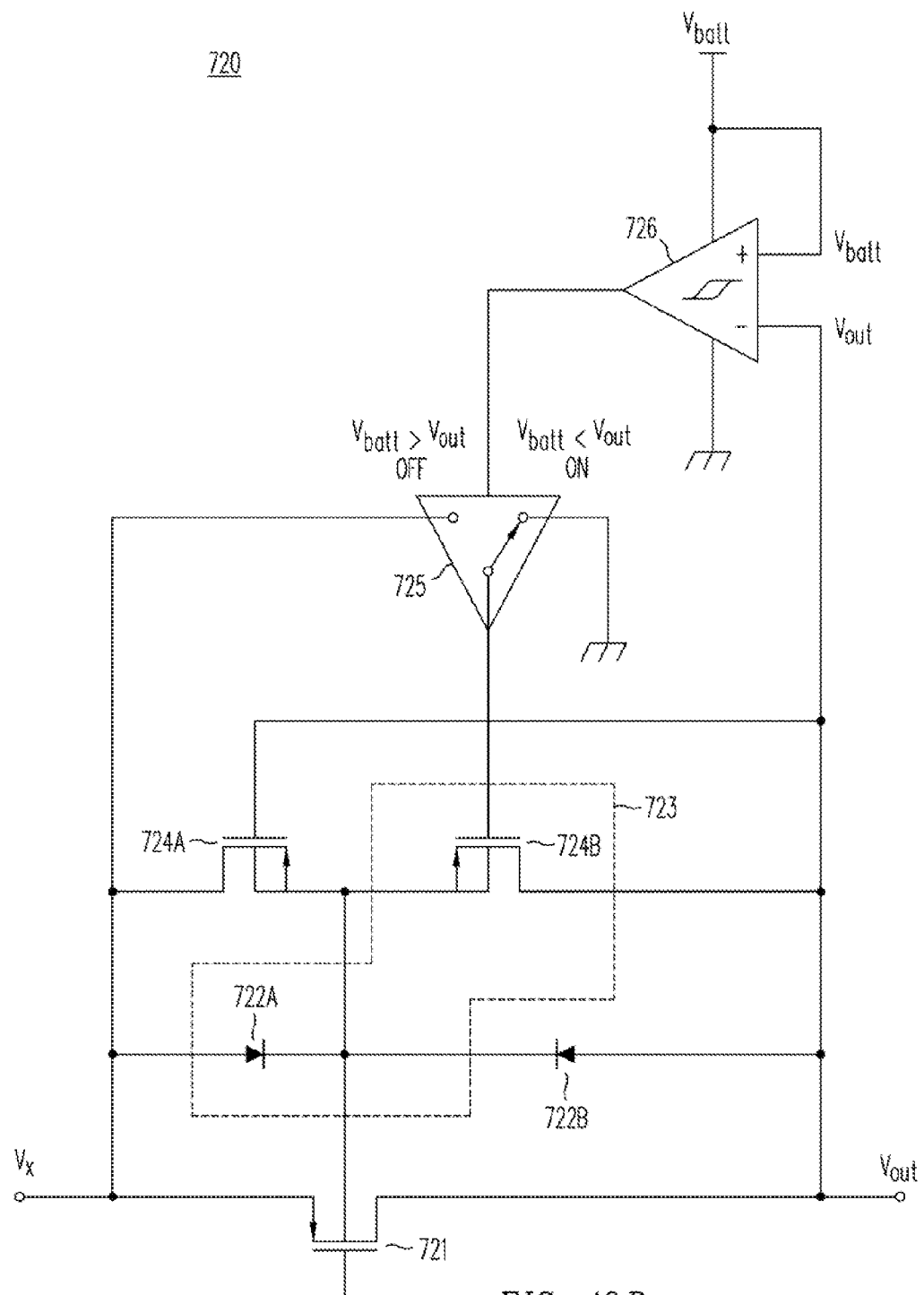
FIG. 19D is a circuit diagram of a synchronous rectifier MOSFET having a body bias generator with integrated adaptive clamping.

Similarly, FIG. 19D illustrates a synchronous rectifier circuit 720 with body bias generator-integrated adaptive clamping. As shown, synchronous rectifier circuit 720 connected between $V_{OUT}$ and $V_x$ is implemented using a P-channel synchronous rectifier MOSFET 721 with an adaptive clamp 723 comprising a clamping diode 722A with a series-connected P-channel adaptive clamping MOSFET 724B with a source-body short. MOSFET 724B includes an intrinsic parallel diode 722B. Together with diode 72213 and adaptive clamp 723, MOSFET 724A completes the body-bias-generator circuitry.

Instead of being cross-coupled to the $V_x$ terminal of MOSFET 721 as in the body bias generator of FIG. 14A, the gate of adaptive clamping MOSFET 724B is controlled by a gate buffer 725 which operates as analog switch choosing between $V_x$ and ground. The equivalent function can also be achieved using digital circuitry appropriately level shifted, but is more easily explained using an analog switch, where the $V_x$ voltage depends on the state of the low-side MOSFET, the synchronous rectifier MOSFET, and the freewheeling MOSFET. The input of gate buffer 725 is powered by analog hysteretic comparator 726 comparing the magnitude of $V_{batt}$ and $V_{OUT}$. The gate of body-bias-generator MOSFET 724A is cross-coupled to $V_{OUT}$.

The synchronous rectifier MOSFET 721 with adaptive clamp circuit 720 operates in two distinct modes. In step-up mode, MOSFET 724B is always on, shorting the body of MOSFET 721 to $V_{OUT}$ and shunting body diode 722B regardless of the condition of the low-side, synchronous rectifier and freewheeling MOSFETs, as shown in Table 8 below.

With $V_B$ tied to $V_{OUT}$ and diode 722B shunted, the conduction condition of adaptive clamp diode 722A in step-up mode depends on the operating state of the converter. For example, in both magnetizing and freewheeling states, diode 722A remains reversed bias because $V_x<V_{batt}$. As a result, the synchronous rectifier current $L_{xfr}$, the sum of currents in synchronous rectifier MOSFET 721 and rectifier diode 722A, is zero.

Conversely, in the transfer state synchronous rectifier MOSFET 721 turns on and essentially shorts the $V_x$ and $V_{OUT}$ terminals, delivering the inductor's current $I_L$ to the load and output capacitor with minimal power loss provided the resistance of synchronous rectifier MOSFET 721 is sufficiently low. The voltage at the $V_x$ node in this condition is then given by the expression $(V_{OUT}+I_L \cdot R_{DS(SR)})$ which can be approximated by the voltage $V_{OUT}$. Strictly speaking, since $V_x$ is slightly more positive than $V_{OUT}$ during transfer and synchronous rectification, diode 722A is forward-biased, but because conducting MOSFET 721 shunts its conduction, little current flow in forward-biased diode 722A during the freewheeling state.

In the break-before-make interval, however, no power MOSFET is on and conducting to control the voltage on the $V_x$ node. In such a condition, $V_x$ flies above $V_{OUT}$, forward-biasing diode 722A and clamping the maximum value of $V_x$ to $(V_{OUT}+V_f)$. During this $t_{BBM}$ duration, with the exception of any capacitive displacement currents, adaptive clamp 723 comprising diode 722A in series with on MOSFET 724B must carry the full inductor current $I_L$, but due to its short duration, the actual average power dissipation is negligible. So in essence, in step-up mode, the disclosed adaptive clamp 723 carries no substantial diode current except transient current during break before make intervals.

TABLE 8

| Mode | Stage | LS | SR | FW | $V_x$ | $V_B$ | BBG | 722B | 722A | $I_{SR}$ |
| --- | --- | --- | --- | --- | --- | --- | --- | --- | --- | --- |
| Step | Mag | on | off | off | ~0V | $V_{out}$ | 724B | RB | shunt | 0 |
| Down | Xfer | off | on | off | ~$V_{OUT}$ | $V_x$ | 724A | shunt | shunt | SR |
| $V_{batt}>$ | FW | off | off | on | ~$V_{batt}$ | $V_x$ | 724A | shunt | RB | 0 |
| $V_{OUT}$ | BBM | off | off | off | $V_{batt}+V_f$ | $V_x$ | 724A | shunt | RB | 0 |
| Step | Mag | on | off | off | 0V | $V_{out}$ | 724B | RB | shunt | 0 |
| Up | Xfer | off | on | off | $V_{OUT}$ | $V_{out}$ | 724B | shunt | shunt | SR |
| $V_{batt}<$ | FW | off | off | on | $V_{batt}$ | $V_{out}$ | 724B | RB | shunt | 0 |
| $V_{OUT}$ | BBM | off | off | off | $V_{OUT}+V_f$ | $V_{out}$ | 724B | FB | shunt | clamp |

In step down operation, buffer 725 connects the gate of MOSFET 724B to the $V_x$ node, the same as in its cross-coupled configuration. As a result, circuit 720 operates as through no parallel diode is present across synchronous rectifier MOSFET 721. The only $I_{xfr}$ current in this condition occurs when synchronous rectifier MOSFET 721 is turned on and conducting and does not involve forward-biasing of any P-N junction diode. So in its step-down mode, circuit 720 and adaptive clamp 723 provides no clamping action and therefore does not limit the voltage swing on the $V_x$ node.

In summary, circuit 720 implements a synchronous rectifier MOSFET that behaves as a switch with no conducting parallel diodes except during the break-before-make interval and then only during step-up operation, during which diode 722A conducts and clamps $V_x$ to a maximum voltage of $(V_{OUT}+V_f)$. During step-down operation no forward-biased diode is present across freewheeling MOSFET 721 and no clamping occurs, whatsoever.

Utilizing adaptively-clamped freewheeling MOSFET 701 and adaptively-clamped synchronous rectifier MOSFET 721, a synchronous freewheeling up-down converter operates identically to the unclamped converter 500 of FIG. 13 except that the voltage $V_x$ is clamped during break-before-make conditions. Specifically, $V_x$ is clamped to a maximum voltage of $(V_{batt}+V_f)$ by diode 702A during step-down operation and to a maximum voltage of $(V_{OUT}+V_f)$ by diode 722A during step-up operation. Except for diodes 702A and 722A, no other diode becomes forward-biased under any normal operating condition.

Figure 20:
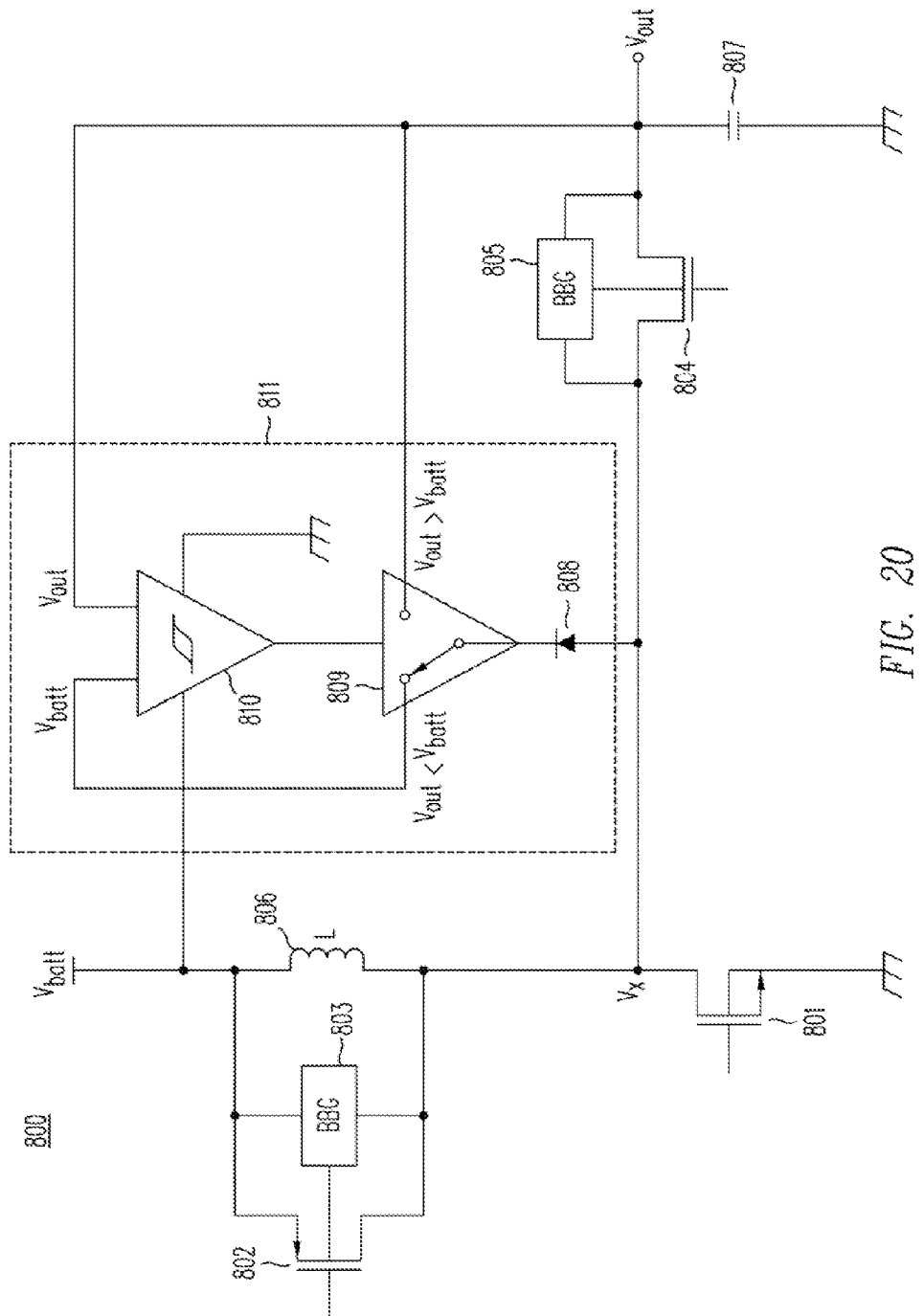
FIG. 20 is a circuit diagram of an alternative adaptive clamping circuit.

In another embodiment of adaptive clamping, FIG. 20 illustrates that a single diode can be used to perform adaptive clamping through multiplexing. As shown, a diode 808 is connected to either $V_{OUT}$ or $V_{batt}$ depending on the relative voltage potentials within the converter. A synchronous freewheeling up-down converter 800 comprises a low-side MOSFET 801, an inductor 806, a freewheeling MOSFET 802 with a body-bias-generator 803, a synchronous rectifier MOSFET 804 with a body bias generator 805, and an output capacitor 807. Adaptive clamping circuitry 811 comprises diode 808, an analog multiplexer 809, and a comparator 810. Multiplexer 809 may be implemented using an analog switch or two large gate-width MOSFETs with appropriate gate drive and logic control. Utilizing body bias generators 803 and 805 which may include circuitry disclosed in FIGS. 12A, 14A and 14B, MOSFETs 802 and 804 have no parallel diode and therefore provide no voltage clamping during break-before-make operation.

In adaptive clamp 811 the anode of clamp diode 808 is hardwired to the $V_x$ node while its cathode is selectively connected to either $V_{batt}$ or $V_{OUT}$ by multiplexer 809 depending on the state of comparator 810. When $V_{OUT}<V_{batt}$, the converter is operating in step-down mode and multiplexer 809 connects the cathode of diode 808 to $V_{batt}$ thereby forming the electrical equivalent to the circuit of FIG. 17A. When $V_{OUT}>V_{batt}$, converter 800 is operating in step-up mode and multiplexer 809 connects the cathode of diode 808 to $V_{OUT}$ thereby forming the electrical equivalent to the circuit of FIG. 17B.

Figure 21:
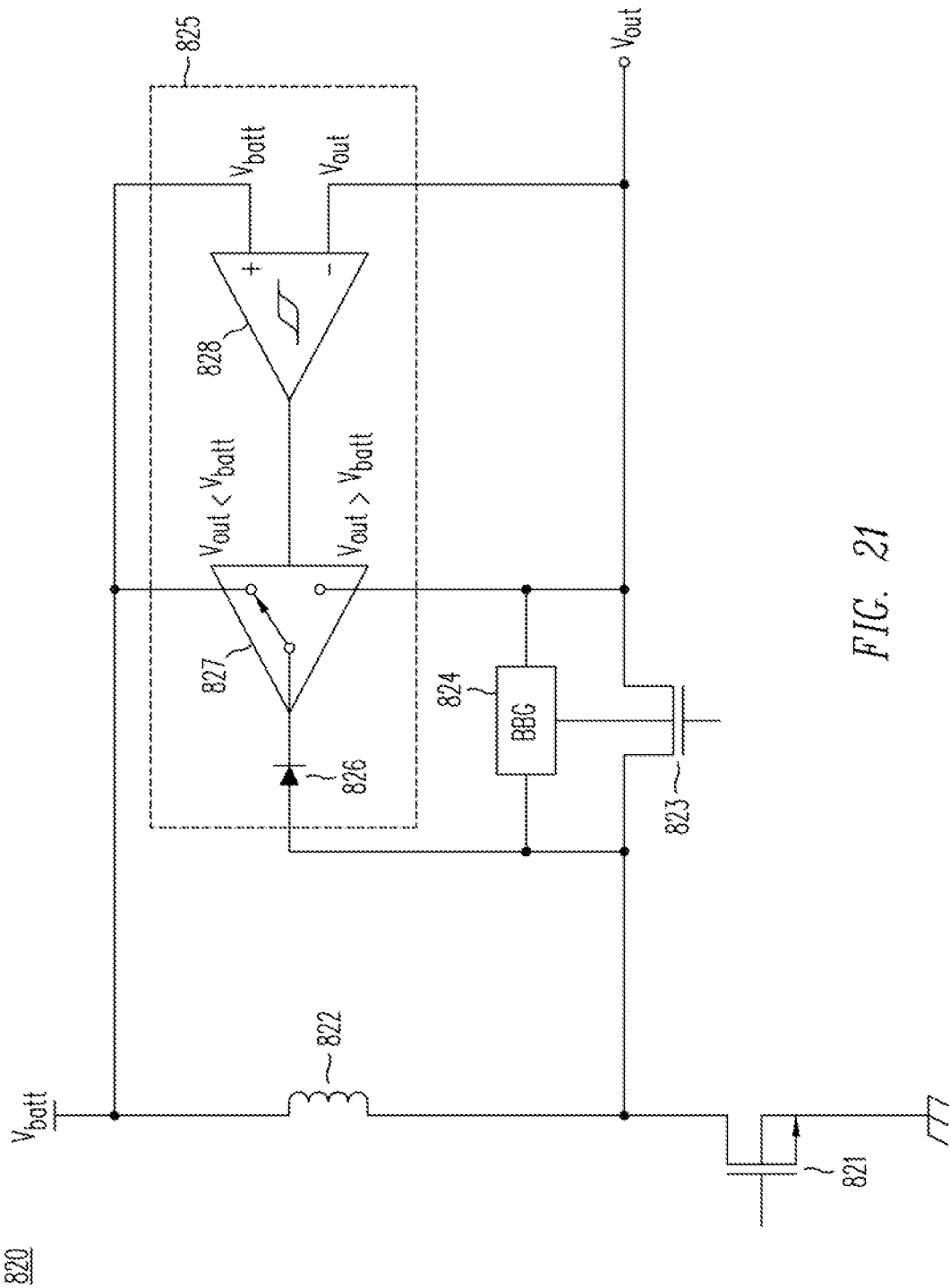
FIG. 21 is a circuit diagram of an up-down freewheeling converter that includes an adaptive clamping circuit but no freewheeling MOSFET.

In lower power applications, adaptive clamping can eliminate the need for the freewheeling MOSFET in the synchronous freewheeling up-down converter. In such cases the adaptive clamp diode prevents unclamped inductive switching and also facilitates freewheeling operation. As shown in FIG. 21, up-down converter 820 includes a low-side MOSFET 821, an inductor 822, a synchronous rectifier MOSFET 823, a body bias generator 824 and an adaptive clamp circuit 825. Converter 820 does not contain a freewheeling MOSFET. As shown, adaptive clamp circuit 825 comprises a clamping diode 826, a multiplexer 827, and a comparator 828.

In operation, comparator 828 compares the magnitude of $V_{OUT}$ and $V_{batt}$ and connects the cathode of clamping diode 826 to either $V_{batt}$ or $V_{OUT}$. When $V_{OUT}<V_{batt}$, the converter is operating in step down mode and multiplexer 828 connects the cathode of diode 826 to $V_{batt}$ thereby forming the electrical equivalent to the circuit of FIG. 17A. When $V_{OUT}>V_{batt}$, converter 820 is operating in step-up mode and multiplexer 828 connects the cathode of diode 826 to $V_{OUT}$ thereby forming the electrical equivalent to the circuit of FIG. 17B.

Unlike freewheeling up-down converter 600 in FIG. 16, however, converter 820 cannot maintain sustained freewheeling in the step-up mode, since the only condition wherein diode 826 is in parallel with inductor 822 occurs whenever $V_{OUT}<V_{batt}$, i.e. during step down operation.

Freewheeling Converter Start-Up

Aside from their ability only to step up voltage, one major limitation of conventional boost converters such as those shown in FIGS. 1A and 1B, is their inability to start-up reliably whenever the output terminal is loaded, i.e. whenever a load is connected and drawing current while the converter is attempting to start-up. If the loading is too great, the circuitry never develops a sufficient current in the inductor to reach a steady state condition.

This is especially problematic in boost converters where PWM and gate buffer circuitry is powered from the converter's output. If the output is loaded, the output voltage never rises sufficiently to power the control circuitry, which causes the low-side power MOSFET to suffer from inadequate gate drive and low bias voltages resulting in high resistance and low inductor current.

The start-up problem in a boost converter is a consequence of the ever-present hard-wired diode connecting its $V_x$ node to its output terminal. For example in the conventional non-synchronous boost converter of FIG. 1A diode 2 connects the load to the battery and inductor 4. There is no way to disconnect them from one another. In the synchronous boost converter of FIG. 1B diode 15, intrinsic to synchronous rectifier MOSFET 13, imposes the same limitation and restriction. Any attempt to "over-magnetize" the inductor, i.e. to establish excess current in the inductor during start-up creates the risk of overcharging the output capacitor and producing an output voltage above the specified target, failing regulation and potentially damaging voltage sensitive loads.

Because freewheeling up-down converters made in accordance with this invention utilize a synchronous rectifier with no hardwired source-to-drain parallel diode, the start up sequence can be accomplished with no or controlled loading. Moreover, because of the capability of freewheeling, the start up sequence can be modified to establish a higher inductor current than is needed by the load without imposing any risk of overcharging the output capacitor. Furthermore, using this converter topology, a greater of degree of control is available prior to commencing converter switching. This pre-charge phase allows the converter's output capacitor to be charged partially, i.e. to a voltage less than the target voltage but above zero. Pre-charging reduces the time it takes for the converter to reach its target voltage after commencing switching operation.

Figure 22A:
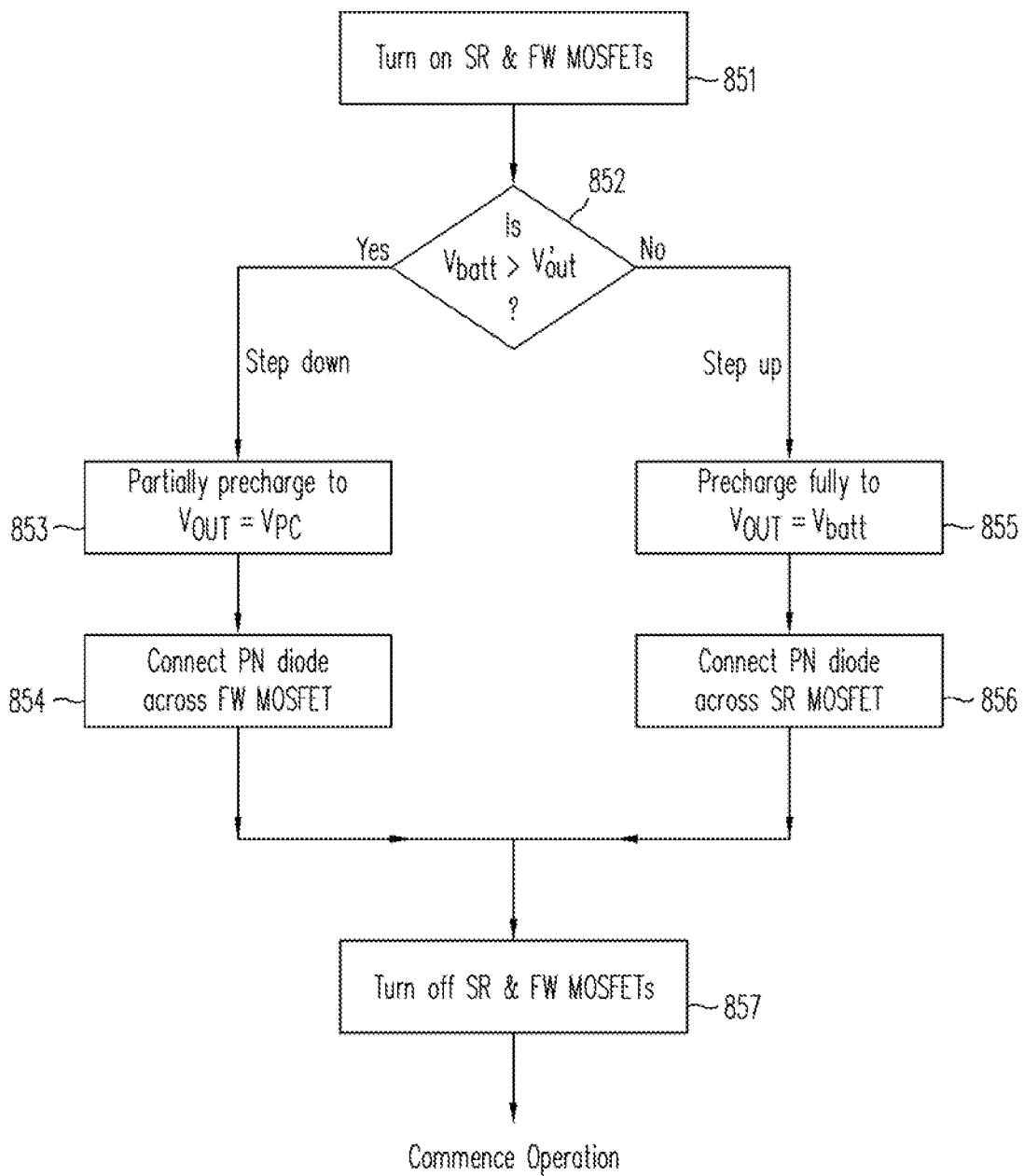
FIG. 22A is a flow chart describing an algorithm for pre-charging an adaptively-clamped synchronous freewheeling up-down converter.
Figure 22B:
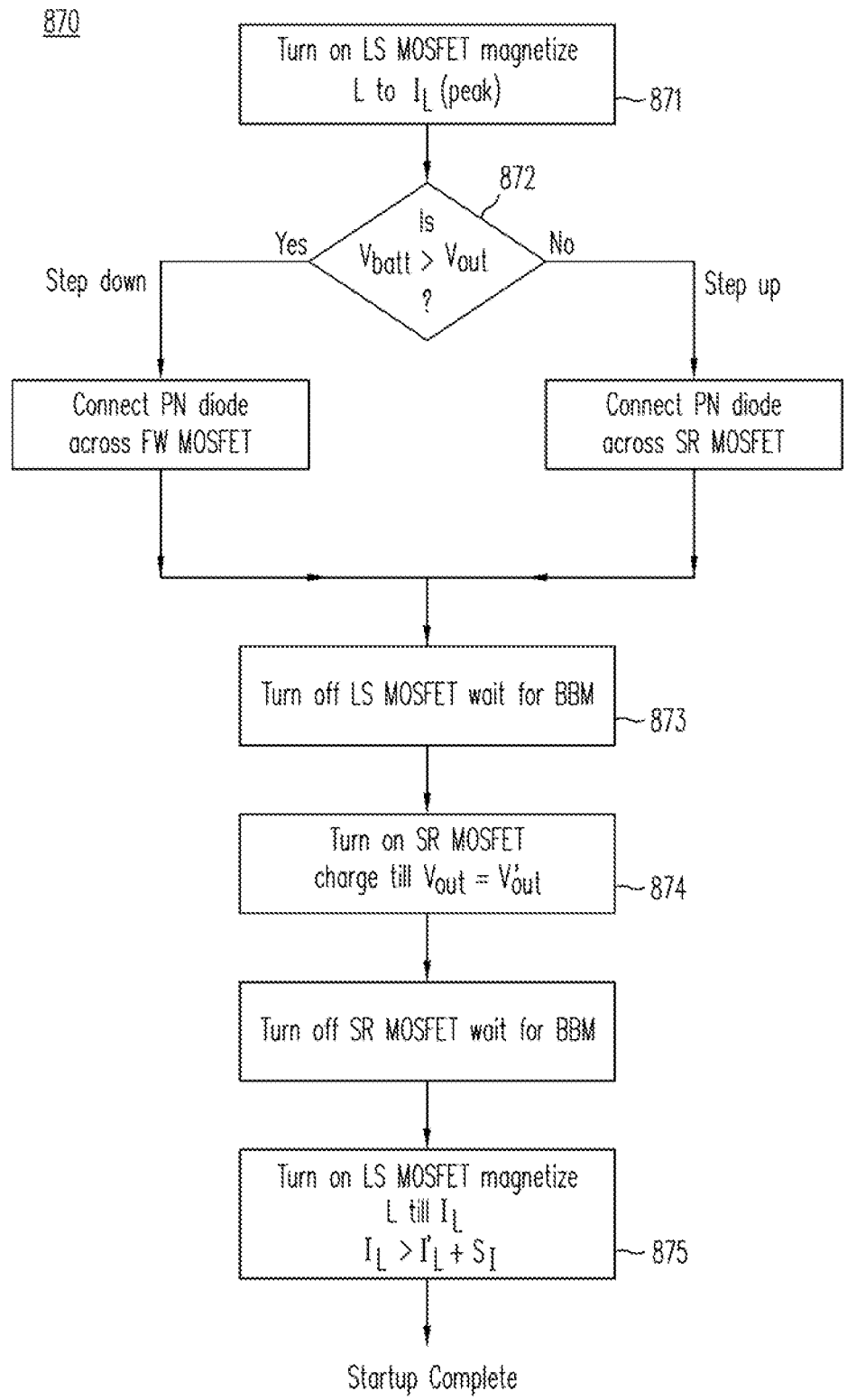
FIG. 22B is a flow chart describing an algorithm for operating an adaptively-clamped synchronous freewheeling up-down converter during the start-up phase.

Flow charts 850 and 870 in FIGS. 22A and 22B algorithmically illustrate the various options available in starting up a freewheeling converter. Specifically, flow chart 850 illustrates the operating sequence for pre-charging. Pre-charging behavior is illustrated between time $t_1$ and $t_3$ in the step-up switching waveforms of FIG. 23A and likewise in the step-down switching waveforms shown in FIG. 23B.

Figure 23A:
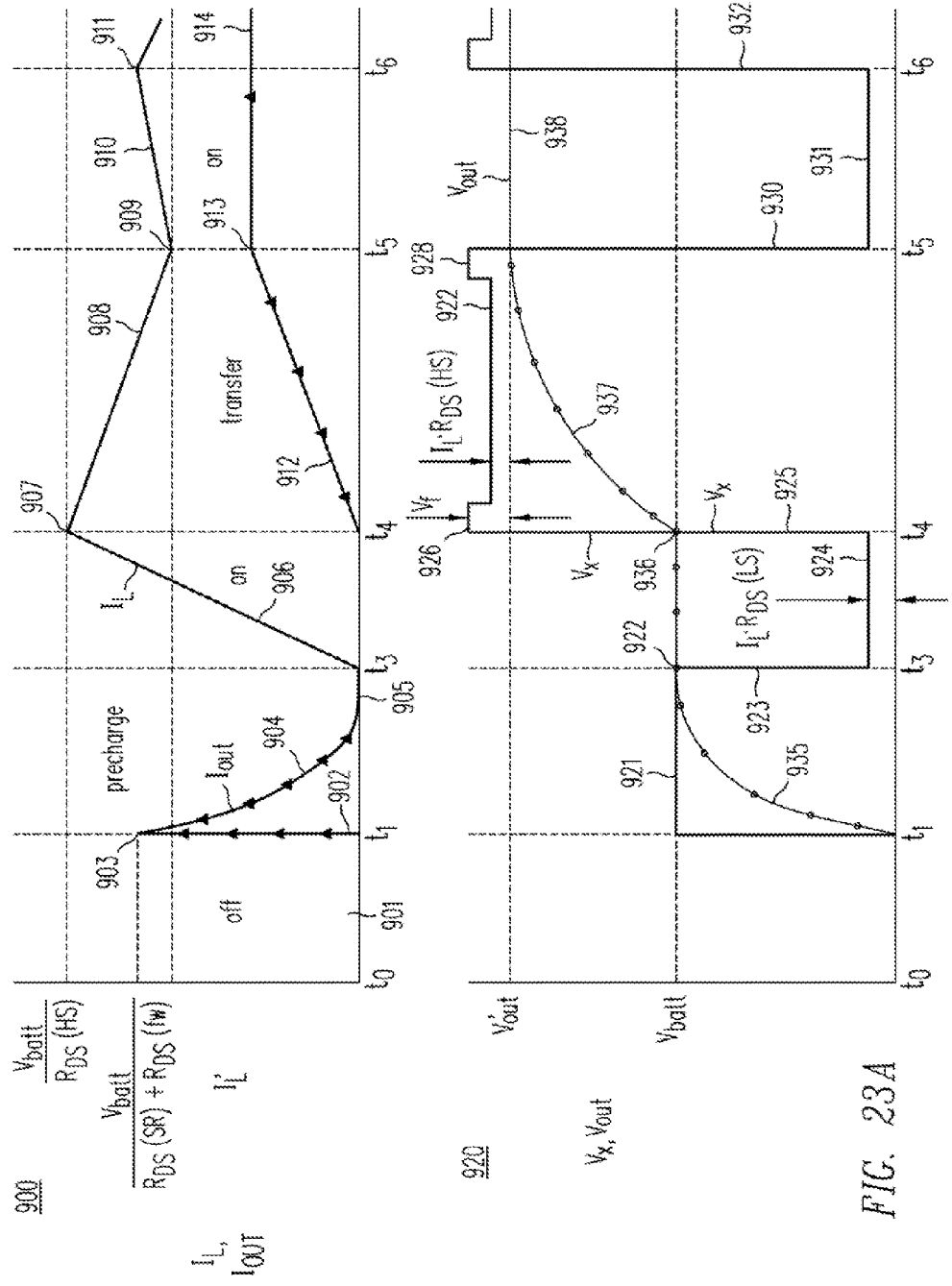
FIG. 23A illustrates graphs of the current and voltage waveforms in an adaptively-clamped synchronous freewheeling up-down converter in step-up operation during the pre-charge and start-up phases.

Referring again to algorithm 850, pre-charging commences in by turning on both the synchronous rectifier and freewheeling MOSFETs, allowing current to flow directly from the battery to the converter's output capacitor without magnetizing the inductor (step 851). The charging sequence is conditional based on whether step-up or step down operation is needed to reach a target output voltage $V'_{OUT}$ as illustrated by conditional step 852. If $V_{batt}<V_{OUT}$, then the converter will subsequently be operating in step up mode and the output is pre-charged to $V_{batt}$ (step 855). As shown in FIG. 23A, at time $t_1$, the current charging the converter's output capacitor jumps to $V_{batt}/(R_{DS(FW)}+R_{DS(SR)})$ shown by output current curve 902 and $V_x$ jumps to a value (line 921) near $V_{batt}$, depending on the relative resistances of the freewheeling and synchronous rectifier MOSFETs.

Gradually, while the capacitor voltage charges to $V_{batt}$ (curve 935), the output current declines exponentially (curve 904). If an electrical load is drawing any current during this interval, the final current will decay to that current, not to zero. By time $t_3$, pre-charging is complete and the output is charged at $V_{batt}$ awaiting the commencement of operation. Since some of the pre-charge current may flow through the inductor rather than through the switch, it is prudent to connect the adaptive clamp diode across the synchronous rectifier MOSFET (step 856) before disconnecting the load by shutting off both synchronous rectifier and freewheeling MOSFETs (step 857).

Figure 23B:
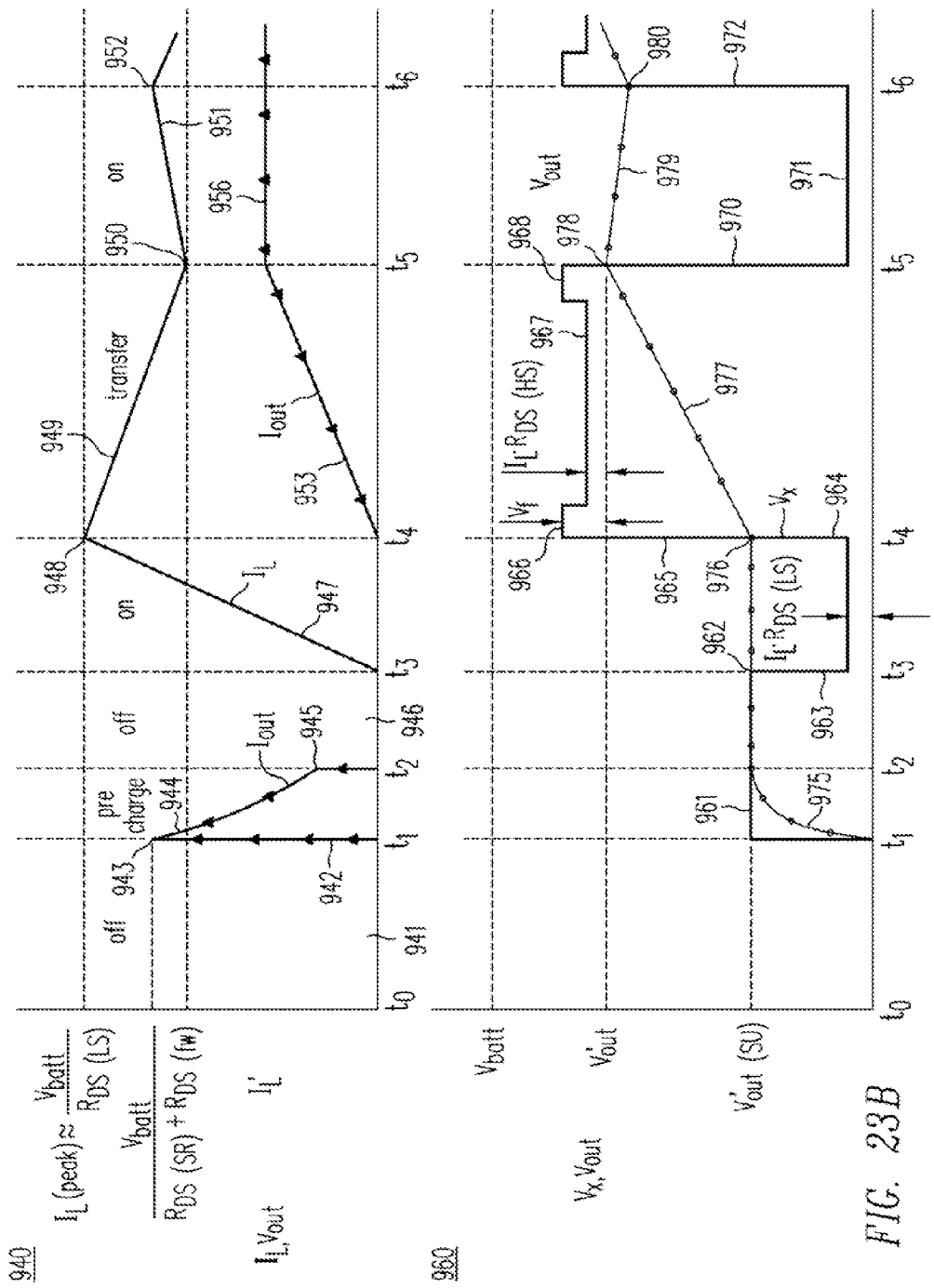
FIG. 23B illustrates graphs of the current and voltage waveforms in an adaptively-clamped synchronous freewheeling up-down converter in step-down operation during the pre-charge and start-up phases.

Referring again to algorithm 850, pre-charging for step down operation is different since charging the output to $V_{batt}$ exceeds the target output voltage $V'_{OUT}$ as illustrated by conditional step 852. Instead if $V_{batt} > V_{OUT}$, then the converter will subsequently be operating in step down mode and the output is pre-charged to a pre-charge voltage $V_{PC}$ less than $V_{batt}$ (step 853). As shown in FIG. 23B, at time $t_1$ the current charging the converter's output capacitor jumps to $V_{batt}/(R_{DS(FW)}+R_{DS(SR)})$ (curve 942) and $V_x$ jumps to a target start-up value $V'^{OUT(SU)}$ (line 961) depending on the relative resistances of the freewheeling and synchronous rectifier MOSFETs.

Gradually while the capacitor voltage charges to $V'_{OUT(SU)}$ (curve 975), the output current declines exponentially (curve 944). If an electrical load is drawing any current during this interval, the current includes both the capacitive and load currents. At time $t_2$, $V_{OUT}$ reaches a target start-up voltage $V'_{OUT(SU)}$ which is less than or equal to the actual target output voltage $V'_{OUT}$ our during converter operation. Since some of the pre-charge current may flow through the inductor rather than through the switch, it is prudent connect the adaptive clamp diode across the freewheeling MOSFET in step 854 before disconnecting the load by shutting off both synchronous rectifier and freewheeling MOSFETs (step 857). As shown at time $t_2$, the MOSFETs are disconnected and the output current drops from a non-zero value to zero (curve 945), after which the output voltage remains constant at $V'_{OUT(SU)}$ until switching commences at time $t_3$.

This sequence concludes the pre-charging stage described in algorithm 850. The disclosed freewheeling up-down converter is unique in that it can pre-charge to a value less than its input $V_{batt}$, simply by disconnecting the load by shutting off the body-diode-free synchronous rectifier, a function that the conventional boost converters of FIGS. 1A and 1B cannot perform since their rectifier diodes are hardwired to their output terminals.

After pre-charging, the converter then proceeds to commence switching operation according to algorithm 870 in FIG. 22B. Here too, the disclosed freewheeling converter offers unique features not available in prior art converters, namely the ability to over-magnetize the inductor without overcharging the output capacitor. Specifically the inductor current $I_L$ can be driven to some arbitrary value $I_{L(peak)}$ during start-up which is greater than the current demanded by the load and later adjusted should that inductor current prove excessive.

Starting with step 871 the low-side MOSFET is turned on, ramping the inductor current $I_L$ to some value $I_{L(peak)}$. In the step up waveforms of FIG. 23A, the inductor current ramps (curve 906) to a peak value 907 between times $t_3$ and $t_4$. During this time $V_x$ drops (curve 923) to a value 924 of magnitude $I_L \cdot R_{DS(LS)}$ while $V_{OUT}$ remains at its pre-charge voltage $V_{batt}$. Similarly, in the step-down waveforms of FIG. 23B, inductor current ramps (curve 947) to a peak value 948 between times $t_3$ and $t_4$ during which time $V_x$ drops (curve 963) to a value 964 of magnitude $I_L \cdot R_{DS(LS)}$ while $V_{OUT}$ remains at its pre-charge voltage $V'_{OUT(SU)}$.

Algorithmically, depending on whether $V_{batt}$ is greater that $V_{OUT}$ (step 872) the adaptive clamp is properly applied in parallel to the freewheeling MOSFET for step-down operation and in parallel to the synchronous rectifier for step-up conversion. Next, at time $t4$, the low-side MOSFET is turned off for $t_{BBM}$ (step 874) before turning on the synchronous rectifier MOSFET (step 874). During this BBM interval, the $V_x$ voltage in the step-up mode jumps (curve 925) to a voltage (line 926) above $V'_{OUT}$ by one forward-biased diode drop $V_f$ until settling back to voltage of magnitude ($V_{OUT}+I_L \cdot R_{DS(SR)}$) during charge transfer (line 922).

Referring to FIGS. 23A and 23B, n the step-down mode, the $V_x$ voltage jumps (curve 965) to a voltage (line 966) above $V'_{OUT}$ by one forward-biased diode drop $V_f$ until settling back to voltage of magnitude ($V_{OUT}+I_L \cdot R_{DS(SR)}$) during charge transfer (line 967).

During the energy transfer phase, the inductor current (curve 908 or 949) declines to some lower value (point 909 or 950), while the output current of the converter supplying the output capacitor and load ramps up accordingly (curve 912 or 953). Meanwhile, the output voltage $V_{OUT}$ ramps from its pre-charge voltage to its target value $V'_{OUT}$ at time $t_5$. In step-up mode, this ramp starts at $V_{batt}$ and ramps to $V'_{OUT}$ (curve 937), a voltage greater than $V_{batt}$. In step-down mode, this ramp starts at $V'_{OUT(SU)}$ and ramps to $V'_{OUT}$ (curve 977), a voltage (point 978) less than V.

When $V_{OUT} \to V'_{OUT}$ at time $t_5$, the synchronous rectifier MOSFET is turned off and transfer terminates. In the step-up mode the $V_x$ voltage jumps back up to one $V_f$ above $V'_{OUT}$ during the BBM interval (curve 928), a voltage greater than $V_{batt}$. In the step-down mode the $V_x$ voltage jumps back up to one $V_f$ above $V'_{OUT}$ during the BBM interval (curve 968), except that this voltage is less than $V_{batt}$. After time $t_5$, the low-side MOSFET is again turned on and the inductor current begins steady state operation around a target value $I'_L$ with a ramp up till time $t_6$ (curve 910 or 951) when, thereafter, the cycle repeats. Start up is then complete and steady state operation has been achieved.

Steady State Operation of the Freewheeling Up Down Converter

Figure 24:
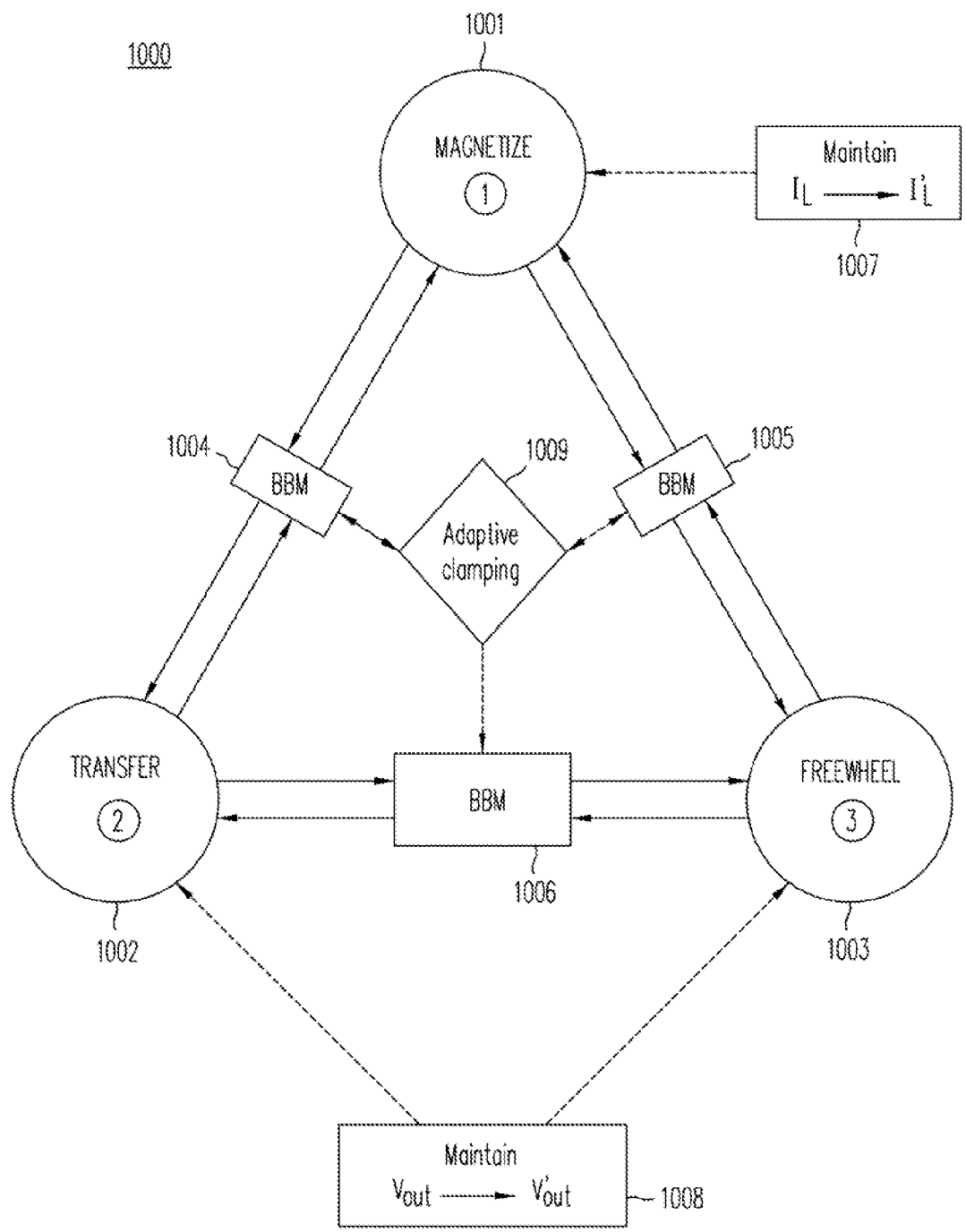
FIG. 24 illustrates a state diagram of the operation of a synchronous freewheeling up-down converter.

As illustrated in the state diagram 1000 of FIG. 24, steady state operation of the synchronous freewheeling up-down converter comprises three stable states: magnetize (circle 1001), energy transfer (circle 1002), and freewheeling (circle 1003). Any state can be transitioned to any other state as long as the transition includes a break-before-make (BBM) interval transition state (boxes 1004, 1005 or 1006) where no power MOSFET is conducting. During such BBM intervals, adaptive clamping (box 1009) inserts a diode into the circuit to prevent unclamped inductive switching without limiting the normal operating range of $V_x$ for either step-up or step-down conversion as required.

The time in the magnetize state (circle 1001) is in one embodiment determined by controlling the actual inductor current $I_L$ to meet the targeted value $I'_L$ as illustrated by a state controller (box 1007). The inductor current in the freewheeling converter may match or exceed the actual load current and does not need to remain balanced on a cycle by cycle basis. The time spent in the energy transfer state (circle 1002) and the freewheeling state (circle 1003) is controlled by a state control (box 1008) whose main function is to maintain the actual $V_{OUT}$ at or near the target value $V'_{OUT}$.

The magnetize state (circle 1001) involves building up current in the inductor by turning on the low-side MOSFET and conducting for a time $t_{on}$. Since $V_L = L \cdot dI/dt$, then for short intervals inductor current can be stored assuming a triangular current waveform of constant slope where $$\Delta I_L = \frac{V \cdot t_{on}}{L}$$

where the numerator of the fraction has units of volts-seconds and I'$_L$ determines the slope. The energy stored in the inductor is therefore controlled by the on time $t_{on}$ or as a percent of the total clock period or as a duty factor defined here as $$D_{on} = \frac{t_{on}}{t_{on} + t_{xfer} + t_{fw}}$$

Figure 25:
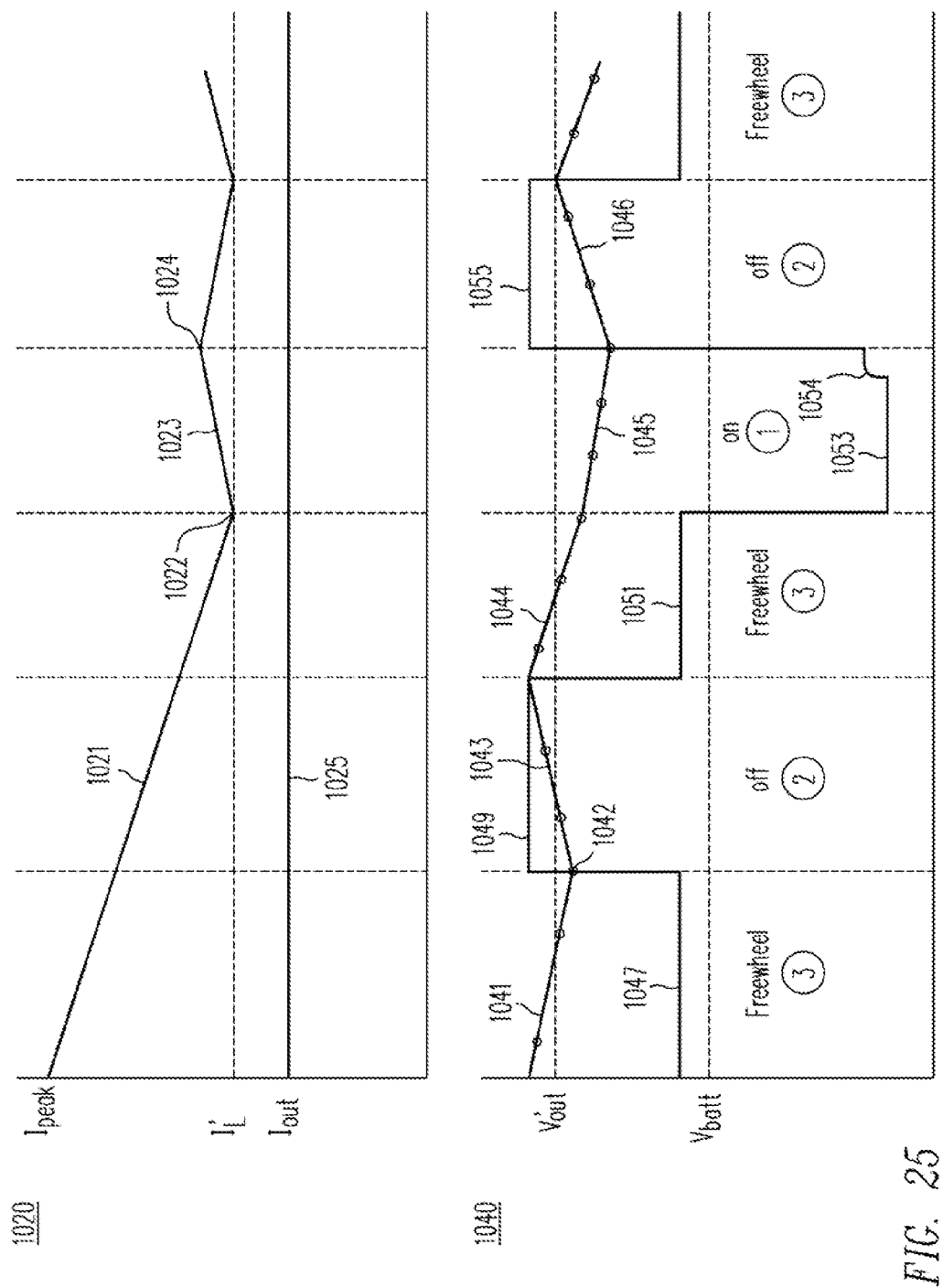
FIG. 25 illustrates waveforms in a synchronous freewheeling up-down converter wherein the inductor is over-magnetized before the converter transitions into steady state operation

If however, I$_L$ reaches its target value of I'$_L$, there is no need to turn on the low-side MOSFET at all and for some period of time. This behavior is illustrated in FIG. 25 where $I_{L(peak)}$ decays 1021 to its target I'$_L$ value 1022 over repeated cycles of freewheeling and transferring while V$_{OUT}$ is regulated around its target value V'$_{OUT}$ shown in graph 1040, including the ripple shown by curves 1041, 1043, 1044, 1045 and 1046. During this time V$_x$ varies from near V$_{batt}$ (line 1047) to ~V$_{OUT}$ (line 1049) and back to near V$_{batt}$ (line 1051), before the low-side MOSFET is turned on (line 1053) and the inductor current begins to increase again. For clarity, the required break before make intervals are not shown in FIG. 25.

In any event the average inductor current can be maintained at higher levels (lines 1022, 1023, and 1024) than the output current (line 1025). Since energy balance is not required cycle by cycle, the transfer time is unrelated to the time $t_{on}$. The transfer time $t_{xfer}$ has a corresponding "duty factor" $D_{xfr}$ that is not determined by the magnetizing time $t_{on}$, namely $$D_{xfr} = \frac{t_{xfr}}{t_{on} + t_{xfer} + t_{fw}}$$

Assuming a low-loss freewheeling MOSFET, if $D_{xfr}$ exceeds the duty factor $D_{on}$ of the converter, the average inductor current I$_L$ will build up while if $D_{on}$ exceeds $D_{xfr}$ the inductor's average current will decline. In this way, control of average currents does not limit the converter's ability to respond to rapid load transients.

While specific embodiments of this invention have been described herein, these embodiments should be considered exemplary and illustrative, rather that limiting, of the broad principles of this invention.

I claim:

1. A DC/DC voltage converter comprising:
   an inductor and a low-side switch connected in series between a supply voltage and a circuit ground, the inductor being coupled between the supply voltage and a node located between the inductor and the low-side switch, and the low-side switch being coupled between the node and the circuit ground;
   an energy transfer switch connected between the node and an output terminal of the converter, the energy transfer switch including a synchronous rectifier MOSFET;
   a freewheeling MOSFET connected in parallel with the inductor, the freewheeling MOSFET including an N-channel MOSFET, a body of the N-channel MOSFET being connected to the circuit ground and not being shorted to either a source or a drain of the N-channel MOSFET;
   a break-before-make buffer connected to a gate of the freewheeling MOSFET, a gate of the synchronous rectifier MOSFET, and a gate of the low-side switch;
   a first adaptive clamping circuit connected in parallel with the synchronous rectifier MOSFET; and
   a pulse-width modulation controller connected to an input terminal of the break-before-make buffer.

2. The DC/DC voltage converter of claim 1 further comprising a feedback path connected between the output terminal and an input terminal of the pulse width modulation controller.

3. The DC/DC voltage converter of claim 1 wherein the energy transfer switch further includes a diode.

4. The DC/DC voltage converter of claim 1 wherein the synchronous rectifier MOSFET includes a second N-channel MOSFET, a body of the second N-channel MOSFET being connected to the circuit ground and not being shorted to either a source or a drain of the second N-channel MOSFET.

5. The DC/DC voltage converter of claim 4 wherein the first adaptive clamping circuit includes a first clamping diode connected in series with a parallel combination of a first blocking diode and a first clamping switch, the first blocking diode and the first clamping diode being oriented to oppose a flow of current in either direction through the first adaptive clamping circuit when the first clamping switch is open.

6. The DC/DC voltage converter of claim 5 wherein the first clamping switch is responsive to an output signal from a first comparator, respective input terminals of the first comparator being connected such that the first comparator compares a value of the supply voltage and a value of an output voltage at the output terminal.

7. The DC/DC voltage converter of claim 6 wherein the first clamping switch and the first blocking diode are integral to a first clamping MOSFET, a first gate buffer being connected between an output terminal of the comparator and a gate terminal of the first clamping MOSFET.

8. The DC/DC voltage converter of claim 7 wherein the first comparator and the first gate buffer are arranged to cause the first clamping MOSFET to be OFF when the supply voltage is greater than the output voltage and ON when the supply voltage is less than the output voltage.

9. The DC/DC voltage converter of claim 8 further comprising a second adaptive clamping circuit connected in parallel with the freewheeling MOSFET.

10. The DC/DC voltage converter of claim 9 wherein the second adaptive clamping circuit includes a second clamping diode connected in series with a parallel combination of a second blocking diode and a second clamping switch, the second blocking diode and the second clamping diode being oriented to oppose a flow of current in either direction through the second adaptive clamping circuit when the second clamping switch is open.

11. The DC/DC voltage converter of claim 10 wherein the second clamping switch is responsive to an output signal from a second comparator, respective input terminals of the second comparator being connected such that the second comparator compares the value of the supply voltage and the value of the output voltage.

12. The DC/DC voltage converter of claim 11 wherein the second clamping switch and the second blocking diode are integral to a second clamping MOSFET, a second gate buffer being connected between an output terminal of the second comparator and a gate terminal of the second clamping MOSFET.

13. The DC/DC voltage converter of claim 12 wherein the second comparator and the second gate buffer are arranged to cause the second clamping MOSFET to be ON when the supply voltage is greater than the output voltage and OFF when the supply voltage is less than the output voltage.

14. A DC/DC voltage converter comprising:
an inductor and a low-side switch connected in series between a supply voltage and a circuit ground, the inductor being coupled between the supply voltage and a node located between the inductor and the low-side switch, and the low-side switch being coupled between the node and the circuit ground;
an energy transfer switch connected between the node and an output terminal of the converter;
a freewheeling MOSFET connected in parallel with the inductor, the freewheeling MOSFET including an N-channel MOSFET, a body of the N-channel MOSFET being connected to the circuit ground and not being shorted to either a source or a drain of the N-channel MOSFET;
a break-before-make buffer connected to a gate of the freewheeling MOSFET and a gate of the low-side switch;
a pulse-width modulation controller connected to an input terminal of the break-before-make buffer; and
an adaptive clamping circuit connected to the node, the adaptive clamping circuit being adapted to clamp the node to the supply voltage when the converter is operating in a step-down mode and to an output voltage at the output terminal when the converter is operating in a step-up mode.

15. The DC/DC voltage converter of claim 14 wherein the adaptive clamping circuit includes a clamping diode connected to the node, the adaptive clamping circuit being adapted to damp the node to either the supply voltage or an output voltage at the output terminal depending on a relationship between the supply voltage and the output voltage.

16. The DC/DC voltage converter of claim 15 wherein the adaptive clamping circuit further includes an analog multiplexer and a comparator, an anode terminal of the clamping diode being coupled to the node, a cathode terminal of the damping diode being coupled to an output terminal of the analog multiplexer, an output terminal of the comparator being coupled to a signal input terminal of the analog multiplexer.

17. The DC/DC voltage converter of claim 16 wherein a first input terminal of the comparator is coupled to the supply voltage, and a second input terminal of the comparator is coupled to the output voltage.

18. A DC/DC voltage converter comprising:
an inductor and a low-side switch connected in a series conduction path between a supply voltage and a circuit ground, the inductor being coupled to the supply voltage and the low-side switch being coupled to the circuit ground, a node being located in the series conduction path between the inductor and the low-side switch;
a synchronous rectifier MOSFET connected between the node and an output terminal of the converter; and
an adaptive clamping circuit connected to the node, the adaptive clamping circuit being adapted to clamp the node to the supply voltage when the converter is operating in a step-down mode and to an output voltage at the output terminal when the converter is operating in a step-up mode.

19. The DC/DC voltage converter of claim 18 wherein the adaptive clamping circuit includes a clamping diode connected to the node, the adaptive clamping circuit being adapted to clamp the node to either the supply voltage or the output voltage at the output terminal depending on a relationship between the supply voltage and the output voltage.

20. The DC/DC voltage converter of claim 19 wherein the adaptive clamping circuit further includes an analog multiplexer and a comparator, an anode terminal of the clamping diode being coupled to the node, a cathode terminal of the clamping diode being coupled to an output terminal of the analog multiplexer, an output terminal of the comparator being coupled to a signal input terminal of the analog multiplexer.

21. The DC/DC voltage converter of claim 20 wherein a first input terminal of the comparator is coupled to the supply voltage, and a second input terminal of the comparator is coupled to the output voltage.

* * * * *

UNITED STATES PATENT AND TRADEMARK OFFICE
CERTIFICATE OF CORRECTION

PATENT NO. : 8,847,564 B2  Page 1 of 1
APPLICATION NO. : 13/632622
DATED : September 30, 2014
INVENTOR(S) : Richard K. Williams It is certified that error appears in the above-identified patent and that said Letters Patent is hereby corrected as shown below:

In the Specification:

Column 13, Line 8, delete "step-tip" and insert -- step-up --.

Column 27, Line 35, delete "4538" and insert -- 453B --.

Column 28, Line 4, delete "4838" and insert -- 483B --.

Column 30, Line 10, delete "18" and insert -- 1B --.

Column 31, Line 55, delete "5428" and insert -- 542B --.

Column 33, Line 24, delete "540" and insert -- 510 --.

Column 41, Line 48, delete "72213" and insert -- 722B --.

Column 41, Line 67, delete "7228" and Insert -- 722B --.

In the Claims:

Claim 15, Column 49, Line 33, delete "damp" and insert -- clamp --.

Claim 16, Column 49, Line 40, delete "damping" and insert -- clamping --.

Signed and Sealed this
Sixteenth Day of December, 2014

Michelle K. Lee
*Deputy Director of the United States Patent and Trademark Office*